(12) United States Patent
Park et al.

(10) Patent No.: US 11,265,050 B2
(45) Date of Patent: Mar. 1, 2022

(54) WIRELESS COMMUNICATION SYSTEM ENHANCEMENT LINK DATA TRANSFER METHOD AND APPARATUS THEREOF

(71) Applicant: LG ELECTRONICS INC., Seoul (KR)

(72) Inventors: Haewook Park, Seoul (KR); Kijun Kim, Seoul (KR); Jonghyun Park, Seoul (KR); Jiwon Kang, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 168 days.

(21) Appl. No.: 16/064,792

(22) PCT Filed: Apr. 2, 2018

(86) PCT No.: PCT/KR2018/003855
§ 371 (c)(1),
(2) Date: Jun. 1, 2020

(87) PCT Pub. No.: WO2018/182381
PCT Pub. Date: Oct. 4, 2018

(65) Prior Publication Data
US 2020/0287602 A1        Sep. 10, 2020

Related U.S. Application Data

(60) Provisional application No. 62/593,895, filed on Dec. 2, 2017, provisional application No. 62/590,537, filed
(Continued)

(51) Int. Cl.
*H04W 72/04* (2009.01)
*H04B 7/0456* (2017.01)
(Continued)

(52) U.S. Cl.
CPC .......... *H04B 7/0486* (2013.01); *H04B 7/0404* (2013.01); *H04B 7/0482* (2013.01);
(Continued)

(58) Field of Classification Search
CPC .. H04B 7/0486; H04B 7/0404; H04B 7/0482; H04B 7/0639; H04W 72/1268; H04W 72/1289; H04L 5/0007
See application file for complete search history.

(56) References Cited

U.S. PATENT DOCUMENTS 10,419,192 B2    9/2019  Bagheri et al.
2011/0142147 A1  6/2011  Chen et al.
(Continued)

FOREIGN PATENT DOCUMENTS

CN    102415042 A    4/2012
CN    102714527 A    10/2012
(Continued)

OTHER PUBLICATIONS

Huawei, et al.: "Codebook based transmission for UL MIMO", R1-1705071, 3GPP TSG RAN WG1 Meeting #88bis, Spokane, USA, Apr. 3-7, 2017.
(Continued)

*Primary Examiner* — Fahmida S Chowdhury
(74) *Attorney, Agent, or Firm* — Dentons US LLP

(57) ABSTRACT

A method for transmitting Physical Uplink Shared Channel (PUSCH) performed by a User Equipment (UE) in a wireless communication system may include receive downlink control information (DCI) for uplink (UL) transmission scheduling; and performing codebook based PUSCH transmission based on precoding information included in the DCI.

14 Claims, 20 Drawing Sheets

US 11,265,050 B2
Page 2

Related U.S. Application Data on Nov. 25, 2017, provisional application No. 62/587,425, filed on Nov. 16, 2017, provisional application No. 62/576,634, filed on Oct. 24, 2017, provisional application No. 62/543,935, filed on Aug. 10, 2017, provisional application No. 62/526,986, filed on Jun. 29, 2017, provisional application No. 62/501,776, filed on May 5, 2017, provisional application No. 62/491,259, filed on Apr. 28, 2017, provisional application No. 62/480,345, filed on Mar. 31, 2017.

(51) Int. Cl.

| | | |
|---|---|---|
| *H04B 7/06* | (2006.01) | |
| *H04L 5/00* | (2006.01) | |
| *H04L 5/10* | (2006.01) | |
| *H04L 25/02* | (2006.01) | |
| *H04L 27/26* | (2006.01) | |
| *H04W 80/08* | (2009.01) | |
| *H04B 7/0404* | (2017.01) | |
| *H04W 72/12* | (2009.01) | |

(52) U.S. Cl.
CPC ......... *H04B 7/0617* (2013.01); *H04B 7/0639* (2013.01); *H04L 5/0007* (2013.01); *H04L 5/0051* (2013.01); *H04L 5/10* (2013.01); *H04L 25/0226* (2013.01); *H04L 27/26* (2013.01); *H04L 27/2607* (2013.01); *H04L 27/2626* (2013.01); *H04W 72/042* (2013.01); *H04W 72/1268* (2013.01); *H04W 72/1289* (2013.01); *H04W 80/08* (2013.01)

(56) References Cited

U.S. PATENT DOCUMENTS

| | | | |
|---|---|---|---|
| 2012/0170525 A1* | 7/2012 | Sorrentino | H04L 5/0023 370/329 |
| 2012/0182944 A1* | 7/2012 | Sorrentino | H04L 5/0044 370/329 |
| 2012/0327884 A1 | 12/2012 | Seo et al. | |
| 2013/0021991 A1 | 1/2013 | Ko et al. | |
| 2013/0058424 A1 | 3/2013 | Enescu et al. | |
| 2013/0129008 A1* | 5/2013 | Ko | H04B 7/0469 375/295 |
| 2013/0163405 A1* | 6/2013 | Kim | H04W 72/14 370/216 |
| 2013/0163687 A1* | 6/2013 | Jing | H04B 7/0639 375/267 |
| 2013/0301560 A1 | 11/2013 | Geirhofer et al. | |
| 2015/0055576 A1* | 2/2015 | Zhang | H04L 5/0094 370/329 |
| 2015/0312927 A1 | 10/2015 | Ko et al. | |
| 2016/0021651 A1 | 1/2016 | Ko et al. | |
| 2016/0112102 A1 | 4/2016 | Kim et al. | |
| 2016/0294454 A1 | 10/2016 | Onggosanusi et al. | |
| 2018/0262250 A1 | 9/2018 | Kim et al. | |
| 2019/0068256 A1 | 2/2019 | Muruganathan et al. | |

FOREIGN PATENT DOCUMENTS

| | | |
|---|---|---|
| CN | 102714580 A | 10/2012 |
| CN | 102859896 A | 1/2013 |
| CN | 104205673 A | 12/2014 |
| CN | 104303430 A | 1/2015 |
| CN | 104584450 A | 4/2015 |
| JP | 2014521260 A | 8/2014 |
| JP | 2015517760 A | 6/2015 |
| KR | 10-2010-0092863 A | 8/2010 |
| KR | 10-2012-0010099 A | 2/2012 |
| KR | 1020120044530 A | 5/2012 |
| KR | 101352600 B1 | 1/2014 |
| KR | 1020140093928 A | 7/2014 |
| KR | 1020150008473 A | 1/2015 |
| RU | 2488964 C2 | 7/2013 |
| WO | 2011/105813 A2 | 9/2011 |
| WO | 2014010986 A1 | 1/2014 |
| WO | 2016134528 A1 | 9/2016 |
| WO | 2018117738 A1 | 6/2018 |

OTHER PUBLICATIONS

Qualcomm: "Codebook based UL transmission", R1-1705576, 3GPP TSG RAN WG1 Meeting #88bis, Spokane, USA, Apr. 3-7, 2017.
Samsung: "UL codebook-based transmission", R1-1705335, 3GPP TSG RAN WG1 Meeting #88bis, Spokane, USA, Apr. 3-7, 2017.
Nokia, Alcatel-Lucent Shanghai Bell, "Summary of issues on UL non-codebook based transmissions", 3GPP TSG RAN WG1 NR Ad-Hoc #2, Jun. 27-30, 2017, R1-1711884.
Ericsson, "NR UL MIMO Offline Session Notes", 3GPP TSG RAN WG1 Meeting 90bis, Oct. 9-13, 2017, R1-1719042.
Ericsson, "UL MIMO procedures for codebook based transmission", 3GPP TSG-RAN WG1 #88, Mar. 3-7, 2017, R1-1705885.
Nokia, Nokia Shanghai Bell, "Summary of issues on UL non-codebook based transmissions", 3GPP TSG RAN WG1 #90, Aug. 21-25, 2017, R1-1715018.
Xiawen et al., "Implementation of DCI Format Detection and Transmission Scheme Confirmation of PDSCH in LTE System," Video Engineering Transmitting and Receiving Mar. 19, 2013, China, (pp. 204-208, 223).
Ghaffar et al., "Interference Sensitivity for Multiuser MIMO in LTE," 2011 IEEE 12th International Workshop on Signal Processing Advances in Wireless Communications, France (pp. 506-510).
J. Wang et al., "The Codebook Design for MIMO Precoding Systems in LTE and LTE-A", 2010 6th International Conference on Wireless Communications Networking and Mobile Computing (WiCOM), IEEE, 2010.

\* cited by examiner

WIRELESS COMMUNICATION SYSTEM ENHANCEMENT LINK DATA TRANSFER METHOD AND APPARATUS THEREOF

CROSS-REFERENCE TO RELATED APPLICATIONS

This application is the National Stage filing under 35 U.S.C. 371 of International Application No. PCT/KR2018/003855, filed on Apr. 2, 2018, which claims the benefit of U.S. Provisional Application No. 62/480,345, filed on Mar. 31, 2017, No. 62/491,259, filed on Apr. 28, 2017, No. 62/501,776, filed on May 5, 2017, No. 62/526,986, filed on Jun. 29, 2017, No. 62/543,935, filed on Aug. 10, 2017, No. 62/576,634, filed on Oct. 24, 2017, No. 62/587,425, filed on Nov. 16, 2017, No. 62/590,537, filed on Nov. 25, 2017, and No. 62/593,895, filed on Dec. 2, 2017, the contents of which are all hereby incorporated by reference herein in their entirety.

TECHNICAL FIELD

The present invention relates to wireless communications, and more particularly, to a method for transmitting uplink data performed by a User Equipment and an apparatus for performing/supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a UL data transmission operation method of a User Equipment based on a codebook.

In addition, an object of the present invention is to propose various/efficient codebook newly based on CP-OFDM waveform.

The technical objects to attain in the present invention are not limited to the above-described technical objects and other technical objects which are not described herein will become apparent to those skilled in the art from the following description.

Technical Solution

According to an aspect of the present invention, a method for transmitting a codebook-based Physical Uplink Shared Channel (PUSCH) performed by a User Equipment (UE) in a wireless communication system may include receive downlink control information (DCI) for uplink (UL) transmission scheduling; and performing codebook based PUSCH transmission based on precoding information included in the DCI, when the PUSCH is transmitted using four antenna ports, the codebook includes: a first group including non-coherent precoding matrixes for selecting only one port for each layer, a second group including partial-coherent precoding matrixes for selection two ports in at least one layer, and a third group including full-coherence precoding matrixes for selection all ports for each of the layers.

In addition, the non-coherent precoding matrix may be a matrix including one vector having non-zero value in each column, the partial-coherent precoding matrix may be a matrix including two vectors having non-zero value in at least one column, and the full-coherence precoding matrix may be a matrix including only vectors having non-zero value.

In addition, the codebook may be a codebook based on Cyclic Prefix Orthogonal Frequency Division Multiplexing (CP-OFDM) waveform.

In addition, the DCI may include Transmitted Precoding Matrix Indicator (TPMI) which is information of an index of precoding matrix selected for the PUSCH transmission as the precoding information.

In addition, the TPMI may be joint-encoded with Rank Indicator (RI) which is information of a layer used in the PUSCH transmission.

In addition, the TPMI may be indicated for each Sounding Reference Signal (SRS) resource configured to the UE, and wherein the RI is commonly indicated for the configured SRS resources.

In addition, the TPMI and the RI may be commonly indicated for all SRS resources configured to the UE.

In addition, the TPMI and the RI may be indicated for each SRS resource configured to the UE.

In addition, the size of predefined DMRS field in the DCI to determined a DMRS port may be determined differently according to the RI joint-encoded with the TPMI.

In addition, the method for transmitting PUSCH may further include receiving restriction information of a number of layers usable in the PUSCH transmission.

In addition, the size of a field in which TPMI and RI are joint-encoded may be decided based on the restriction information of the number of layers.

In addition, the method for transmitting PUSCH may further include receiving restriction information of precoding matrix usable in the PUSCH transmission in the codebook.

In addition, the restriction information of precoding matrix may indicate the precoding matrix usable in the PUSCH transmission in the group unit or individual precoding matrix unit.

In addition, the size of a field in which TPMI and RI are joint-encoded may be decided based on the restriction information of precoding matrix.

In addition, according to another aspect of the present invention, a user equipment (UE) for transmitting a codebook-based Physical Uplink Shared Channel (PUSCH) in a wireless communication system may include a radio frequency (RF) unit for transmitting and receiving a radio signal; and a processor for controlling the RF unit, the processor is configured to perform: receive downlink control information (DCI) for uplink (UL) transmission scheduling; and performing codebook based PUSCH transmission based on precoding information included in the DCI, when the PUSCH is transmitted using four antenna ports, the codebook includes: a first group including non-coherent precoding matrixes for selecting only one port for each layer, a second group including partial-coherent precoding matrixes for selection two ports in at least one layer, and a third group including full-coherence precoding matrixes for selection all ports for each of the layers.

Technical Effects

According to the present invention, there is an effect that a codebook based UL data transmission operation may be efficiently supported in a new wireless communication system.

In addition, according to the present invention, there is an effect that a new UL codebook is used, which is available to support various transmitting operations (non-coherent transmission operation, partial-coherent transmission operation, full-coherent transmission operation, etc.).

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included herein as a part of the description for help understanding the present invention, provide embodiments of the present invention, and describe the technical features of the present invention with the description below.

BEST MODE FOR INVENTION

Figure 1:
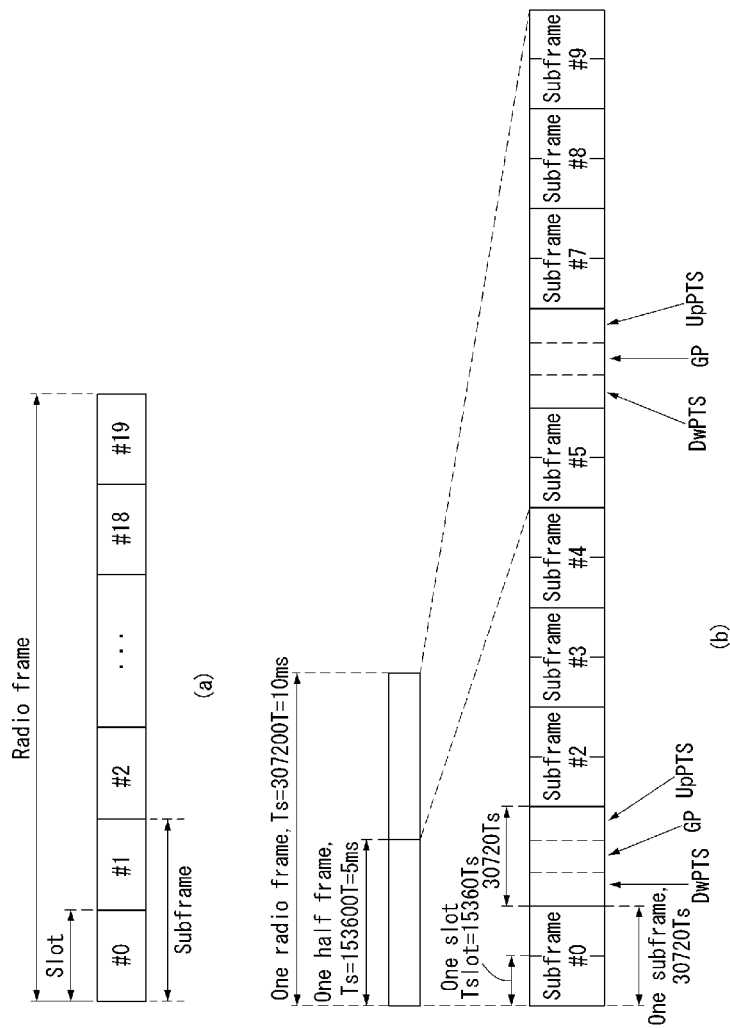
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), an access point (AP), or gNB (next Generation NodeB). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A/5G is chiefly described, but the technical characteristics of the present invention are not limited thereto.

General System to which the Present Invention May be Applied

FIG. 1 shows the structure of a radio frame in a wireless communication system to which an embodiment of the present invention may be applied.

GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of T_s=1/(15000*2048). A UL and DL transmission includes the radio frame having a duration of T_f=307200*T_s=10 ms.

FIG. 1(a) exemplifies a radio frame structure type 1. The type 1 radio frame may be applied to both of full duplex FDD and half duplex FDD.

A radio frame includes 10 subframes. A radio frame includes 20 slots of T_slot=15360*T_s=0.5 ms length, and 0 to 19 indices are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of 153600*T_s=5 ms length each.

Each half frame includes 5 subframes of 30720*T_s=1 ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

Table 2 represents configuration (length of DwPTS/GP/UpPTS) of a special subframe.

signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

TABLE 2

| | Normal cyclic prefix in downlink | | | Extended cyclic prefix in downlink | | |
|---|---|---|---|---|---|---|
| | | UpPTS | | | UpPTS | |
| | | Normal | | | | |
| Special subframe configuration | DwPTS | cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
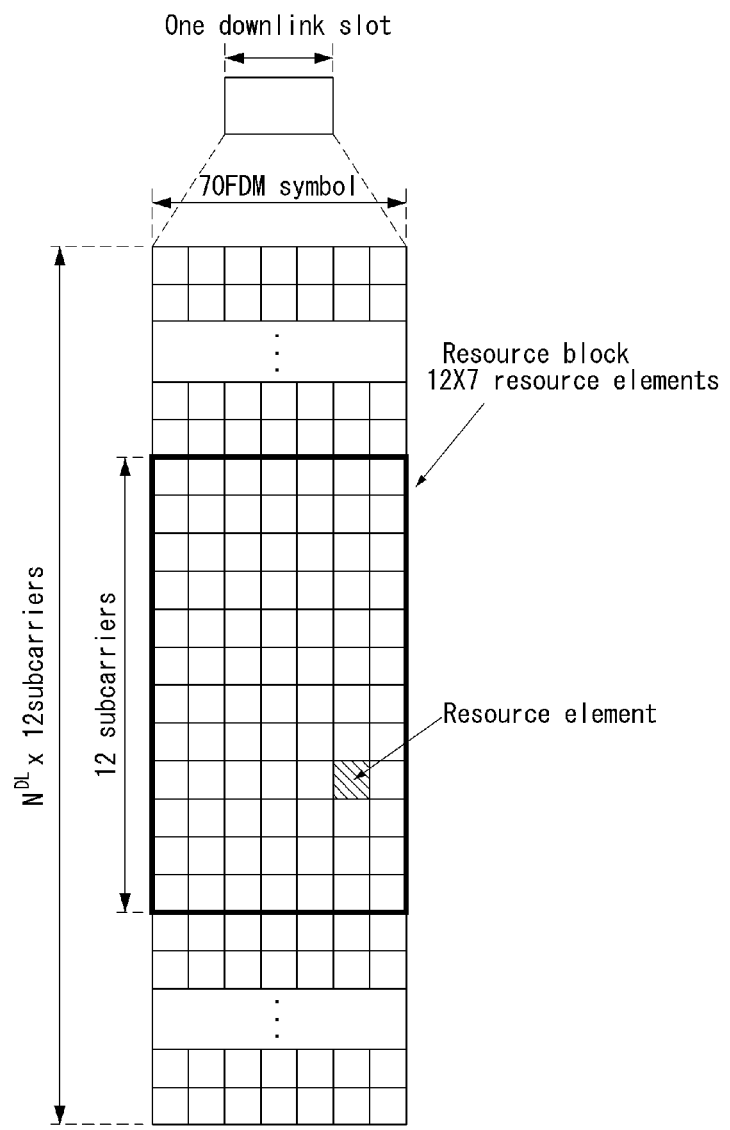
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
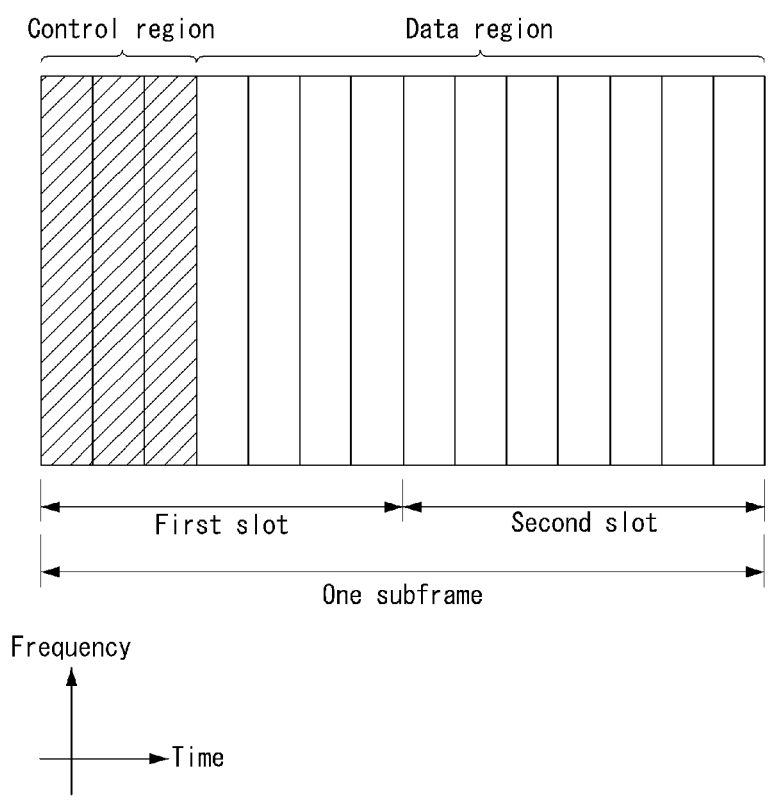
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK)

Figure 4:
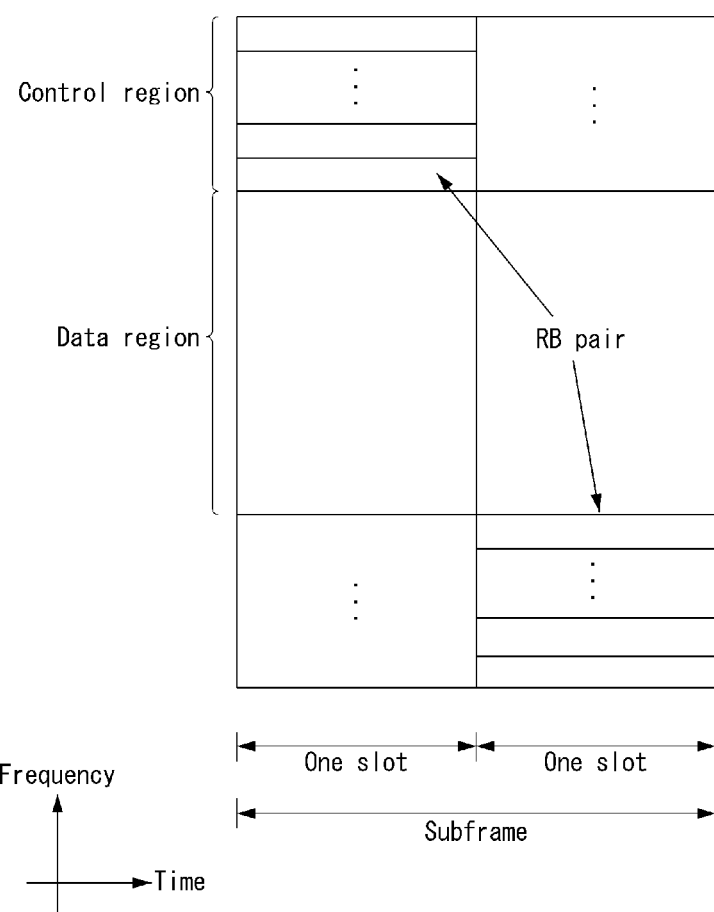
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO) MIMO (Multi-Input Multi-Output)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
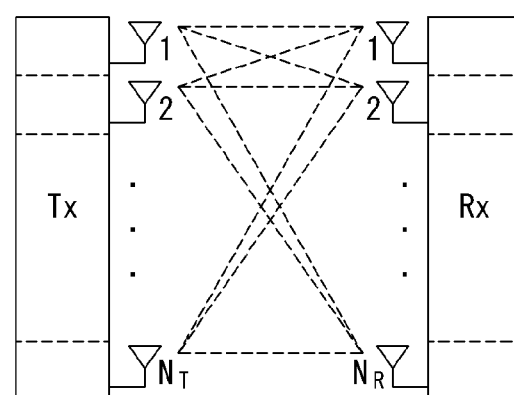
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \quad \text{[Equation 2]}$$

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In this case, w_ij denotes weight between the i-th transmission antenna and the j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T \qquad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
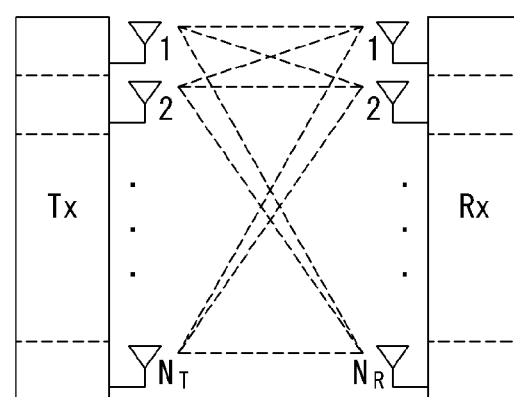
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \qquad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \qquad \text{[Equation 8]}$$

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = [n_1, n_2, \ldots, n_{N_R}]^T \qquad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \qquad \text{[Equation 10]}$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \qquad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

CSI-RS Configuration

In the current LTE standard, parameters for a CSI-RS configuration include antennaPortsCount, subframeConfig, resourceConfig, and the like. These parameters indicate the number of antenna ports through which a CSI-RS is transmitted, a period and an offset of a subframe in which a CSI-RS is going to be transmitted, the location (i.e., a frequency and OFDM symbol index) of Resource Element (RE) in which a CSI-RS is transmitted in a corresponding subframe, and so on. Specifically, an eNB forwards parameter/information of the following contents when indicating/forwarding a specific CSI-RS configuration to a UE.

antennaPortsCount: Parameter representing the number of antenna ports used for transmission of CSI reference signals (e.g., 1 CSI-RS port, 2 CSI-RS ports, 4 CSI-RS ports, or 8 CSI-RS ports)

resourceConfig: Parameter in relation to a CSI-RS allocation resource location subframeConfig: Parameter in relation to a period and an offset of a subframe in which a CSI-RS is going to be transmitted p-c: Regarding UE assumption on reference PDSCH transmitted power for CSI feedback CSI-RS, Pc is the assumed ratio of PDSCH EPRE to CSI-RS EPRE when UE derives CSI feedback and takes values in the range of [−8, 15] dB with 1 dB step size zeroTxPowerResourceConfigList: Parameter in relation to a zero-power CSI-RS zeroTxPowerSubframeConfig: Parameter in relation to a period and an offset of a subframe in which a zero-power CSI-RS is going to be transmitted Massive MIMO A MIMO system having a plurality of antennas may be called a massive MIMO system and attracts attention as a means for improving spectral efficiency, energy efficiency and processing complexity.

Recently, the massive MIMO system has been discussed in order to meet requirements for spectral efficiency of future mobile communication systems in 3GPP. Massive MIMO is also called full-dimension MIMO (FD-MIMO).

LTE release-12 and following wireless communication systems consider introduction of an active antenna system (AAS).

Distinguished from conventional passive antenna systems in which an amplifier capable of adjusting the phase and magnitude of a signal is separated from an antenna, the AAS is configured in such a manner that each antenna includes an active element such as an amplifier.

The AAS does not require additional cables, connectors and hardware for connecting amplifiers and antennas and thus has high energy efficiency and low operation costs. Particularly, the AAS supports electronic beam control per antenna and thus can realize enhanced MIMO for forming accurate beam patterns in consideration of a beam direction and a beam width or 3D beam patterns.

With the introduction of enhanced antenna systems such as the AAS, massive MIMO having a plurality of input/output antennas and a multi-dimensional antenna structure is also considered. For example, when a 2D antenna array instead of a conventional linear antenna array is formed, a 3D beam pattern can be formed using active antennas of the AAS.

Figure 7:
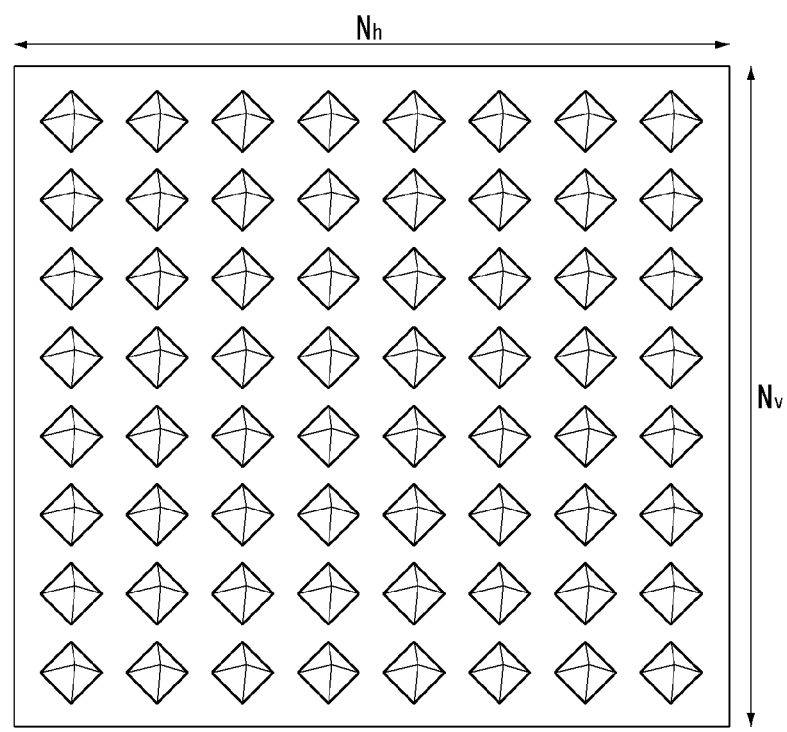
FIG. 7 illustrates a 2D AAS having 64 antenna elements in a wireless communication system to which the present invention is applicable.

FIG. 7 illustrates a 2D AAS having 64 antenna elements in a wireless communication system to which the present invention is applicable.

Figure 10:
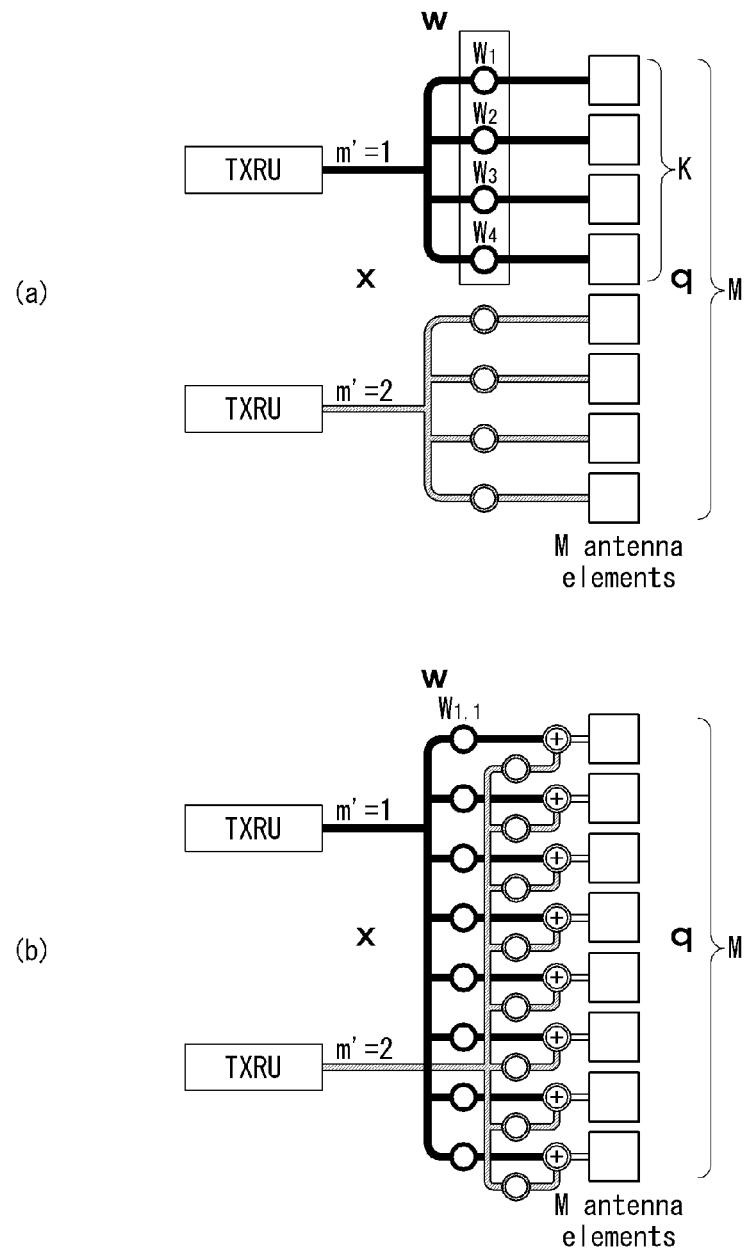
FIG. 10 illustrates transceiver unit models in a wireless communication system to which the present invention is applicable.

FIG. 7 illustrates a normal 2D antenna array. A case in which Nt=Nv·Nh antennas are arranged in a square form, as shown in FIG. 10, may be considered. Here, Nh indicates the number of antenna columns in the horizontal direction and Nv indicates the number of antenna rows in the vertical direction.

When the aforementioned 2D antenna array is used, radio waves can be controlled in both the vertical direction (elevation) and the horizontal direction (azimuth) to control transmitted beams in a 3D space. A wavelength control mechanism of this type may be referred to as 3D beam-forming.

Figure 8:
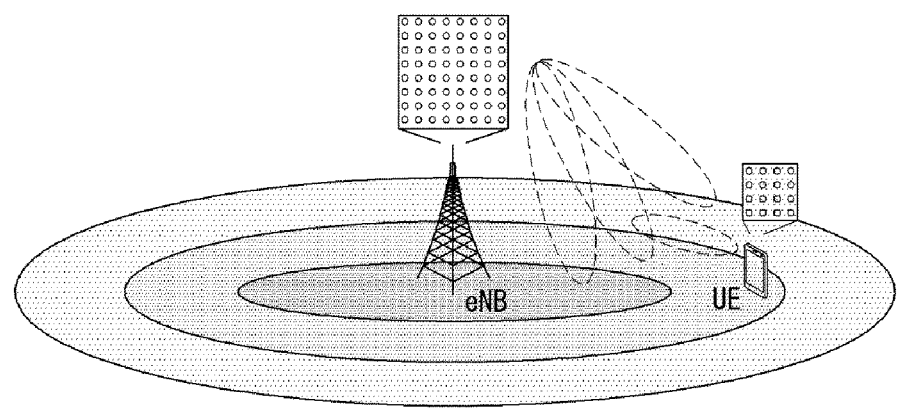
FIG. 8 illustrates a system in which an eNB or a UE has a plurality of transmission/reception antennas capable of forming AAS based 3D beams in a wireless communication system to which the present invention is applicable.

FIG. 8 illustrates a system in which an eNB or a UE has a plurality of transmission/reception antennas capable of forming AAS based 3D beams in a wireless communication system to which the present invention is applicable.

FIG. 8 schematizes the above-described example and illustrates a 3D MIMO system using a 2D antenna array (i.e., 2D-AAS).

From the viewpoint of transmission antennas, quasi-static or dynamic beam formation in the vertical direction as well as the horizontal direction of beams can be performed when a 3D beam pattern is used. For example, application such as sector formation in the vertical direction may be considered.

From the viewpoint of reception antennas, a signal power increase effect according to an antenna array gain can be expected when a received beam is formed using a massive reception antenna. Accordingly, in the case of uplink, an eNB can receive signals transmitted from a UE through a plurality of antennas, and the UE can set transmission power thereof to a very low level in consideration of the gain of the massive reception antenna.

Figure 9:
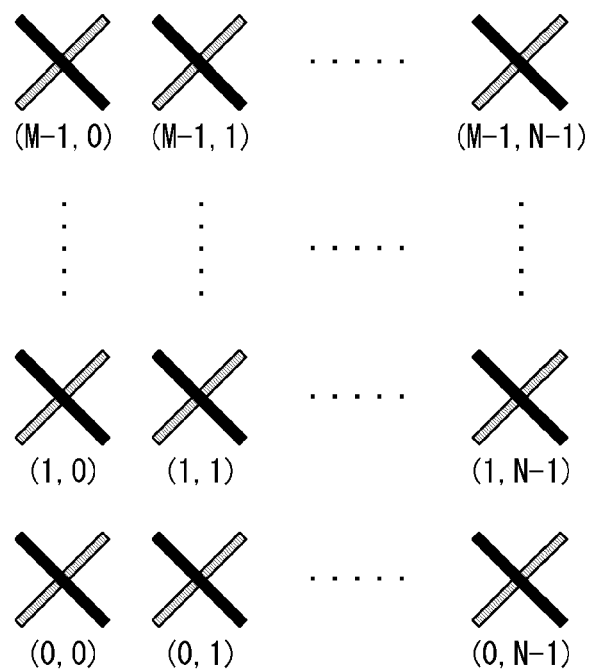
FIG. 9 illustrates a 2D antenna system having cross polarization in a wireless communication system to which the present invention is applicable.

FIG. 9 illustrates a 2D antenna system having cross polarization in a wireless communication system to which the present invention is applicable.

2D planar antenna array model considering polarization may be schematized as shown in FIG. 9.

Distinguished from conventional MIMO systems using passive antennas, systems based on active antennas can dynamically control gains of antenna elements by applying a weight to an active element (e.g., amplifier) attached to (or included in) each antenna element. Since a radiation pattern depends on antenna arrangement such as the number of antenna elements and antenna spacing, an antenna system can be modeled at an antenna element level.

The antenna arrangement model as shown in FIG. 9 may be represented by (M, N, P) which corresponds to parameters characterizing an antenna arrangement structure.

M indicates the number of antenna elements having the same polarization in each column (i.e., in the vertical direction) (i.e., the number of antenna elements having +45° slant in each column or the number of antenna elements having −45° slant in each column)

N indicates the number of columns in the horizontal direction (i.e., the number of antenna elements in the horizontal direction).

P indicates the number of dimensions of polarization. P=2 in the case of cross polarization as shown in FIG. 8, whereas P=1 in the case of co-polarization.

An antenna port may be mapped to a physical antenna element. The antenna port may be defined by a reference signal associated therewith. For example, antenna port 0 may be associated with a cell-specific reference signal (CRS) and antenna port 6 may be associated with a positioning reference signal (PRS) in the LTE system.

For example, antenna ports and physical antenna elements may be one-to-one mapped. This may correspond to a case in which a single cross-polarization antenna element is used for downlink MIMO or downlink transmit diversity. For example, antenna port 0 may be mapped to a single physical antenna element, whereas antenna port 1 may be mapped to another physical antenna element. In this case, two downlink transmissions are present in terms of a UE. One is associated with a reference signal for antenna port 0 and the other is associated with a reference signal for antenna port 1.

Alternatively, a single antenna port may be mapped to multiple physical antenna elements. This may correspond to a case in which a single antenna port is used for beamforming. Beamforming can cause downlink transmission to be directed to a specific UE by using multiple physical antenna elements. This can be accomplished using an antenna array composed of multiple columns of multiple cross-polarization antenna elements in general. In this case, a single downlink transmission derived from a single antenna port is present in terms of a UE. One is associated with a CRS for antenna port 0 and the other is associated with a CRS for antenna port 1.

That is, an antenna port represents downlink transmission in terms of a UE rather than substantial downlink transmission from a physical antenna element in an eNB.

Alternatively, a plurality of antenna ports may be used for downlink transmission and each antenna port may be multiple physical antenna ports. This may correspond to a case in which antenna arrangement is used for downlink MIMO or downlink diversity. For example, antenna port 0 may be mapped to multiple physical antenna ports and antenna port 1 may be mapped to multiple physical antenna ports. In this case, two downlink transmissions are present in terms of a UE. One is associated with a reference signal for antenna port 0 and the other is associated with a reference signal for antenna port 1.

In FD-MIMO, MIMO precoding of a data stream may be subjected to antenna port virtualization, transceiver unit (TXRU) virtualization and an antenna element pattern.

In antenna port virtualization, a stream on an antenna port is precoded on TXRU. In TXRU virtualization, a TXRU signal is precoded on an antenna element.

In the antenna element pattern, a signal radiated from an antenna element may have a directional gain pattern.

In conventional transceiver modeling, static one-to-on mapping between an antenna port and TXRU is assumed and TXRU virtualization effect is integrated into a (TXRU) antenna pattern including both the effects of the TXRU virtualization and antenna element pattern.

Antenna port virtualization may be performed through a frequency-selective method. In LTE, an antenna port is defined along with a reference signal (or pilot). For example, for transmission of data precoded on an antenna port, a DMRS is transmitted in the same bandwidth as that for a data signal and both the DMRS and the data signal are precoded through the same precoder (or the same TXRU virtualization precoding). For CSI measurement, a CSI-RS is transmitted through multiple antenna ports. In CSI-RS transmission, a precoder which characterizes mapping between a CSI-RS port and TXRU may be designed as an eigen matrix such that a UE can estimate a TXRU virtualization precoding matrix for a data precoding vector.

1D TXRU virtualization and 2D TXRU virtualization are discussed as TXRU virtualization methods, which will be described below with reference to the drawings.

FIG. 10 illustrates transceiver unit models in a wireless communication system to which the present invention is applicable.

In 1D TXRU virtualization, M_TXRU TXRUs are associated with M antenna elements in a single-column antenna arrangement having the same polarization.

In 2D TXRU virtualization, a TXRU model corresponding to the antenna arrangement model (M, N, P) of FIG. 8 may be represented by (M_TXRU, N, P). Here, M_TXRU denotes the number of 2D TXRUs present in the same column and the same polarization, and M_TXRU≤M all the time. That is, a total number of TXRUs is M_TXRU×N×P.

TXRU virtualization models may be divided into TXRU virtualization model option-1: sub-array partition model as shown in FIG. 10(a) and TXRU virtualization model option-2: full-connection model as shown in FIG. 10(b) according to correlation between antenna elements and TXRU.

Referring to FIG. 10(a), antenna elements are partitioned into multiple antenna element groups and each TXRU is connected to one of the groups in the case of the sub-array partition model.

Referring to FIG. 10(b), multiple TXRU signals are combined and delivered to a single antenna element (or antenna element array) in the case of the full-connection model.

In FIG. 10, q is a transmission signal vector of M co-polarized antenna elements in a single column, w is a wideband TXRU virtualization weight vector, W is a wideband TXRU virtualization weight matrix, and x is a signal vector of M_TXRU TXRUs.

Here, mapping between antenna ports and TXRUs may be 1-to-1 or 1-to-many mapping.

FIG. 10 shows an example of TXRU-to-antenna element mapping and the present invention is not limited thereto. The present invention may be equally applied to mapping between TXRUs and antenna elements realized in various manners in terms of hardware.

Channel-State Information (CSI)-Reference Signal (CSI-RS) Definition

With respect to a serving cell and a UE that are configured with transmission mode 9, the UE may be configured with one CSI-RS resource configuration. With respect to a serving cell and a UE that are configured with transmission mode 10, the UE may be configured with one or more CSI-RS resource configuration(s). The following parameters that the UE assumes non-zero transmission power for a CSI-RS is configured through higher layer signaling for each CSI-RS resource configuration:

CSI-RS resource configuration identity (when a UE is configured with transmission mode 10)
The number of CSI-RS ports
CSI RS configuration
CSI RS subframe configuration ($I_{CSI-RS}$)
UE assumption for a reference PDSCH transmission power $P_c$ for CSI feedback (when a UE is configured with transmission mode 9)
UE assumption for a reference PDSCH transmission power $P_c$ for CSI feedback for each CSI process, when a UE is configured with transmission mode 10. In the case that CSI subframe sets $C_{CSI,0}$ and $C_{CSI,1}$ are configured by higher layer signaling for a single CSI process, $P_c$ is configured for each of the CSI subframe sets of the corresponding CSI process.
Pseudo-random sequence generator parameter ($n_{ID}$)
CDM type parameter, when a UE is configured with higher layer parameter CSI-Reporting-Type and the CSI-Reporting-Type is set to 'CLASS A' for CSI process.
Higher layer parameter qcl-CRS-Info-r11, when a UE is configured with transmission mode 10, UE assumption of QCL type B of CRS antenna port that has the following parameters and CSI-RS antenna ports:
qcl-ScramblingIdentity-r11.
crs-PortsCount-r11.
mbsfn-SubframeConfigList-r11.

$P_c$ is an assumed ratio of PDSCH EPRE for CSI-RS EPRE when a UE derives CSI feedback and takes a value in a range of [−8, 15] dB with 1 dB step size. Here, the PDSCH EPRE corresponds to symbol number for a ratio of the PDSCH EPRE with respect to cell-specific RS EPRE.

A UE does not expect configuration of CSI-RS and PMCH in the same subframe of a serving cell.

With respect to frame structure type 2 serving cell and 4 CRS ports, a UE does not expect to receive CSI-RS configuration index belonged to set [20-31] for a normal CP case or set [16-27] for an extended CP case.

A UE may assume that CSI-RS antenna port of CSI-RS resource configuration is in QCL for delay spread, Doppler spread, Doppler shift, average gain and average delay.

A UE configured with transmission mode 10 and QCL type B may assume that antenna ports 0 to 3 associated with qcl-CRS-Info-r11 corresponding to CSI-RS resource configuration and antenna ports 15 to 22 corresponding to CSI-RS resource configuration are in QCL for Doppler shift and Doppler spread.

A UE configured with transmission 10 and higher layer parameter CSI-Reporting-Type, the CSI-Reporting-Type is set to 'class B' in which the number of configured CSI resources configured for the CSI process is one or more, and QCL type B is set, the UE does not expect to receive CSI-RS resource configuration for a CSI process that has different value of higher layer parameter qcl-CRS-Info-r11.

In a subframe constructed/configured for a CSI-RS transmission, reference signal sequence $r_{l,n_s}(m)$ may be mapped to complex-valued modulation symbols $a_{k,l}^{(p)}$ that are used as references symbols of antenna port p. Such a mapping depends on higher layer parameter CDMType.

In the case that CDMType does not correspond to CDM4, a mapping may be performed according to Equation 12 below.

$$a_{k,l}^{(p')} = w_{l''} \cdot r_{l,n_s}(m') \qquad [\text{Equation 12}]$$

$$k = k' + 12m + \begin{cases} -0 & \text{for } p' \in \{15, 16\}; \quad \text{normal cyclic prefix} \\ -6 & \text{for } p' \in \{17, 18\}; \quad \text{normal cyclic prefix} \\ -1 & \text{for } p' \in \{19, 20\}; \quad \text{normal cyclic prefix} \\ -7 & \text{for } p' \in \{21, 22\}; \quad \text{normal cyclic prefix} \\ -0 & \text{for } p' \in \{15, 16\}; \quad \text{extended cyclic prefix} \\ -3 & \text{for } p' \in \{17, 18\}; \quad \text{extended cyclic prefix} \\ -6 & \text{for } p' \in \{19, 20\}; \quad \text{extended cyclic prefix} \\ -9 & \text{for } p' \in \{21, 22\}; \quad \text{extended cyclic prefix} \end{cases}$$

-continued $l = l' +$
$\begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$ $w_{l''} = \begin{cases} 1 & p' \in \{15, 17, 19, 21\} \\ (-1)^{l''} & p' \in \{16, 18, 20, 22\} \end{cases}$ $l'' = 0, 1$ $m = 0, 1, \ldots, N_{RB}^{DL} - 1$ $m' = m + \left\lfloor \dfrac{N_{RB}^{max,DL} - N_{RB}^{DL}}{2} \right\rfloor$ In the case that CDMType corresponds to CDM 4, a mapping may be performed according to Equation 13 below.

$a_{k,l}^{(p')} = w_{p'}(i) \cdot r_{l,n_s}(m')$ [Equation 13]

$k = k' + 12m -$
$\begin{cases} k'' & \text{for } p' \in \{15, 16, 19, 20\}; \text{ normal cyclic prefix } N_{ports}^{CSI} = 8 \\ k'' + 6 & \text{for } p' \in \{17, 18, 21, 22\}; \text{ normal cyclic prefix } N_{ports}^{CSI} = 8 \\ 6k'' & \text{for } p' \in \{15, 16, 17, 18\}; \text{ normal cyclic prefix } N_{ports}^{CSI} = 4 \end{cases}$ $l = l' +$
$\begin{cases} l'' & \text{CSI reference signal configurations 0-19, normal cyclic prefix} \\ 2l'' & \text{CSI reference signal configurations 20-31, normal cyclic prefix} \end{cases}$ $l'' = 0, 1$ $k'' = 0, 1$ $i = 2k'' + l''$ $m = 0, 1, \ldots, N_{RB}^{DL} - 1$ $m' = m + \left\lfloor \dfrac{N_{RB}^{max,DL} - N_{RB}^{DL}}{2} \right\rfloor$ $w_{p'}(i)$ in Equation 13 is determined by Table 6 below. Table 3 represents sequence $w_{p'}(i)$ for CDM 4.

TABLE 3

| p' | | |
|---|---|---|
| $N_{ports}^{CSI} = 4$ | $N_{ports}^{CSI} = 8$ | $[w_{p'}(0)\ w_{p'}(1)\ w_{p'}(2)\ w_{p'}(3)]$ |
| 15 | 15, 17 | [1 1 1 1] |
| 16 | 16, 18 | [1 -1 1 -1] |
| 17 | 19, 21 | [1 1 -1 -1] |
| 18 | 20, 22 | [1 -1 -1 1] |

OFDM Numerology

As more communication devices require greater communication capacity, a necessity of mobile broadband communication which is more improved than the existing radio access technology (RAT) has been raised. In addition, the massive MTC (Machine Type Communications) that provides various services anytime and anywhere by connecting a plurality of devices and objects is also one of important issues, which is considered in a next generation communication. Moreover, it has been discussed a design of a communication system in which a service and/or a UE sensitive to reliability and latency. As such, an introduction of a next generation RAT has been discussed currently, which considers enhanced mobile broadband communication, massive MTC, Ultra-Reliable and Low Latency Communication (URLLC), and the like, and such a technology is commonly referred to as 'new RAT (NR)'.

The new RAT system uses OFDM transmission scheme or the similar transmission scheme, representatively, OFDM numerology represented in Table 4 below.

TABLE 4

| Parameter | value |
|---|---|
| Subcarrier-spacing($\Delta f$) | 60 kHz |
| OFDM symbol length | 16.33 μs |
| Cyclic Prefix(CP) length | 1.30 μs/1.17 μs s |
| System bandwidth | 80 MHz |
| No. of available subcarriers | 1200 |
| Subframe length | 0.25 ms |
| No. of OFDM symbols per subframe | 14 symbols |

Self-Contained Subframe Structure

Figure 11:
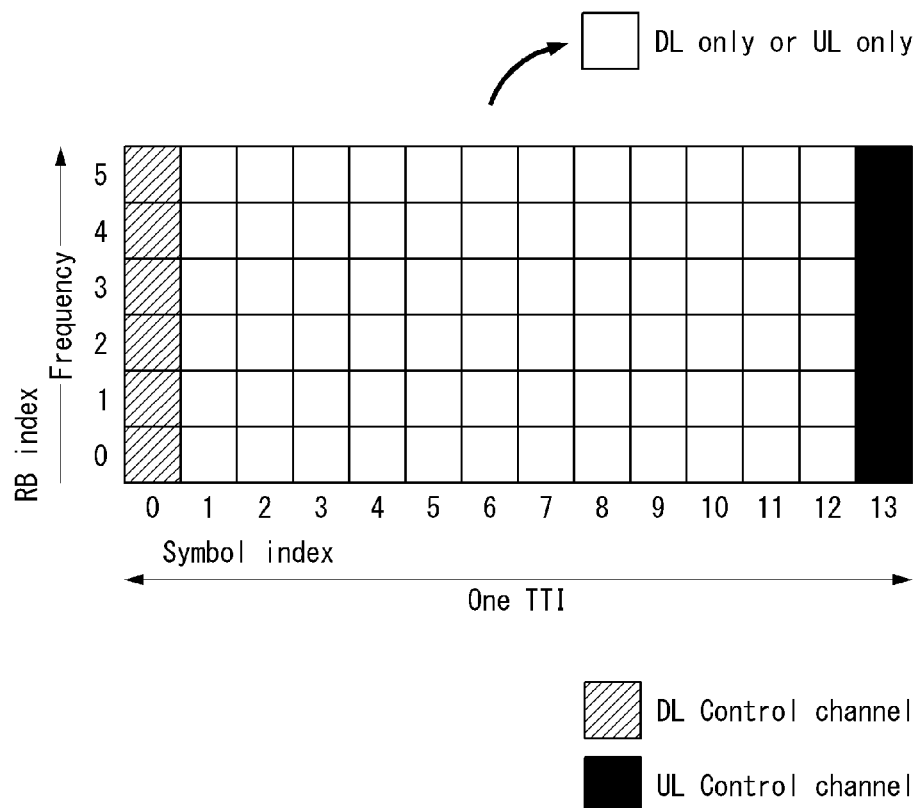
FIG. 11 illustrates a self-contained subframe structure to which the present invention may be applied.

In TDD system, in order to minimize data transmission delay, the self-contained subframe structure to which a control channel and a data channel are TDMed as shown in FIG. 11 has been considered in 5 Generation new RAT.

FIG. 11 illustrates a self-contained subframe structure to which the present invention may be applied.

The shaded area in FIG. 11 shows a transport region of a physical channel PDCCH for forwarding DCI, and the dark area shows a transport region of a physical channel PUCCH for forwarding Uplink Control Information (UCI).

The control information that an eNB forwards to a UE through DCI includes information of a cell configuration that the UE needs to know, DL-specific information such as DL scheduling, and the like, and/or UL-specific information such as UL grant. Further, the control information that an eNB forwards to a UE through UCI includes ACK/NACK report of HARQ for a DL data, CSI report for DL channel state, and/or Scheduling Request (SR), and so on.

The area not marked in FIG. 11 may be used for transport region of a physical channel PDSCH for a downlink (DL) data and a transport region of a physical channel PUSCH for an uplink (UL) data. In the characteristics of such a structure, a DL transmission and a UL transmission may be sequentially progressed in a subframe (SF), a DL data may be transmitted, and a UL ACK/NACK may be received in the corresponding SF. Consequently, according to this structure, a time required for retransmitting data is reduced when a data transmission error occurs, and owing to this, the delay till the final data forwarding may be minimized.

In such a self-contained subframe structure, a time gap is required for a process that an eNB and a UE switch from a transmission mode to a reception mode or a process that an eNB and a UE switch from a reception mode to a transmission mode. For this, a part of OFDM symbols on the timing switching from DL to UL may be setup as GP, and such a subframe type may be referred to as 'self-contained SF'.

Analog Beamforming

In Millimeter Wave (mmW) band, a wavelength becomes short and an installation of a plurality of antenna elements is available in the same area. That is, the wavelength in 30 GHz band is 1 cm, and accordingly, an installation of total 64(8×8) antenna elements is available in 2-dimensional arrangement shape with 0.5 lambda (wavelength) intervals in 5 by 5 cm panel. Therefore, in mmW band, beamforming (BF) gain is increased by using a plurality of antenna elements, and accordingly, coverage is increased or throughput becomes higher.

In this case, each antenna element has a Transceiver Unit (TXRU) such that it is available to adjust a transmission power and a phase, and independent beamforming is available for each frequency resource. However, it has a problem that effectiveness is degraded in a cost aspect when TXRUs are installed in all of about 100 antenna elements. Accordingly, a method has been considered to map a plurality of antenna elements in a single TXRU and to adjust a direction of beam by an analog phase shifter. Such an analog beamforming technique may make only one beam direction throughout the entire band, and there is a disadvantage that frequency selective beamforming is not available.

As a middle form between a Digital BF and an analog BF, B number of hybrid BF may be considered which is smaller than Q number of antenna element. In this case, directions of beams that may be transmitted simultaneously are limited lower than B number; even it is changed according to a connection scheme between B number of TXRUs and Q number of antenna elements.

In addition, in the case that multiple antennas are used in the New RAT system, a hybrid beamforming technique has emerged, in which digital beamforming and analogue beamforming are combined. In this case, the analog beamforming (or radio frequency (RF) beamforming) means an operation of performing precoding (or combining) in an RF terminal. In the hybrid beamforming technique, each of a Baseband terminal and an RF terminal performs precoding (or combining), and owing to this, there is an advantage that a performance approaching to the digital beamforming can be attained while the number of RF chains and the number of digital (D)/analog (A) (or A/D) converters are reduced. For the convenience of description, a hybrid beamforming structure may be represented by N transceiver units (TXRUs) and M physical antennas. Then, the digital beamforming for L data layers that are going to be transmitted in a transmitter may be represented by N by L matrix. Then, the analog beamforming is applied that the transformed N digital signals are transformed to analog signals through a TXRU, and then represented by M by N matrix.

Figure 12:
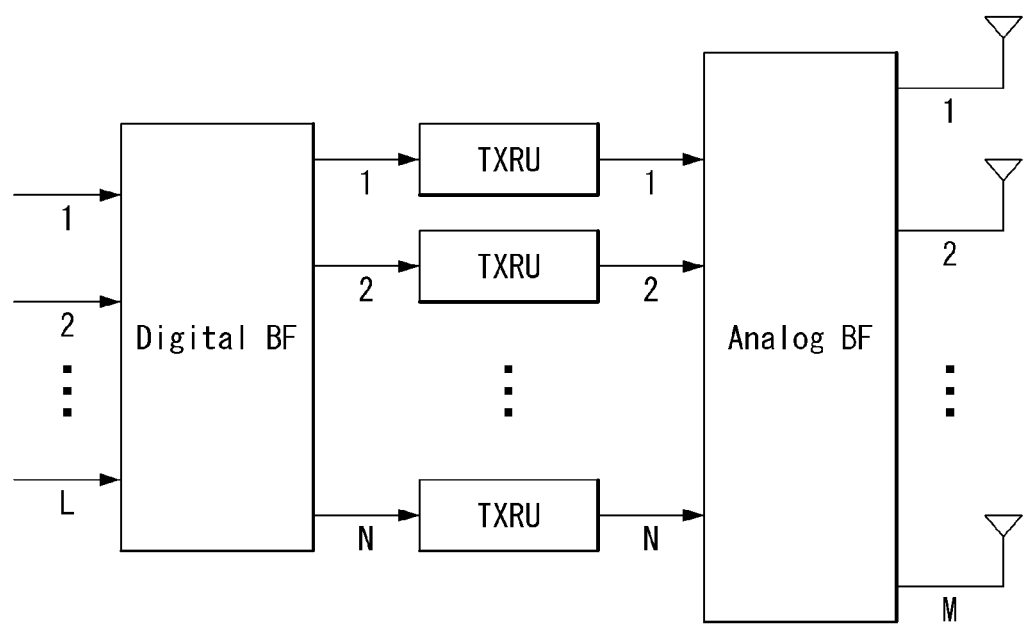
FIG. 12 is a diagram schematically illustrating a hybrid beamforming structure in the aspect of a TXRU and a physical antenna.

FIG. 12 is a diagram schematically illustrating a hybrid beamforming structure in the aspect of a TXRU and a physical antenna. FIG. 12 exemplifies the case that the number of digital beams is L and the number of analog beams is N.

In the New RAT system, a direction has been considered: it is designed that an eNB may change the analog beamforming in a symbol unit, and more efficient beamforming is supported to a UE located in a specific area. Furthermore, when specific N TXRUs and M RF antennas shown in FIG. 12 are defined as a single antenna panel, in the New RAT system, the way of introducing a plurality of antenna panels has been also considered, to which independent hybrid beamforming may be applied.

In the case that an eNB utilizes a plurality of analog beams, an analog beam beneficial to receive a signal may be changed according to each UE. Accordingly, a beam sweeping operation has been considered that for at least synchronization signal, system information, paging, and the like, a plurality of analog beams that an eNB is going to apply in a specific Subframe (SF) is changed for each symbol such that all UEs have reception changes.

Figure 13:
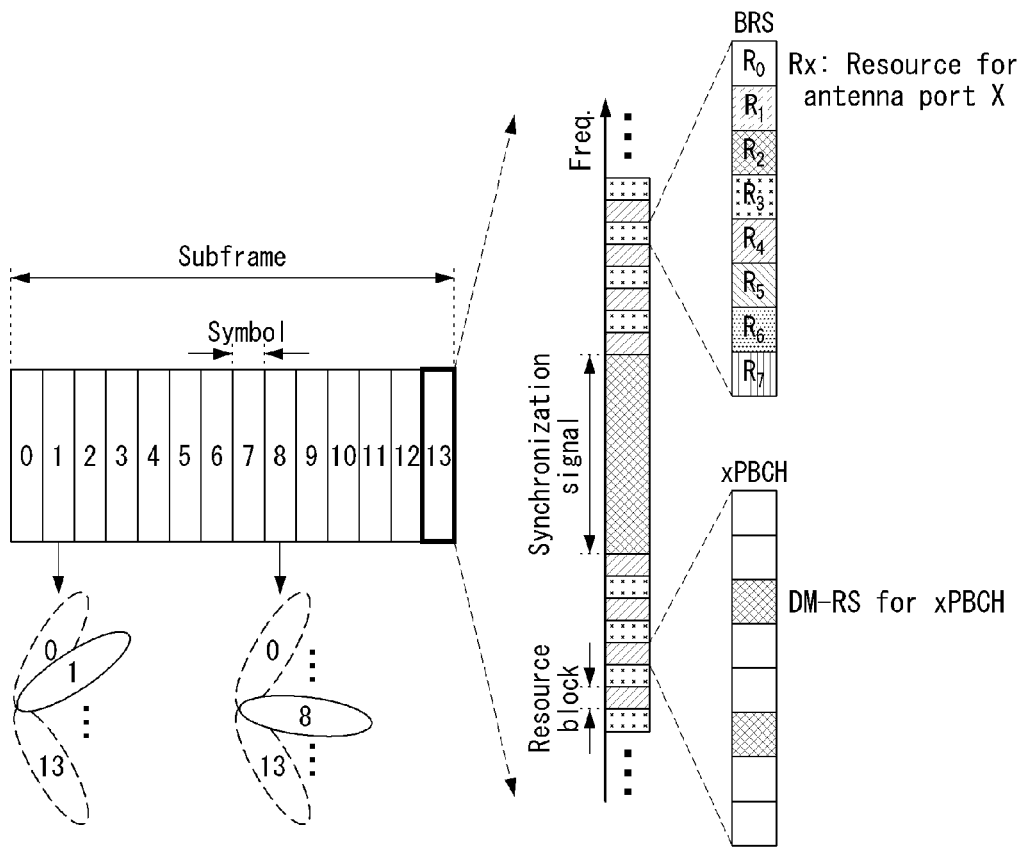
FIG. 13 is a diagram schematically illustrating a synchronization signal in DL transmission process and a beam sweeping operation for system information.

FIG. 13 is a diagram schematically illustrating a synchronization signal in DL transmission process and a beam sweeping operation for system information.

The physical resource (or physical channel) on which system information of the New RAT system is transmitted in FIG. 13 is referred to as x physical broadcast channel (xPBCH).

Referring to FIG. 13, the analog beams belonged to different antenna panels in a single symbol may be transmitted simultaneously. In order to measure a channel for each analog beam, as shown in FIG. 13, an introduction of a beam RS (BRS) has been discussed that a beam RS (BRS) is introduced, which is an RS to which a single analog beam (corresponding to a specific antenna panel) is applied and transmitted. The BRS may be defined for a plurality of antenna ports, and each antenna port of the BRS may correspond to a single analog beam. At this time, different from the BRS, a synchronization signal or xPBCH may be transmitted and all analog beams in an analog beam group may be applied so as to be received well by an arbitrary UE.

RRM Measurement in LTE

The LTE system supports an RRM operation for power control, scheduling, cell search, cell research, handover, radio link or connection monitoring, connection establishment/re-establishment, and so on. A serving cell may request RRM measurement information, which is a measurement value for performing an RRM operation to a UE. Representatively, in the LTE system, a UE may measure/obtain information such as reference signal received power (RSRP), reference signal received quality (RSRQ), and the like and report it. Particularly, in the LTE system, a UE receives 'measConfig' as a higher layer signal for an RRM measurement from a serving cell. The UE may measure RSRP or RSRQ according to the information of 'measConfig'. Herein, the definition of RSRP, RSRQ and RSSI according to TS 36.214 document of the LTE system is as follows.

[RSRP]

Reference signal received power (RSRP) is defined as the linear average over the power contributions (in [W]) of the resource elements that carry cell-specific RS (CRS) within the considered measurement frequency bandwidth. For RSRP determination, the CRS R0 according TS 36.211 [3] shall be used. In the case that a UE may reliably detect that R1 is available, it may use R1 in addition to R0 to determine RSRP.

The reference point for the RSRP shall be the antenna connector of the UE.

In the case that receiver diversity is in use by the UE, the reported value shall not be lower than the corresponding RSRP of any of the individual diversity branches.

[RSRQ]

Reference Signal Received Quality (RSRQ) is defined as the ratio N×RSRP/(E-UTRA carrier RSSI) (i.e., E-UTRA carrier RSSI vs N×RSRP), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI) may include the linear average of the total received power (in [W]) observed only in OFDM symbols containing reference symbols for antenna port 0, in the measurement bandwidth, over N number of resource blocks by the UE from all sources (including co-channel serving and non-serving cells), channel interference, thermal noise, and the like. In the case that higher layer signaling indicates certain subframes for performing RSRQ measurements, the RSSI may be measured over all OFDM symbols in the indicated subframes.

The reference point for the RSRQ shall be the antenna connector of the UE.

In the case that receiver diversity is in use by the UE, the reported value shall not be lower than the corresponding RSRQ of any of the individual diversity branches.

[RSSI]

RSSI may correspond to the received wide band power including thermal noise and noise generated in a receiver within the bandwidth defined by the receiver pulse shaping filter.

The reference point for the measurement shall be the antenna connector of the UE.

In the case that receiver diversity is in use by the UE, the reported value shall not be lower than the corresponding UTRA carrier RSSI of any of the individual received antenna branches.

According to the definition, a UE operating in the LTE system may be allowed to measure RSRP in a bandwidth corresponding to one of 6, 15, 25, 50, 75, and 100 RB (resource block), through information element (IE) in relation to a measurement bandwidth transmitted in system information block type 3 (SIB3) in the case of an Intra-frequency measurement, and through an allowed measurement bandwidth transmitted in system information block type 5 (SIB5) in the case of an Inter-frequency measurement. Alternatively, in the case that the IE is not existed, the UE may measure in a frequency band of the whole DL system as default. At this time, in the case that the UE receives the allowed measurement bandwidth, the UE may regard the corresponding value as the maximum measurement bandwidth and may measure RSRP value freely within the corresponding bandwidth/value. However, in order for a serving cell to transmit the IE defined as wideband (WB)-RSRQ and configure the allowed measurement bandwidth to be 50 RBs or more, the UE shall calculate the RSRP value for the whole allowed measurement bandwidth. Meanwhile, the RSSI may be measured in the frequency band that a receiver of the UE has according to the definition of the RSSI bandwidth.

Figure 14:
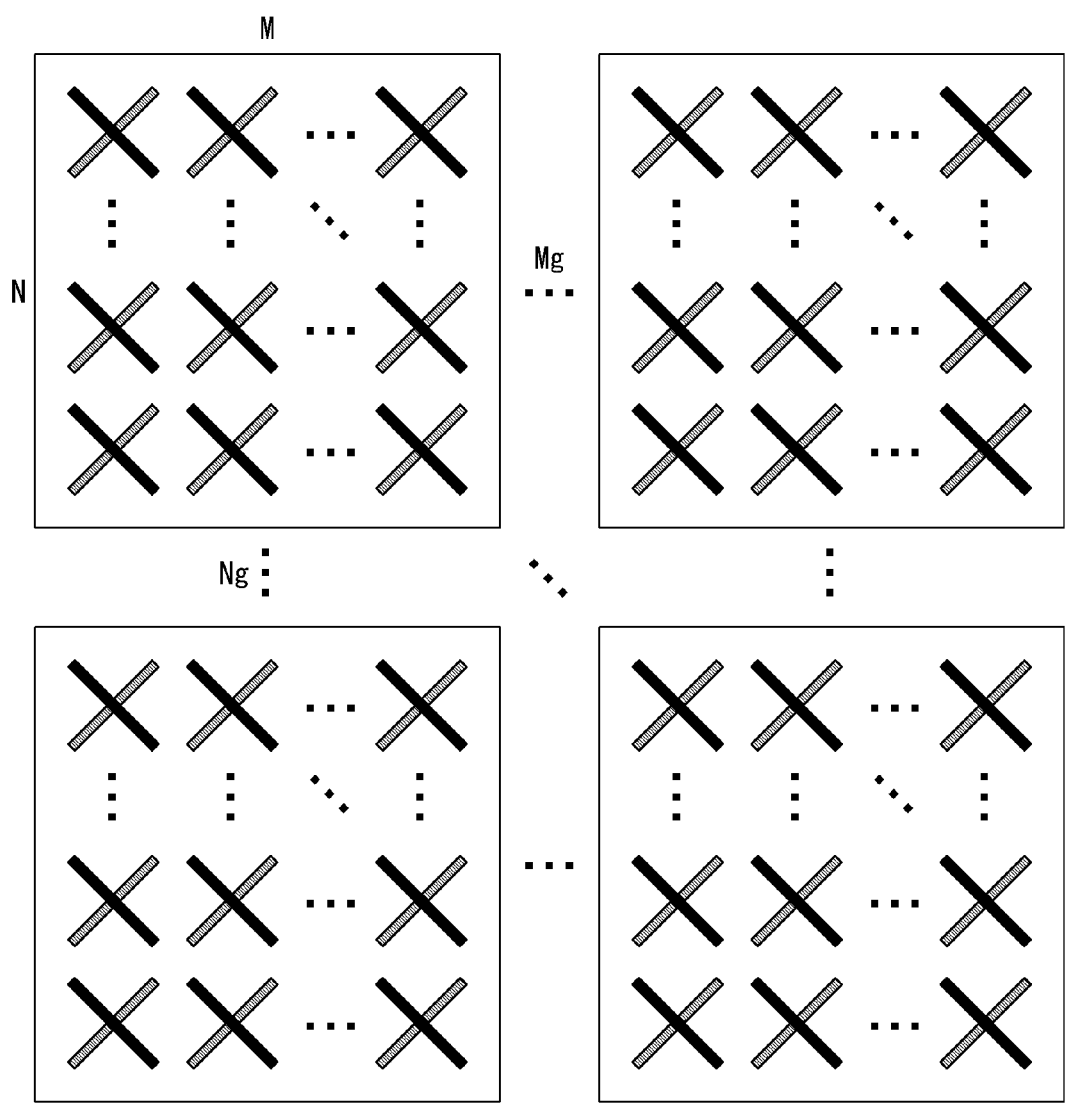
FIG. 14 illustrates a panel antenna array to which the present invention may be applied.

FIG. 14 illustrates a panel antenna array to which the present invention may be applied.

Referring to FIG. 14, a panel antenna array includes Mg number of panels in a horizontal domain and Ng number of panels in a vertical domain, and one panel may include M columns and N rows. Particularly, in this drawing, a panel is shown based on cross polarization (X-pol) antenna. Accordingly, the total number of antenna elements may be 2*M*N*Mg*Ng.

Proposal of New Codebook

Hereinafter, a new codebook design for UL procoding is proposed in an environment like New RAT. In addition, additionally, UL codebook subset restriction is also proposed.

As shown in FIG. 14, a multi panel function is supported in New RAT, but in the present disclosure, a codebook design is proposed by considering a single panel preferentially for the convenience of description.

The 2D Discrete Fourier Transform beam may be defined as Equation 14, which may be applied to 2D antenna array in a single panel.

$$w_{m_1,m_2} = \frac{v_{m_1} \otimes u_{m_2}}{\sqrt{N_1 N_2}} \quad \text{[Equation 14]}$$

$$V_{m_1} = \left[1 \ \exp\left(j\frac{2\pi m_1}{o_1 N_1}\right) \ \ldots \ \exp\left(j\frac{2\pi m_1(N_1-1)}{o_1 N_1}\right)\right]^T$$

$$u_{m_2} = \left[1 \ \exp\left(j\frac{2\pi m_2}{o_2 N_2}\right) \ \ldots \ \exp\left(j\frac{2\pi m_2(N_2-1)}{o_2 N_2}\right)\right]^T$$

Herein, m1 and m2 correspond to 1D-DFT codebook indices of the first and second domains, respectively. In addition, N1 and N2 correspond to the number of antenna ports for each polarization of the first dimension and the second dimension in a panel, respectively, and o1 and o2 correspond to oversampling factors of the first dimension and the second dimension in a panel, respectively.

The codebook proposed as in Equation 14 follows the dual stage structure as represented in Equation 15.

$$W = W_1 W_2 \quad \text{[Equation 15]}$$

Herein, W1 (a first PMI) represents the property of long-term/wideband, and performs the role of beam grouping and/or wideband power control for each beam, mainly. W2 (a second PMI) represents the property of short-term/subband, and performs the role of beam selection in a beam group selected by W1 and co-phasing for each polarization of the antenna ports having cross polarization.

Table 5 exemplifies LTE UL codebook for transmission on antenna ports {20, 21}

TABLE 5

| Codebook index | Number of layers $\upsilon = 1$ | Number of layers $\upsilon = 2$ |
|---|---|---|
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | — |
| 2 | $\frac{1}{\sqrt{2}}\begin{bmatrix} 1 \\ j \end{bmatrix}$ | — |
| 3 | $\frac{1}{\sqrt{2}}\begin{bmatrix} 1 \\ -j \end{bmatrix}$ | — |
| 4 | $\frac{1}{\sqrt{2}}\begin{bmatrix} 1 \\ 0 \end{bmatrix}$ | — |
| 5 | $\frac{1}{\sqrt{2}}\begin{bmatrix} 0 \\ 1 \end{bmatrix}$ | — |

Table 6 exemplifies LTE UL codebook for transmission on antenna ports {40, 41, 42, 43} with v=1.

TABLE 6

| Codebook index | Number of layers $\upsilon = 1$ |
|---|---|
| 0-7 | $\frac{1}{2}\begin{bmatrix} 1 \\ 1 \\ 1 \\ -1 \end{bmatrix}$ $\frac{1}{2}\begin{bmatrix} 1 \\ 1 \\ j \\ j \end{bmatrix}$ $\frac{1}{2}\begin{bmatrix} 1 \\ 1 \\ -1 \\ 1 \end{bmatrix}$ $\frac{1}{2}\begin{bmatrix} 1 \\ 1 \\ -j \\ -j \end{bmatrix}$ $\frac{1}{2}\begin{bmatrix} 1 \\ j \\ 1 \\ j \end{bmatrix}$ $\frac{1}{2}\begin{bmatrix} 1 \\ j \\ j \\ 1 \end{bmatrix}$ $\frac{1}{2}\begin{bmatrix} 1 \\ j \\ -1 \\ -j \end{bmatrix}$ $\frac{1}{2}\begin{bmatrix} 1 \\ j \\ -j \\ -1 \end{bmatrix}$ |
| 8-15 | $\frac{1}{2}\begin{bmatrix} 1 \\ -1 \\ 1 \\ 1 \end{bmatrix}$ $\frac{1}{2}\begin{bmatrix} 1 \\ -1 \\ j \\ -j \end{bmatrix}$ $\frac{1}{2}\begin{bmatrix} 1 \\ -1 \\ -1 \\ -1 \end{bmatrix}$ $\frac{1}{2}\begin{bmatrix} 1 \\ -1 \\ -j \\ j \end{bmatrix}$ $\frac{1}{2}\begin{bmatrix} 1 \\ -j \\ 1 \\ -j \end{bmatrix}$ $\frac{1}{2}\begin{bmatrix} 1 \\ -j \\ j \\ -1 \end{bmatrix}$ $\frac{1}{2}\begin{bmatrix} 1 \\ -j \\ -1 \\ j \end{bmatrix}$ $\frac{1}{2}\begin{bmatrix} 1 \\ -j \\ -j \\ 1 \end{bmatrix}$ |
| 16-23 | $\frac{1}{2}\begin{bmatrix} 1 \\ 0 \\ 1 \\ 0 \end{bmatrix}$ $\frac{1}{2}\begin{bmatrix} 1 \\ 0 \\ -1 \\ 0 \end{bmatrix}$ $\frac{1}{2}\begin{bmatrix} 1 \\ 0 \\ j \\ 0 \end{bmatrix}$ $\frac{1}{2}\begin{bmatrix} 1 \\ 0 \\ -j \\ 0 \end{bmatrix}$ $\frac{1}{2}\begin{bmatrix} 0 \\ 1 \\ 0 \\ 1 \end{bmatrix}$ $\frac{1}{2}\begin{bmatrix} 0 \\ 1 \\ 0 \\ -1 \end{bmatrix}$ $\frac{1}{2}\begin{bmatrix} 0 \\ 1 \\ 0 \\ j \end{bmatrix}$ $\frac{1}{2}\begin{bmatrix} 0 \\ 1 \\ 0 \\ -j \end{bmatrix}$ |

Table 7 exemplifies LTE UL codebook for transmission on antenna ports {40, 41, 42, 43} with v=2.

TABLE 7

| Codebook index | Number of layers $\upsilon = 2$ |
|---|---|
| 0-3 | $\frac{1}{2}\begin{bmatrix} 1 & 0 \\ 1 & 0 \\ 0 & 1 \\ 0 & -j \end{bmatrix}$ $\frac{1}{2}\begin{bmatrix} 1 & 0 \\ 1 & 0 \\ 0 & 1 \\ 0 & j \end{bmatrix}$ $\frac{1}{2}\begin{bmatrix} 1 & 0 \\ -j & 0 \\ 0 & 1 \\ 0 & 1 \end{bmatrix}$ $\frac{1}{2}\begin{bmatrix} 1 & 0 \\ -j & 0 \\ 0 & 1 \\ 0 & -1 \end{bmatrix}$ |
| 4-7 | $\frac{1}{2}\begin{bmatrix} 1 & 0 \\ -1 & 0 \\ 0 & 1 \\ 0 & -j \end{bmatrix}$ $\frac{1}{2}\begin{bmatrix} 1 & 0 \\ -1 & 0 \\ 0 & 1 \\ 0 & j \end{bmatrix}$ $\frac{1}{2}\begin{bmatrix} 1 & 0 \\ j & 0 \\ 0 & 1 \\ 0 & 1 \end{bmatrix}$ $\frac{1}{2}\begin{bmatrix} 1 & 0 \\ j & 0 \\ 0 & 1 \\ 0 & -1 \end{bmatrix}$ |
| 8-11 | $\frac{1}{2}\begin{bmatrix} 1 & 0 \\ 0 & 1 \\ 1 & 0 \\ 0 & 1 \end{bmatrix}$ $\frac{1}{2}\begin{bmatrix} 1 & 0 \\ 0 & 1 \\ 1 & 0 \\ 0 & -1 \end{bmatrix}$ $\frac{1}{2}\begin{bmatrix} 1 & 0 \\ 0 & 1 \\ -1 & 0 \\ 0 & 1 \end{bmatrix}$ $\frac{1}{2}\begin{bmatrix} 1 & 0 \\ 0 & 1 \\ -1 & 0 \\ 0 & -1 \end{bmatrix}$ |

TABLE 7-continued

| Codebook index | Number of layers $v = 2$ |
|---|---|
| 12-15 | $\frac{1}{2}\begin{bmatrix} 1 & 0 \\ 0 & 1 \\ 0 & 1 \\ 1 & 0 \end{bmatrix}$ $\frac{1}{2}\begin{bmatrix} 1 & 0 \\ 0 & 1 \\ 0 & -1 \\ 1 & 0 \end{bmatrix}$ $\frac{1}{2}\begin{bmatrix} 1 & 0 \\ 0 & 1 \\ 0 & 1 \\ -1 & 0 \end{bmatrix}$ $\frac{1}{2}\begin{bmatrix} 1 & 0 \\ 0 & 1 \\ 0 & -1 \\ -1 & 0 \end{bmatrix}$ |

Table 8 exemplifies LTE UL codebook for transmission on antenna ports {40, 41, 42, 43} with v=3.

TABLE 8

| Codebook index | Number of layers $v = 3$ |
|---|---|
| 0-3 | $\frac{1}{2}\begin{bmatrix} 1 & 0 & 0 \\ 1 & 0 & 0 \\ 0 & 1 & 0 \\ 0 & 0 & 1 \end{bmatrix}$ $\frac{1}{2}\begin{bmatrix} 1 & 0 & 0 \\ -1 & 0 & 0 \\ 0 & 1 & 0 \\ 0 & 0 & 1 \end{bmatrix}$ $\frac{1}{2}\begin{bmatrix} 1 & 0 & 0 \\ 0 & 1 & 0 \\ 1 & 0 & 0 \\ 0 & 0 & 1 \end{bmatrix}$ $\frac{1}{2}\begin{bmatrix} 1 & 0 & 0 \\ 0 & 1 & 0 \\ -1 & 0 & 0 \\ 0 & 0 & 1 \end{bmatrix}$ |
| 4-7 | $\frac{1}{2}\begin{bmatrix} 1 & 0 & 0 \\ 0 & 1 & 0 \\ 0 & 0 & 1 \\ 1 & 0 & 0 \end{bmatrix}$ $\frac{1}{2}\begin{bmatrix} 1 & 0 & 0 \\ 0 & 1 & 0 \\ 0 & 0 & 1 \\ -1 & 0 & 0 \end{bmatrix}$ $\frac{1}{2}\begin{bmatrix} 0 & 1 & 0 \\ 1 & 0 & 0 \\ 1 & 0 & 0 \\ 0 & 0 & 1 \end{bmatrix}$ $\frac{1}{2}\begin{bmatrix} 0 & 1 & 0 \\ 1 & 0 & 0 \\ -1 & 0 & 0 \\ 0 & 0 & 1 \end{bmatrix}$ |
| 8-11 | $\frac{1}{2}\begin{bmatrix} 0 & 1 & 0 \\ 1 & 0 & 0 \\ 0 & 0 & 1 \\ 1 & 0 & 0 \end{bmatrix}$ $\frac{1}{2}\begin{bmatrix} 0 & 1 & 0 \\ 1 & 0 & 0 \\ 0 & 0 & 1 \\ -1 & 0 & 0 \end{bmatrix}$ $\frac{1}{2}\begin{bmatrix} 0 & 1 & 0 \\ 0 & 0 & 1 \\ 1 & 0 & 0 \\ 1 & 0 & 0 \end{bmatrix}$ $\frac{1}{2}\begin{bmatrix} 0 & 1 & 0 \\ 0 & 0 & 1 \\ 1 & 0 & 0 \\ -1 & 0 & 0 \end{bmatrix}$ |

Table 9 exemplifies LTE UL codebook for transmission on antenna ports {40, 41, 42, 43} with v=4.

TABLE 9

| Codebook index | Number of layers $v = 4$ |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

NR may support that a UE may report the capability for a maximum space layer numbers (N) for UL transmission.

In addition, NR supports UL codebook for a UE based on the reported performance, and at least one of the followings may be supported.

Alt1: A network configures multiple codebooks corresponding to the number of antenna ports, respectively.
Alt2: A network configures scalable/nested codebook that supports variable number of antenna ports.
Alt3: A network configures a codebook which is the same as a UE capability.
Alt4: A UE recommends a subset of codebook(s). This Alt may be included in at least one of the Alts described above.
A codebook corresponding to TX antenna ports of a given number may be fixed to a specific codebook or configurable.

As a UL codebook structure, at least one of two types may be supported.

Alt 0: A single-state codebook
Alt 1: A dual-state codebook

When a UL codebook is designed, reuse of LTE codebook, influence on multiple-panel, and the like shall be considered.

In NR, as a waveform for UL, both of Cyclic Prefix Orthogonal Frequency Division Multiplexing (CP-OFDM) and DFTs-OFDM may be used. Since a waveform like DFTs-OFDM is considered in LTE, it is main design purpose to reduce peak-to-average power ratio (PAPR) considering single carrier property. As a result, in LTE, a codebook having the property of cubic metric preserving is used. Such a codebook has a property that the layer power summation for each port is configured to be the same for rank>1 and a codeword (e.g., non-coherent/partial) is included, which may turn-off (or non-select/non-activate) a specific antenna port (an antenna element in some cases, but hereinafter, commonly referred to 'port', for the convenience of description) for rank=1.

The present invention proposes a UL codebook construction/configuration/application scheme that may be applied to a new wireless communication system.

Figure 15:
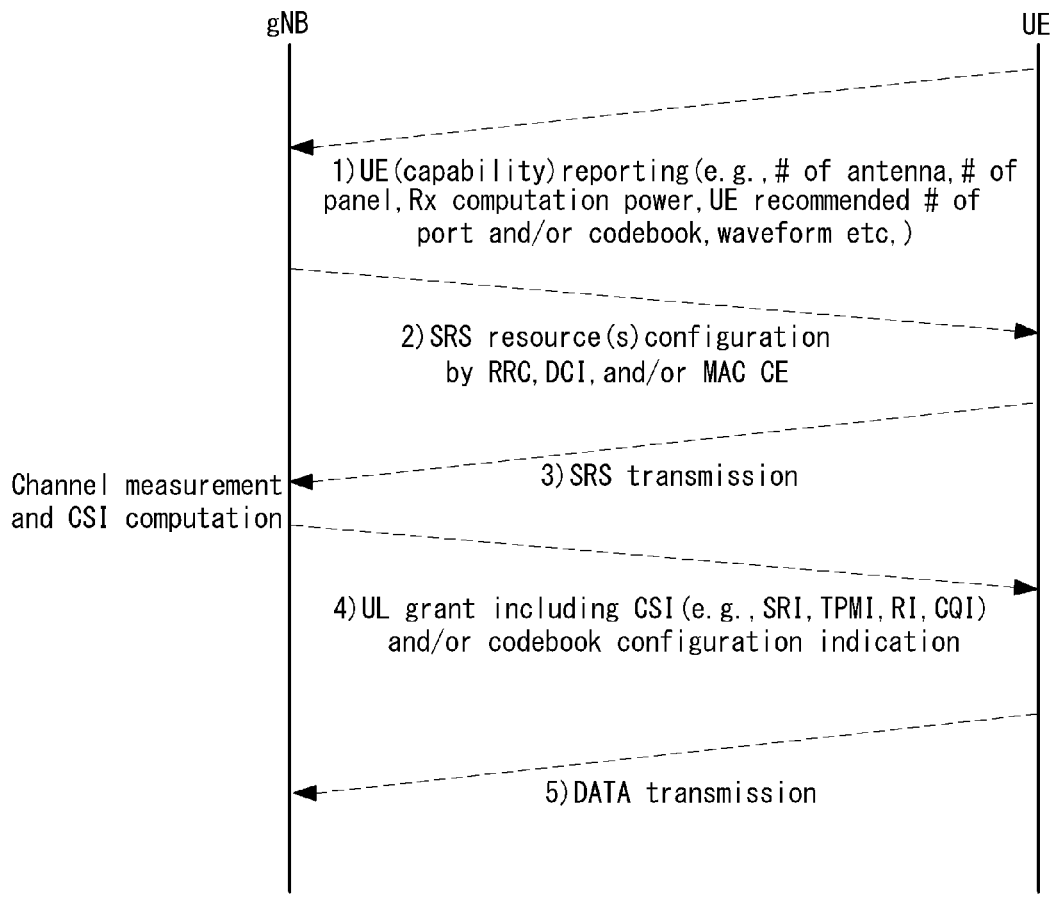
FIG. 15 illustrates a schematic UL data transmission process between a UE and a gNB which may be applied to the present invention.

Before describing this, referring to FIG. 15, a schematic UL data transmission process is described between a UE and a gNB.

FIG. 15 illustrates a schematic UL data transmission process between a UE and a gNB which may be applied to the present invention.

1) A UE performs a (performance) report for Sounding Reference Signal (SRS) transmission/codebook configuration of the UE. At this time, the information that the UE is able to report may include the (maximum) number of antenna ports in a panel (or port group), the number of panel (or port group, hereinafter, commonly called 'panel'), Rx computation power (e.g., whether it is able to compute a complex codebook like DL type II codebook, or whether to support non-linear precoding, etc.), the number of UE recommended ports for SRS transmission and/or codebook, waveform information (e.g., information on whether it is CP-OFDM or DFTs-OFDM) and/or whether to transmit multi-panel, and the like.

2) The gNB may indicate information of SRS resource(s) configuration to the UE using Radio Resource Control (RRC), DCI and/or MAC CE, and so on using the information reported from the UE. In this case, the information of SRS resource(s) configuration may include the number (N) of SRS resources, the number of transport ports (x_i) (i=0, . . . , N−1) of i-th SRS and/or analog beamforming information of each SRS resource, and the like.

3) The UE transmits an SRS to the gNB using the information of the SRS configuration received from the gNB.

4) The gNB may perform channel measurement and/or CSI computation (SRS Resource Indicator (SRS), CQI, RI, Transmitted Precoding Matrix Indicator (TPMI), etc.) using the SRS transmitted from the UE, and inform the information, MCS and/or UL power information, and the like to the UE through UL grant, and the like. At this time, even in the case that the gNB receives the SRS through X-port, the gNB may inform the information of MCS and TMPI/RI and so on, which is calculated using Y-port TMPI/RI.

5) The UE may perform UL data transmission using the received information. In the case that the UE is provided with multiple panels (or antenna port group, hereinafter, commonly called 'panel'), the factors that should be considered for a codebook design are as follows:

The number of panel supported in UL codebook

The number of supported ports for each panel

Whether the UE is able to have different number of ports for each panel

In the case that a codebook is designed by considering all of the parameters, a codebook design may become very difficult. Accordingly, the present invention proposes a codebook design assuming a single panel (defined as a group of ports of which signal-to-interference-plus-noise ratio (SINR) is similar, hereinafter, commonly called 'panel'). Each panel may be tied/linked with an SRS resource, and the number of antenna ports in each panel may be tied/linked with the number of SRS ports in each SRS resource.

Accordingly, a panel selection may be performed by a single SRI indication received from the gNB. In this case, the PMI/RI/MCS corresponding to the number of SRS-ports of the indicated SRI may be indicated to the UE. In the case that a plurality of (candidate) codebooks is indicated in UL, the gNB may also indicate the codebook configuration to the UE. And/or, in the case that the codebook proper to CP-OFDM, that is a default waveform, and the codebook proper to DFTs-OFDM are designed differently, the UE may indicate the waveform to use and the codebook corresponding to the waveform to the UE additionally, by considering the measured channel interference, and the like. And/or using the indicated MCS (SINR or CQI) information, the UE (e.g. /i.e., a UE of which geometry is bad) of which MCS (SINR or CQI) is a specific threshold or less may operate based on DFTs-OFDM, and may use the proper codebook.

Hereinafter, the case that the gNB indicates M (M>1) SRS resources to the UE is described. In this case, the gNB may indicate a plurality of SRIs explicitly to the UE with a scheme like a bitmap, or may indicate using M SRS (resource) paring/grouping selected among N configured SRSs (resources) implicitly to the UE.

For example, the case that the number of indicated SRS resources is 2 (M=2) is described. At this time, it is assumed that each resource is provided with $X_i$ (i=0, 1) SRS-ports, respectively, as described below.

Configured SRS resource 0 ($X_0$-port) for Panel 0,
Configured SRS resource 1 ($X_1$-port) for Panel 1

At this time, the UE may$_{recommend}$ the port number, and the like represented by $X_0$, $X_1$ to the gNB (e.g., when reporting performance). In the case that two SRS resources are configured/applied to the UE, the UE may identify that two panels are used, and calculate final PMI by configuring multiple panel codebook. In the case that the port numbers of $X_0$ and $X_1$ are the same, the final codebook $$\begin{bmatrix} v_0 \\ v_1 \end{bmatrix}$$

where $v_i \in C^{X_i \times 1}$ (i=0,1), $v_i^H v_i = 1$ may be configured using PMI (i.e., $v_0$, $v_1$ for rank 1) indicated for each resource in the same codebook.

For the case of panel configuration of the UE, in order to transmit/receive a signal in all directions, the configuration (e.g., in the case that there are two UE antenna panels) oriented opposite directions may be considered. In this case, since a direction toward the gNB, angle of departure (AoD), Angle of Arrival (AoA), zenith of departure angle (ZoD) and/or latency may be changed, a panel correction becomes required additionally. Such a panel correction term may be represented as $\gamma = \alpha \exp(j\theta)$. Herein, $\alpha$ (e.g., $\alpha \in \{1, \sqrt{0.5}, \sqrt{0.25}, 0\}$) may represent an amplitude and $\theta$ (e g QPSK or 8PSK) may represent a phase, and the gNB may indicate the information to the UE additionally. At this time, for the convenience of signaling, for example, the gNB may indicate the SRS resource configured $0^{th}$ order may be assumed to be a reference resource, and only the phase and/or the amplitude information $\gamma = \alpha \exp(j\theta)$ for the SRS resource configured first order to the UE. In this case, the final codebook may be configured in the form of $$\begin{bmatrix} v_0 \\ \gamma v_1 \end{bmatrix}.$$

For rank 2, the final codebook may be configured as $$\begin{bmatrix} v_0 & v_0 \\ \gamma v_1 & -\gamma v_1 \end{bmatrix}.$$

Alternatively, the final codebook is configured as $$\begin{bmatrix} V_0^{(2)} \\ \gamma V_1^{(2)} \end{bmatrix}$$

where $V_i^{(2)} \in C^{X_i \times 2}$ (i=0, 1), and in this case, it is preferable that $V_i^{(2)}$ is orthogonal with each other for each layer. The codebook is represented as a codebook in which normalization is not performed, and in the case that column normalization is performed, $$\frac{1}{\sqrt{1+\gamma^2}}$$

may be multiplied to the codebook. For example, rank 2 of LTE DL codebook may be applied.

The scheme is a structure of using the same co-phase for each layer/each panel, and accordingly, performance degradation is anticipated. Accordingly, the present invention proposes to configure channel correction term $\gamma_i = \alpha \exp(j\theta_i)$ (i=0, 1) independently for each layer in order to support rank 2. $\lambda_i$ includes phase and/or amplitude information. The channel correction term is to be applied to a WB only, and payload may be reduced to the maximum. Alternatively, the channel correction term is to be applied to an SB, and performance may be maximized. Alternatively, the amplitude and phase components may be applied with being separated by WB/SB (or SB/WB). Alternatively, the bit numbers corresponding to WB and SB is differently allocated/configured (e.g., WB=2 bit, SB=1 bit), the payload size and the performance may be balanced.

$$\begin{bmatrix} v_{00}^{(2)} & v_{01}^{(2)} \\ \gamma_0 v_{10}^{(2)} & \gamma_1 v_{11}^{(2)} \end{bmatrix} \quad \text{[Equation 16]}$$

where $$V_i^{(2)} = [v_{i0}^{(2)} \quad v_{i1}^{(2)}] \in C^{X_i \times 2} \ (i=0, 1)$$

In the case of the design according to Equation 16, there is a problem that the panel correction term is increased as the layer increases. In order to solve it, a transmission is performed based on CoMP operation such as coherent and/or non-coherent joint transmission (JT), and the like, the scheme of restricting a transmission rank to 2 may be proposed. Alternatively, in the case of a codebook used in a transmission based on the CoMP operation such as coherent and/or non-coherent JT, similar to 'LTE DL Class A codebook Config 1', a codebook design may be limited to configure rank 2 with only a combination of identical beams. In this case, regardless of rank 1 and rank 2, a panel correction term, $\gamma=\alpha \exp(j\theta)$ may be used.

Rank 1 and rank 2 structures of codebook config 1 are as represented in Equation 17 below.

$$\text{Rank 1:} \quad \begin{bmatrix} v_0 \\ \phi_n v_0 \end{bmatrix}, \quad \text{[Equation 17]}$$

$$\text{Rank 2:} \quad \begin{bmatrix} v_0 & v_0 \\ \phi_n v_0 & -\phi_n v_0 \end{bmatrix}$$

In the case that a codebook structure used in a single panel is configured with dual-stage codebook (W=W1W2) for frequency selective precoding, a correction term $\gamma=\alpha \exp(j\theta)$ for a panel may be transmitted together with W1. And/or, for the case that frequency selectivity is great for each SB, $\gamma=\alpha \exp(j\theta)$ may be transmitted together with W2. And/or, for an efficient TMPI indication, an amplitude may be indicated by W1 (WB or partial band (PB) unit), and a phase may be indicated by W2 (SB unit).

The scheme described above may also be applied to periodic and semi-permanent transmission as well as aperiodic (based on UL grant) transmission. In addition, the proposed scheme is described mainly with UL codebook, but it is apparent that the scheme may also be identically/similarly configured/applied to DL codebook provided with multiple-panel.

In the case that a gNB indicates the SRI, MCS and/or TMPI+RI with a UL grant, the following options may be considered.

1. DCI payload varying according to the # of SRS resource(s)): As an example of the two configured SRS described above, the following options may be considered.

1-A: (SRI=0)+(TPMI0)+(SRI=1)+(TPMI1)+MCS (e.g., CQI-based)+RI: In the case of the method, the CQI is calculated by considering a single aggregated TPMI (TPMI0+TPMI1) considering multiple-panel (in this case, the proposed panel correction PMI may be additionally considered), and based on this, MCS may be calculated. As a representative use case, non-coherent JT (or coherent JT, in the case that panel correction PMI is additionally considered) may be considered.

1-B. (SRI=0)+(SRI=1)+TPMI+MCS (e.g., CQI-based)+RI: In the case of the method, the CQI is calculated by selecting/applying TPMI in the codebook that corresponds to a single aggregated SRS port number considering multiple-panel (a plurality of port groups), and based on this, MCS may be calculated. As a representative use case, coherent JT may be considered.

1-C. (SRI=0+TPMI0+RI0+MCS0 (corresponding to SINR0))+(SRI=1+TPMI1+RI1+MCS1 (corresponding to SINR1)): In the case of the method, the MCS may be calculated for each resource. For this, the gNB indicates the calculated MCS0 to the UE by using TPMI0 corresponding to a reference SRS resource, and MCS1 may be indicated to the UE by using differential MCS that represents a difference between SINR and SINR0 when the aggregated TPMI is used. At this time, RI may also be configured/indicated by reference RI and differential RI similar to the MCS, and only one full RI may be configured/indicated as in 1-A case.

2. Common DCI size: In the case of the method, the DCI size for SRI, MCS and/or TPMI/RI indication may be set to a maximum value, for example, may be configured/indicated as the format such as (joint encoding of two SRI indications)+(joint encoding of two TMPI indications)+MCS+RI+ additional TPMI (e.g., ($\gamma=\alpha \exp(j\theta)$)).

In the case that a plurality of SRIs is used as described in the method, the SRI field may be configured as represented in Table 10, for example. Table 10 represents a configuration example of 2-bit SRI field, and it is assumed that (SRS resources 1, 2, 3 and 4) are existed as the configurable SRS resource.

TABLE 10

| State | SRS resources number |
|-------|---------------------|
| 00    | 1                   |
| 01    | 1, 2                |
| 10    | 1, 3                |
| 11    | 1, 2, 3, 4          |

In Table 10, it is assumed to use 2-bit SRI, herein, state "00" corresponds to the most preferred SRS resource or a single selection corresponding to the most preferred panel, state "01" or "10" corresponds to a sub set of the whole SRS resource set in which two preferred SRS resource is transmitted cooperatively such as non-coherent/coherent JT, and the like, and state "11" corresponds to the whole SRS resource in which all of the configured SRS resource is transmitted cooperatively such as non-coherent/coherent JT, and the like.

In the case that each state is used only for the use of a specific resource selection, each state may be configured/applied with only a single value of the configured/selected resource as represented in Table 11.

TABLE 11

| State | SRS resources number |
|-------|---------------------|
| 00    | 1                   |
| 01    | 2                   |
| 10    | 3                   |
| 11    | 4                   |

The information of the SRS resource selection corresponding to the state may be configured/applied by using MAC CE, and the like. In the case that a plurality of SRS resources is configured to the UE, a size of TPMI may be variably configured/applied according to the configured SRS resource.

As described above, the UL DCI format configured/applied according to the number of SRS resources (and/or state of the SRI field) indicated through the SRI field may be exemplified as below, and this may be linked/tied with the indicated SRS or may be linked/tied with the SRI by separate signaling. And/or at least a part of the information signaled by the UL DCI format may be indicated by separate signaling.

1. UL DCI Format Example 1

UL DCI format 0 (maximum 30 bits)—the case that a single SRS resource (for the use of obtaining UL CSI, for example, regardless of the SRS resource(s) configured as the use of UL beam management (and/or for the use of DL CSI measurement) is configured Single TPMI field (4 bits),
Singe TRI field (2 or 3 bits),
RA, and/or
UL MCS, etc.

In this case, the TPMI and the TRI may be joint-encoded.

2. UL DCI Format Example 2

UL DCI format 1 (maximum 50 bits)—the case that a plurality of SRS resources is configured A plurality of TPMIs+TRI fields (e.g., 4×N bits) (here, N may be the number of configured SRS resources (e.g., for the use of obtaining UL CSI))

<Case 1>—WB TPMI for Each SRS Resource+a Single Additional WB TPMI (e.g., $\gamma=\alpha \, Exp(j\theta)$) for TRI and/or Inter-Panel Correction Case 1 is configured/indicated with each WB TPMI+TRI in accordance with the number of ports in the configured SRS resource, and corresponds to the case that the TPMI like the panel co-phase and the like described above is additionally configured/indicated in WB unit so as to be used for non-coherent/coherent JT, and the like.

<Case 1a>—WB TPMI for Each SRS Resource+TRI+ (TPMIs of SB Unit for Inter-Panel Co-Phase)

Case 1a is configured with each WB TPMI+TRI in accordance with the number of ports in the configured SRS resource, and represents the case that the TPMI like the panel co-phase and the like described above is additionally configured/indicated in SB unit (frequency selective precoding) so as to be used for non-coherent/coherent JT, and the like. In the case that the panel co-phase is configured with 'SB unit', more accurate panel correction may be performed, but greater TPMI field size is required.

<Case 2>—TRI+a Single WB TPMI+Multiple SB TPMIs

Case 2 corresponds to a dual stage codebook (e.g., the case that it operates like the dual stage codebook by grouping based on a specific property in LTE DL Class A codebook and single stage codebook (described below). Particularly, Case 2 is configured with a single WB TPMI in accordance with the whole number of ports in the configured SRS resource, and corresponds to the case that each TPMI for each SB is configured/indicated. Case 2 is proper to the case in which each SRS resource or panel is well calibrated like coherent JT.

<Case 3>—WB TPMI for Each SRS Resource+TRI+(a Single TPMI for Inter-Panel Co-Phase)+Multiple SB TPMIs for a Selected SRS Resource (Preselected by RRC or MAC CE or Selected by SRI of the Lowest Index)

Case 3 corresponds to the case of configuring WB TPMI for each resource and the corresponding additional TPMI (panel corrector). A performance may be maximized when it is configured/applied with SB unit as in case 1a or case 2, but configuration of additional TPMI corresponding to the SB needs to be applied, and accordingly, payload may be increased. Accordingly, it is proposed that cooperative transmission is performed only for the WB in a situation like non-coherent JT, and SB TPMI is transmitted only for a specific SRS resource (or panel) preconfigured, recommended by the UE or configured by RRC, MAC CE, and the like or the SRS resource (or panel) corresponding to the SRI of the lowest index.

Figure 16:
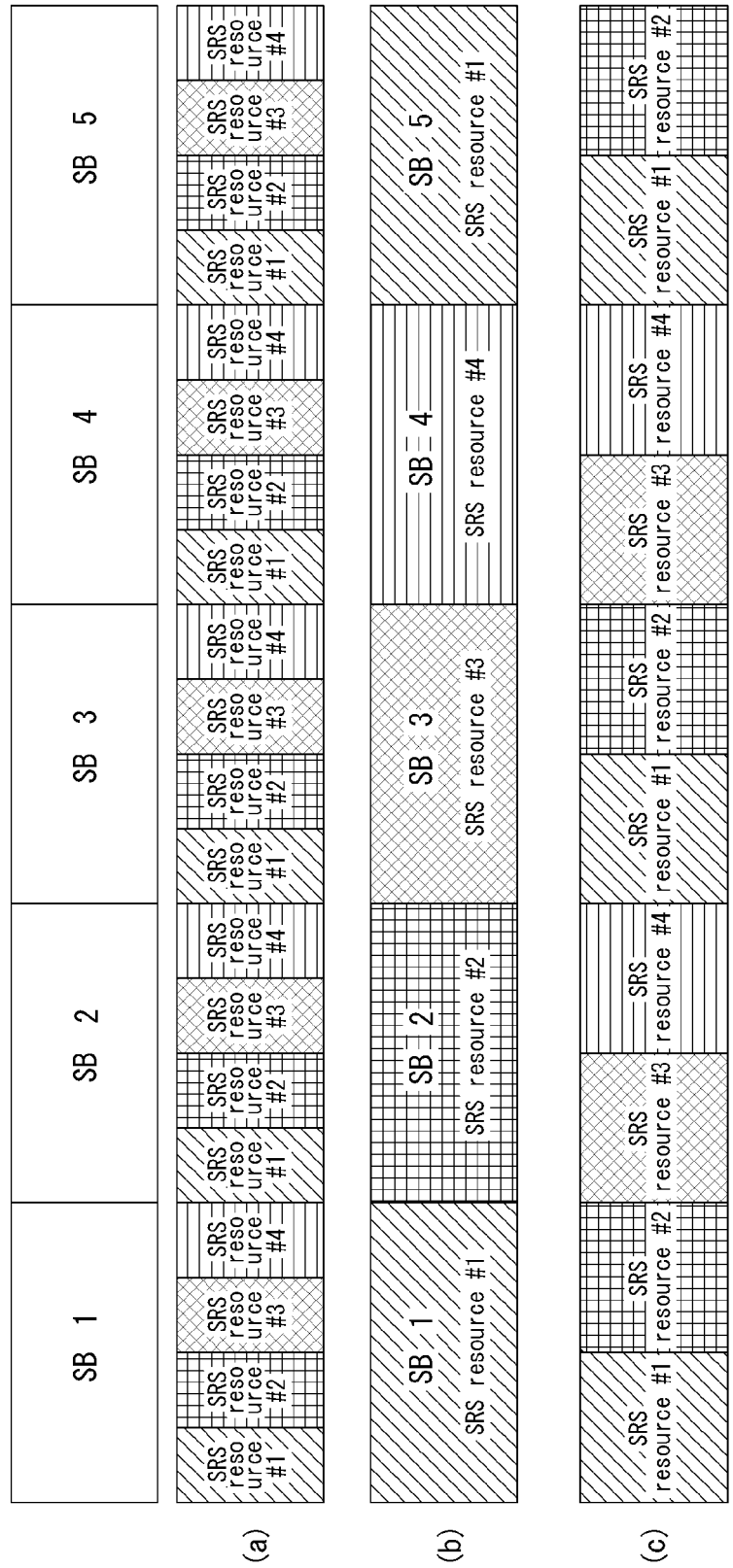
FIG. 16 is a diagram illustrating SB TPMI allocation according to an embodiment of the present invention.

<Case 3a>—WB TPMI for Each SRS Resource+TRI+(a Single TPMI for Inter-Panel Co-Phase)+Multiple SB TPMIs for Selected Multiple SRS Resources FIG. 16 is a diagram illustrating SB TPMI allocation according to an embodiment of the present invention.

Case 3a corresponds to the case of configuring the WB TPMI and the corresponding additional TPMI (panel corrector) for each resource in the dual stage codebook structure. In order not to increase the TPMI for panel co-phase in SB unit, it may configured/applied so as to divide SB into a plurality of sub SBs and correspond to different resources for each sub SB, and to transmit the SB TPMI (for reflecting the SB TPMI uniformly for each resource), and this corresponds to FIG. 16(a). As shown in FIG. 16(a), all of four SRS resources (SRS resources #1 to #4) are transmitted in each SB.

FIG. 16(b) shows an embodiment of mapping SRS resource for each SB index and transmitting SB TPMI. As shown in FIG. 16(b), in the case that the number SBs is greater than the number of SRS resources, first, SB indices and SRS resource indices are 1:1 mapped in an ascending order, but the SRS resources having the resultant value obtained through modular operation between the mapping target index and the number of SRS resources as their indices may be mapped to the remaining SBs, which are not mapped, and the SB TPMI may be transmitted (e.g., in the case of the embodiment of FIG. 16(b), SRS resource #1 is transmitted).

FIG. 16(c) corresponds to an embodiment that an SB is allocated with a specific number of sub groups (e.g., 2, this is configurable), and in the case that the number of SRS resources is greater than the number of sub groups (fourth row in the example), the TPMI is transmitted throughout consecutive SBs. Even in this case, in order to transmit the TPMI to the whole SBs uniformly, the SB having an index exceeding (the number of SRS resources/the number of sub groups, 2 in the example) is mapped with the SRS resource through modular operation. For example, in the case of the embodiment of FIG. 16(c), SRS resources 1 and 2 are transmitted to SBs 1, 3, 5, and so on and SRS resources 3 and 4 are transmitted to SBs 2, 4, 6, and so on.

As another example, a method of reducing granularity of the SB may be considered. In the method, for example, in the case of the system that the number of SRS resources is 2 and a single SB is 6 RBs, it is configured/applied such that a single SB is 12 RBs, and it may be configured that the SB TPMI is transmitted in both of two panels. By configuring this, there in an advantage that payload of the SB TPMI according to multiple-panel transmission may not increase.

As another example, a method may be considered that payload size of the SB TPMI is reduced by restricting/configuring to perform codebook sub sampling or subset restriction in multiple-panel transmission. In the case of codebook sub sampling, codebook performance may be eventually degraded. Accordingly, in order to minimize the degradation, a UE may recommend such that codeword corresponding to a specific domain or direction must be included to a gNB.

As another example, it may configured/defined such that UL DCI format 1 includes at least a part of the followings.
SRI field (2 or 3 bits),
A single RI field (2 or 3 bits)/multiple RI fields (non-coherent JT case),
RA, and/or
UL MCS, etc.

In the present disclosure, several methods are proposed for TPMI (and/or RI) transmission. In the case that all of the methods or the sub set is used, the gNB may indicate a method which is actually used to the UE explicitly or implicitly through signaling.

The implicit indication method has the following embodiments:

The number of configured (or activated) SRS resources: A UE may know whether to use a specific case of DCI format 0 or 1 according to whether the configured SRS is a single SRS resource or a plurality of SRS resources implicitly.

Parameters in relation to frequency selective precoding (e.g., ON/OFF, the number of SRS ports (interpretation of a plurality of PMI fields may be changed according to whether the frequency selective precoding is automatically activated in the case that the number of ports is X-ports or more)): In the case that the number of ports is X-ports (e.g., X=4) or more, the frequency selective precoding is considered, and a promised transmission method between case 2 and case 3 in advance or a configured transmission method may be used. In the case of X-ports, it may be interpreted that a summation of all configured ports is X.

The number of layers (DMRS port) or CWs (codewords) (e.g., two of RI and MCS are transmitted, respectively, in the case of 2CWs range): Since the case that there are two MCSs is interpreted as the meaning of transmitting with non-coherent JT, the gNB may indicate a transmission method among the proposed methods 1 to 3 (premised in advance or preconfigured) to the UE implicitly. In the case of 2CWs range (e.g., for non-coherent JT, etc.) or in the case that the number of SRS resources is a specific number (promised in advance or configured) or more, payload size for the TPMI indication becomes greater, and in this case, the frequency selective precoding may be deactivated.

In the case of UL DCI format 1 described above, coherent/non-coherent JT, etc. in which a plurality of SRSs is transmitted cooperatively is described as a use case. In the case of the coherent JT, due to the influence of phase drift occurred owing to phase offset differences of UE's oscillator, when transmission timing interval for each resource is separated with a predetermined time or greater, there is a possibility that the TPMI corresponding to panel corrector (phase and/or amplitude) does not operates properly. Accordingly, in the case of performing/applying a cooperative transmission in a plurality of SRS resources for the purpose of coherent/non-coherent JT, a transmission time interval between SRS resources may be restricted within a predetermined time. In the case that this is not properly performed owing to the UE capability (e.g., non-calibrated panel), the UE may report this as capability information to the gNB. In this case, it may be limited that only a single SRS transmission is configured/applied to the corresponding UE.

The method described above is exemplified with the case that RI and PMI are commonly encoded and indicated. However, for an efficient TPMI indication of dual stage codebook like LTE DL, the method described above may also be applied to the case that RI and PMI are separately encoded.

Hereinafter, a codebook configuration method assuming a single panel is described.

First, in the case of DFTs-OFDM, it is not required to support the frequency selective precoding. Accordingly, a single stage codebook is proper. In this aspect, in designing a single stage codebook, 2-port and 4-port in LTE UE codebook may be used without any change. The case of 8-port codebook may be configured by using LTE UL 4-port codebook, and the embodiment is as below:

1. When $v_{4,i}$ is defined as a codeword having $i^{th}$ index in UL 4-port, 8-port rank 1 codebook may be configured/defined as $$v_{8,L^*i+n} = \frac{1}{\sqrt{2}} \begin{bmatrix} v_{4,i} \\ \phi_n v_{4,i} \end{bmatrix}, \phi_n = \exp\left(\frac{j2\pi n}{L}\right), n = 0, \ldots, L-1.$$

The characteristics of this codebook is that this is configured based on 4-port codebook, and more particularly, the UL 4-port is applied to 4-ports among 8-ports, and the UL 4-port codeword applies the phase-shifted codeword to the remaining 4-ports. At this time, the degree of phase rotation may be adjusted by L value. For example, when the L value is 4, the degree of phase rotation may be configured with QPSK like $\phi_n=\{1, j, -1, -j\}$ or configured with its subset (e.g., -1 or j). At this time, rank 1 codebook of 8-port may be configured with total 16*4 or 16 codebooks (in this case, this may be used for the purpose of tuning the number with the 4-port codebook size), and in the case that higher resolution is required, higher value (e.g., 8) may be set as the L value. Such an L value may be configured by the gNB to the UE.

In the case of the 8-port codebook, it is characterized that a UE implementation complexity is decreased by using the codeword the same as 4-port TPMI, and designed by using additional phase rotation value. This codebook may be identically applied to the dual-stage structure. For example, in the structure of $$W = W1W2 \left( W_1 = \begin{bmatrix} v_{4,i} & 0 \\ 0 & v_{4,i} \end{bmatrix}, W_2 = \begin{bmatrix} 1 \\ \phi_n \end{bmatrix} \right),$$

4-port codebook may be indicated with W1 and the phase rotation value may be indicated by W2. In addition, this codebook is suitable with X-pol (cross polarization) antenna structure, and the 4-port codebook may be applied to the antenna port configured with the same polarization.

In addition, since an antenna is placed in an arbitrary position in the UE, a pass loss according to the antenna port position may be changed. In order to reflect this realistically, a codebook may be configured by defining alpha, which is power control part/term except the phase term in the codebook separately. Alpha may be defined/represented as $\alpha$ (e.g., $\alpha \in \{1, \sqrt{0.5}, \sqrt{0.25}, 0\}$), and this may be used as the PMI of W1. As a result, the final codebook may be defined as Equation 18.

$$v_{8,L^*i+n} = \frac{1}{\sqrt{1+\alpha^2}} \begin{bmatrix} v_{4,i} \\ \alpha\phi_n v_{4,i} \end{bmatrix}, \quad \text{[Equation 18]}$$

2. As another method, the final codebook may be defined as Equation 19.

$$v_{8,Bi+j} = \frac{1}{\sqrt{2}} \begin{bmatrix} v_{4i} \\ v_{4,j} \end{bmatrix}, \quad \text{[Equation 19]}$$

B is the codebook size of $v_{4,i}$ and $v_{4,j}$

This codebook classifies 8-port codebook into 4-port unit (for X-pol, the same polarization unit), and is configured by applying different 4-port codeword in each classified 4-port unit. In this case, a codebook payload size is configured with 16*16 for rank 1, for example. In such a method of configuring codebook with dual stage codebook, $v_{4,i}$ is designated as WB codebook and used as $$v_{8,Bi+j} = \frac{1}{\sqrt{2}} \begin{bmatrix} v_{4,i} \\ v_{4,i} \end{bmatrix},,$$

a codebook index of is additionally reported with SB or shorter, and $$v_{8,Bi+j} = \frac{1}{\sqrt{2}} \begin{bmatrix} v_{4,i} \\ v_{4,j} \end{bmatrix}$$

may be configured. In addition, an antenna is located in an arbitrary position in the UE, pass loss according to the antenna port position may be changed. In order to reflect this realistically, a codebook may be configured by defining alpha, which is power control part/term except the phase term in the codebook separately. Alpha may be defined/represented as $\alpha$ (e.g., $\alpha \in \{1, \sqrt{0.5}, \sqrt{0.25}, 0\}$), and this may be used as the PMI of W1. As a result, the final codebook may be defined as Equation 18.

$$v_{8,Bi+j} = \frac{1}{\sqrt{1+\alpha^2}} \begin{bmatrix} v_{4,i} \\ \alpha v_{4,j} \end{bmatrix} \quad \text{[Equation 20]}$$

In this codebook, in order to reduce payload size of codebook, only a part of LTE UL codebook may be used. For example, among rank 1 codebook, 16-23 (antenna off codebook) may be excluded. In addition, the principle may be identically applied to other higher rank (e.g., ranks 2, 3 and 4). In this case, the codebook may be configured/as a default by using $$v_{8,L^*i+n}^{(r)} = \frac{1}{\sqrt{2}} \begin{bmatrix} v_{4,i}^{(r)} \\ \phi_n v_{4,i}^{(r)} \end{bmatrix},$$

$$\phi_n = \exp\left(\frac{j2\pi n}{L}\right),$$

$$n = 0, \ldots, L-1$$

or $$v_{8,B^*i+j}^{(r)} = \frac{1}{\sqrt{2}} \begin{bmatrix} v_{4,i}^{(r)} \\ v_{4,j}^{(r)} \end{bmatrix},$$

in the same way. Herein, superscript r denotes a rank. In addition, the proposed dual stage codebook may be used for the frequency selective precoding, and may be applied to CP-OFDM. Otherwise, it may be restricted that the single stage codebook is used for the DFTs-OFDM and the dual stage codebook is used for CP-OFDM. It may be recommended by the UE whether to use the single stage codebook and/or the dual stage codebook to the gNB, or the gNB may indicate to the UE by higher layer signaling (e.g., RRC, DCI and/or MAC CE, etc.).

In addition, the 4-port codebook may be configured with $$v_{4,L^*i+n}^{(1)} = \frac{1}{\sqrt{2}} \begin{bmatrix} v_{2,i}^{(1)} \\ \phi_n v_{2,i}^{(1)} \end{bmatrix},$$

$$\phi_n = \exp\left(\frac{j2\pi n}{L}\right),$$

$$n = 0, \ldots, L-1$$

or $$v_{4,B^*i+j}^{(1)} = \frac{1}{\sqrt{2}} \begin{bmatrix} v_{2,i}^{(1)} \\ v_{2,j}^{(1)} \end{bmatrix}$$

structure only for rank 1.

Hereinafter, a codebook design for the frequency selective precoding is proposed in the environment like CP-OFDM, and the like.

When it is assumed that the number of ports that the UE has in a single SRS resource is X, different delay is undergone for each X-port, and this may be understood as the phenomenon that phase is shifted in the frequency domain. The delay on the time axis is interpreted as phase change in the frequency axis, and the phase change on the frequency axis may represented as a frequency function. For example, the phase change on the frequency axis may be represented as $\exp(-j2\pi k\delta)$, herein, k represents an index corresponding to the corresponding frequency (e.g., subcarrier index, Physical Resource Block (PRB) (or Precoding Resource Group (PRG)) index, and SB index), and delta ($\delta$) is a coefficient that represents a frequency phase shift.

In the present invention, a codebook is proposed for the frequency selective precoding using the frequency shift phenomenon which is occurred owing to undergo different delay for each UL SRS port.

The proposed codebook structure is as represented in Equation 21 for rank 1.

$$v_{X,i} = \frac{1}{\sqrt{1+p_1+\ldots+p_{X-1}}} \begin{bmatrix} 1 \\ \sqrt{p_1} \exp(-j2\pi k\delta_1 + \varepsilon_1) \\ \vdots \\ \sqrt{p_{X-1}} \exp(-j2\pi k\delta_{X-1} + \varepsilon_{X-1}) \end{bmatrix} \in C^{X \times 1} \quad \text{[Equation 21]}$$

$p_l$ denotes a relative beam power based on the first port. This may be promised as a specific value (e.g., $p_l = \{1, 0.5, 0.25, 0\}$) in advance, or the gNB may indicate to the UE by higher layer signaling (e.g., RRC, DCI and/or MAC CE).

The variable for the phase change value in Equation 21 can be defined as Equation 22.

$$\delta_l = \frac{\lambda_l}{\upsilon \eta}, l = 1, \ldots, X-1 \quad \text{[Equation 22]}$$

In Equation 22, the variables constructing $\delta_l$ may be defined as below.

$r_l$ value may be indicated by higher layer signaling (e.g., RRC and/or MAC CE), or a promised/configured value in advance may be used for numerology. For example, $r_l$ value may be configured as the smallest value that satisfies $\eta \geq N_{cRB}^{UL} N_{sc}^{cRB}$, in $\{128, 256, 512, 1024, 2048, 4096\}$, and herein, $N_{cRB}^{UL} N_{sc}^{cRB}$ is the number of subcarriers in a Bandwidth (BW) configured for a CSI report. $\upsilon$ value is an oversampling value (of Fast Fourier Transform (FFT) size) and may be setup as a specific integer value (e.g., 1, 2, 4, etc.) (This may have characteristics of a system parameter irrelevant to a specific beam). υ value may be configured according to a numerology automatically, or the gNB may configure it to the UE. Lastly, $\lambda_l$ is a value in relation to phase change velocity in a configured BW for each port, and for example, when $\lambda_l$=2, this may mean that the phase of the second port is changed as much as 4-phi in the configured BW. $\lambda_l$ value may be setup as a specific integer value (e.g., 1, 2, 4, etc.), and the gNB may configure it to the UE or the UE may select/designate $\lambda_l$ value for each beam in the set in which the candidate values that can be $\lambda_l$ value are included, and may feedback it to the gNB.

In the case of Equation 21, by using the value corresponding to the maximum delay for each port based on the time axis, $\delta_l$ value may be calculated. For example, in the frequency domain, samples per subcarrier/RB/SB are taken as a channel response to the corresponding port, and FFT is applied to it, and then, may be transformed to time domain signal samples. Among the time domain signal samples, an index corresponding to the maximum value (e.g., amplitude) may be determined as a value corresponding to the maximum delay, and $\delta_l$ may be calculated based on the value. For example, in the case that the maximum delay value is a_l, this may be calculated as $$\delta_l = \frac{a_l}{size_{FFT}}.$$

Equation 21 shows the value calculated by assuming that there is one value corresponding to the maximum delay for each port. However, owing to multi-path, in the case that delay spread is great, there may be restriction in capturing all fluctuations of a frequency domain channel with a single time domain signal sample. In this case, a method may be existed, which capture a plurality of time domain signal samples (K samples, K may be configurable by the gNB or recommended by the UE (particularly, DL case). Then, Equation 21 may be represented as Equation 23.

$$v_{X,i} = \frac{1}{\sqrt{1 + \sum_{k=1}^{K_1} p_{1,k} + \ldots + \sum_{k=1}^{K_{X-1}} p_{X-1,k}}} \begin{bmatrix} 1 \\ \sum_{k=1}^{K_1} \sqrt{p_{1,k}} \exp(-j2\pi k \delta_{1,k} + \varepsilon_{1,k}) \\ \vdots \\ \sum_{k=1}^{K_{X-1}} \sqrt{p_{X-1,k}} \exp(-j2\pi k \delta_{X-1,k} + \varepsilon_{X-1,k}) \end{bmatrix} \in C^{X \times 1}$$ [Equation 23]

In Equation 23, subscript k index of each parameter may be understood as $k^{th}$ sample determined by a promised rule in advance from $k^{th}$ largest time domain sample or maximum delay sample for each port. For example, in the case that it is determined that K=3, FFT size is 64 and maximum delay is $7^{th}$ (tap), Equation 23 may be constructed by using $6^{th}$, $7^{th}$ and $8^{th}$ (tap), time domain sample. In addition, the gNB may setup as $K=K_1=\ldots=K_{X-1}$, and may indicate this to the UE. In the case that a correlation is small since interval between ports is great, the gNB may setup as $K_1 \neq \ldots \neq K_{X-1}$, and indicate this to the UE by higher layer signaling.

When K=1, Equation 23 may become Equation 21, and it is described with Equation 21, for the convenience of description.

The remaining parameters in Equation 21 may be defined/configured as below.

k index is an index value correspond to a frequency, and configured in accordance with/according to a given subcarrier or an SB, and this is not additionally fed back. $\varepsilon_l$ value represents a phase offset value of port, and as in the example of $$\varepsilon_l = \left\{0, \frac{j\pi}{4}, \frac{j2\pi}{4}, \frac{j3\pi}{4}\right\} \text{ or } \varepsilon_l = \left\{0, \frac{j\pi}{8}, \ldots \frac{j7\pi}{8}\right\},$$

may be indicated with a port unit additionally, with a value configured such that phase offset for each beam has a value such as QPSK, 8PSK, and the like. Otherwise, the phase offset is ignored, and feedback overhead may be significantly decreased by setting $\varepsilon_l$ value to zero.

In the case of using the proposed method, the UE may calculate SB SINR by using a method such as an average based on the TPMI applied with RE-level by (for example), and report it to the gNB.

More specific PMI estimation operation of the UE is as below.

First, a channel represented by each subcarrier (or PRB or SB) may be defined as $H(k) \in C^{N_R \times N_T}$. Herein, $N_R$ and $N_T$ represent Rx (or antenna element, hereinafter, commonly called 'antenna port') of the gNB and Tx antenna port of the UE, respectively. The UE may estimate relative power indicator) $p_l$, for PMI configuration, phase change factor $\delta_l$ for each beam according to frequency and offset $\varepsilon_l$, using H(k) for each subcarrier. The gNB may indicate the factors that represent WB to the UE collectively or independently, and the UE may configure TPMI based on the information. Otherwise, the gNB may indicate only a subset (e.g., excluding relative power indicator $p_l$, for TPMI configuration) of the factors for TPMI configuration to the UE, and the UE may configure TPMI based on the information. At this time, it may be assumed that the remaining information which is not indicated is predefined (e.g., $p_l$=1).

Hereinafter, it is described a higher layer codebook configuration method using the method.

Generally, in the case of X-port, assuming that the gNB has more reception antenna ports than the UE, a transmission is available up to X-layer, theoretically. Accordingly, the gNB may calculate an optimal parameter for each layer using a channel between the UE and the gNB. That is, the gNB may calculate $p_x$, $\delta_x$, $\varepsilon_x$ and the like independently for each layer. In this case, a final precoder $W_X^R$ may be defined as Equation 24. In Equation 24, R represents a transport layer.

$$v_X^{(r)} = \frac{1}{\sqrt{1 + p_1^{(r)} + \ldots + p_{X-1}^{(r)}}} \begin{bmatrix} 1 \\ \sqrt{p_1^{(r)}} \exp(-j2\pi k \delta_1^{(r)} + \varepsilon_1^{(r)}) \\ \vdots \\ \sqrt{p_{X-1}^{(r)}} \exp(-j2\pi k \delta_{X-1}^{(r)} + \varepsilon_{X-1}^{(r)}) \end{bmatrix} \in C^{X \times 1},$$ [Equation 24]

$$r = 1, \ldots, R$$

$$W_X^R = \frac{1}{\sqrt{R}} [v_X^{(1)} \ldots v_X^{(R)}] \in C^{X \times R}$$

In the codebook above, an independent PMI report is performed for each layer, and accordingly, a problem may occur that payload size increases linearly as layer increases. In order to solve this, for a specific link, the single stage, the dual stage, or a specific codebook (e.g., DL dual stage codebook) may be used. Otherwise, using the orthogonal codes represented by Walsh code, a codebook which is orthogonal up to layer 2 may be constructed. In this case, all of the parts in relation to relative power in Equation 24 may be fixed to 1. Then, the codebook of rank 1 and rank 2 may be constructed as Equation 25.

$$W_X^{(1)} = \frac{1}{\sqrt{X}} \begin{bmatrix} 1 \\ \exp(-j2\pi k \delta_1^{(1)} + \varepsilon_1^{(1)}) \\ \vdots \\ \exp(-j2\pi k \delta_{X-1}^{(1)} + \varepsilon_{X-1}^{(1)}) \end{bmatrix} \in C^{X \times 1}$$ [Equation 25]

$$W_X^{(2)} = \frac{1}{\sqrt{2X}} \begin{bmatrix} 1 & 1 \\ \vdots & \vdots \\ \exp(-j2\pi k \delta_{X/2-1}^{(1)} + \varepsilon_{X/2-1}^{(1)}) & \exp(-j2\pi k \delta_{X/2-1}^{(1)} + \varepsilon_{X/2-1}^{(1)}) \\ \phi_x \exp(-j2\pi k \delta_{X/2}^{(1)} + \varepsilon_{X/2}^{(1)}) & -\phi_n \exp(-j2\pi k \delta_{X/2}^{(1)} + \varepsilon_{X/2}^{(1)}) \\ \vdots & \vdots \\ \phi_x \exp(-j2\pi k \delta_{X-1}^{(1)} + \varepsilon_{X-1}^{(1)}) & -\phi_x \exp(-j2\pi k \delta_{X-1}^{(1)} + \varepsilon_{X-1}^{(1)}) \end{bmatrix} \in C^{X \times 2}, \phi_n = \{1, j\}.$$

Otherwise, in the case of X-pol antenna, the codebook of rank 1 and rank 2 may be constructed as Equation 26.

$$W_X^{(1)} = \frac{1}{\sqrt{X}} \begin{bmatrix} 1 \\ \vdots \\ \exp(-j2\pi k \delta_{X/2-1}^{(1)}) + \varepsilon_{X/2-1}^{(1)} \\ \phi_n \\ \vdots \\ \phi_n \exp(-j2\pi k \delta_{X/2-1}^{(1)}) + \varepsilon_{X/2-1}^{(1)} \end{bmatrix} \in C^{X \times 1}, \phi_n = \{1, j, -1, -j\},$$ [Equation 26]

$$W_X^{(2)} = \frac{1}{\sqrt{2X}}$$

$$\begin{bmatrix} 1 & 1 \\ \vdots & \vdots \\ \exp(-j2\pi k \delta_{X/2-1}^{(1)} + \varepsilon_{X/2-1}^{(1)}) & \exp(-j2\pi k \delta_{X/2-1}^{(1)} + \varepsilon_{X/2-1}^{(1)}) \\ \phi_n & -\phi_n \\ \vdots & \vdots \\ \phi_x \exp(-j2\pi k \delta_{X/3-1}^{(1)} + \varepsilon_{X/3-1}^{(1)}) & -\phi_n \exp(-j2\pi k \delta_{X/2-3}^{(1)} + \varepsilon_{X/2-1}^{(1)}) \end{bmatrix} \in C^{X \times 2},$$

$$\phi_n = \{1, j\}$$

The phase correction term $\phi_n$ may be indicated by different values for each WB or SB (e.g., mutually independently).

Hereinafter, the way of applicability of the proposed single panel based codebook or the existing LTE UL/DL codebook to the multiple panels is described. Hereinafter, for the convenience of description, it is assumed that the same number of antenna ports is provided to a single panel. That is, hereinafter, in the case that M panels are existed, it is assumed that N X-pol antenna ports in each panel are existed in each polarization. In the case of the proposed codebook structure proposed below, the functionality of port selection and the like may be processed by a separate signaling like SRI, and accordingly, it is characterized that the port selection and the like (e.g., in the case that codebook element is setup as zero) in the codebook is not considered.

First, in the case of the configuration of X-pol antenna (2-ports), it is assumed that DL or UL 2-port codebook is used. In this case, the 2-port codebook may be constructed as below. Since a beam group is not necessary for 2-ports, W1 (2 by 2) may be assumed as an identity matrix, simply. In addition, co-phase for each polarization may be performed for W2 (in a unit of SB and/or short term). That is, W2 may be constructed as $$W_{2i} = \begin{bmatrix} 1 \\ \phi_n \end{bmatrix},$$

i=1, 2, and may be constructed by $\phi_n = \{1, j, -1, -j\}$ or 8 PSKs. Here, i may be a panel index. In this case, the final codebook may be represented by LTE DL codebook (assuming QPSK co-phase).

TABLE 12

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

Using Table 12, the codebook constructed in which a plurality of SRS resources is combined may be represented as below.

For 4-ports, like non-coherent JT, two antennas are provided for each resource (panel) and 2-port codebook is used, and phase between resources (panels) and/or amplitude correction term may be considered. That is, this is represented by mathematical expression, Equation 27.

$$W = \begin{bmatrix} W_{11} \\ & \alpha W_{12} \end{bmatrix}\begin{bmatrix} W_{21} \\ & \beta W_{22} \end{bmatrix} \quad \text{[Equation 27]}$$

Herein, $$W_{1i} \in I_2, \quad W_{2i} = \begin{bmatrix} 1 \\ \phi_n \end{bmatrix},$$

and $\alpha, \beta$ represent correction terms of amplitude and phase correction between resources (panels) (e.g., $\alpha = \{0, \sqrt{0.25}, \sqrt{0.5}, 1\}$, $\delta = \{1, j, -1, -j\}$). $\alpha, \beta$ may be configured/applied to ether one of two values collectively ($\alpha*\beta$) for WB or SB. At this time, for efficient variation of payload, different bit sizes (e.g., WB=2 bit, SB=1 bit) may be configured/applied to WB and SB. In addition, an efficient application for each layer, like $\alpha^1, \beta^1$ for rank1, $\alpha^2, \beta^2$ for rank2, $\alpha,\beta$ may be independently applied for each layer. However, since rank 2 configuration of the 2-port codebook has a structure that the same beam is used for each polarization, in order to save payload size, it may be preferred to use the same $\alpha,\beta$. This may be identically applied to the codebook in which W1 beam group is configured with 1 beam as well as the 2-port codebook.

As another embodiment, by configuring like $\alpha=\{0,1\}$, it may be configured that an amplitude component performs only the function of panel selection. In this case, since the size of TPMI is changed depending on alpha value (i.e., in the case that alpha=1, the size of TPMI is doubled), it may be preferable that TPMI and the correction term and/or RI is joint-encoded in the aspect of TPMI payload.

The codebook is extended and applied to 8-port codebook, which may be represented as Equation 28.

$$W = \begin{bmatrix} W_{11} \\ & \alpha_2 W_{12} \\ & & \alpha_3 W_{13} \\ & & & \alpha_4 W_{14} \end{bmatrix}\begin{bmatrix} W_{21} \\ \beta_2 W_{22} \\ \beta_3 W_{23} \\ \beta_4 W_{24} \end{bmatrix} \quad \text{[Equation 28]}$$

That is, each of the four resources (panels) uses 2-port codebook, and the correction term for each panel may increase according to the number of panels. In order to solve this, for phase, through an operation like $\beta_2=\beta^2$, $\beta_3=\beta^3$, $\beta_4=\beta^4$ or $\beta_2=\beta$, $\beta_3=2\beta$, $\beta_4=3\beta$, it may be configured/applied to be represented by a single value. At this time, the gNB may be configured to the UE on which panel correction value is used, and since the panel correction value may be changed according to an antenna implementation of the UE, the UE may inform it through capability report to the gNB. The remaining elements of the 8-port design may be identically configured/applied as the 4-port case described above. The normalization term of the codebook may be calculated as $$\frac{1}{\sqrt{1 + \alpha_2^2 + \alpha_3^2 + \alpha_4^2}}.$$

Hereinafter, the codebook of the case that a single panel is configured with 4-ports (or the case that the number of aggregated ports is 4 in the coherent JT situation). In the case of the 4-port codebook, when the dual stage codebook is configured, LTE-A Class A codebook may be extended and used or Rel-12 eDL-MIMO 4Tx may be configured and used. In the case that Class A codebook is used, the codebook structure may be limited to the structure that W1 is configured with one beam (e.g., represented as Config 1, etc.) in order to reduce payload of TPMI (e.g., payload size of SB), and W2 may perform the frequency selective precoding with co-phase.

Table 13 exemplifies 4-port codebook (LTE DL 4-ports).

TABLE 13

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $w_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $w_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $w_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $w_3^{\{1\}}$ | $W_3^{\{12\}}/\sqrt{2}$ | $W_3^{\{123\}}/\sqrt{3}$ | $W_3^{\{3214\}}/2$ |

TABLE 13-continued

| Codebook index | $u_n$ | Number of layers $\upsilon$ | | | |
|---|---|---|---|---|---|
| | | 1 | 2 | 3 | 4 |
| 4 | $u_4 = [1\ (-1-j)/\sqrt{2}\ -j\ (1-j)/\sqrt{2}]^T$ | $w_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $w_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $w_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $w_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $w_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $w_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $w_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $w_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $w_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $w_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $w_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $w_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 13, $W_n = I - 2u_n u_n^H / u_n^H u_n$, I represents 4×4 identity matrix.

As another embodiment, there is a scheme of configuring a frequency selective precoding by using LTE DL single stage codebook. In this scheme, the 4-port codebook of FIG. 13 is grouped in a unit of L indices (e.g., L=2, 3, 4, and L is configurable by the gNB or the UE) and W1 is configured, and a beam selection may be selected through W2 (within W1 group). For example, in the case that L=2, rank 1 codebook may be constructed as $W_1 = [W_i^{\{r\}}\ W_{i+1}^{\{r\}}]$, $W_2 = e_j$. The information of a beam selection may be additionally/independently signaled. For example, the beam selection information may be signaled with L*4 bits for the codebook or joint-indicated by using the beams selected for permutation or combination for reducing overhead, described below. In the codebook, $e_j \in C^{L \times 1}$ is a selection vector, and a vector of which only $j^{th}$ element is '1' and the remaining elements are '0'. In addition, in the codebook, superscript r corresponds to a rank.

The embodiment above is the scheme that L beams are grouped according to a specific method, and group index is selected/indicated with W1 and beam selection/indication is performed with W2. However, the embodiment proposed below is the scheme that different indices are allocated to each of L beams, and the index of the selected beam is explicitly indicated (e.g., for L=2, beam index (11, 5) is indicated). In this case, the number of cases required for the indication may be $_{16}P_L$, $_{16}C_L$ (permutation and combination). In the case of the number of cases calculated by a permutation operator, there is no ambiguity of beam order that constructs W1 between the UE and the gNB, but there is a disadvantage that the number of signaling bits increases. In the case that a grouping method constructed by a combination is used, it may be assumed that the grouping is arranged based on low (or high) codebook index always. In the case of not promised in advance like the example, the precoder cycling such as semi-open loop (OL) for a fast UE may be used, and it may be configurable which grouping method is used, and the gNB may indicate it (or the UE may recommend it). The performance of the frequency selective precoding through the beam grouping has big advantage in the signaling overhead aspect.

As another method, a method of grouping Householder 4Tx codebook with L=4 is as below.

Table 13 is denoted by each codebook index and arranged as represented in Table 14.

Table 14

| Index(k) | $W_k^{\{1234\}}$ | Rank | | | |
|---|---|---|---|---|---|
| | | 1 | 2 | 3 | 4 |
| 0 | [b0 b6 b5 b7] | b0 | [b0 b7] {14} | [b0 b6 b7] {124} | [b0 b6 b5 b7] {1234} |
| 2 | [b5 −b7 b0 −b6] | b5 | [b5 −b7] {12} | [b5 −b7 b0] {123} | [b5 −b7 b0 −b6] {1234} |
| 8 | [b6 b0 −b7 −b5] | b6 | [b6 b0] {12} | [b6 b0 −b5] {124} | [b6 b0 −b7 −b5] {1234} |
| 10 | [b7 −b5 −b6 b0] | b7 | [b7 −b6] {13} | [b7 −b5 −b6] {123} | [b7 −b5 −b6 b0] {1324} |
| 12 | [b1 b2 b3 b4] | b1 | [b1 b2] {12} | [b1 b2 b3] {123} | [b1 b2 b3 b4] {1234} |
| 13 | [b2 b1 b4 b3] | b2 | [b2 b4] {13} | [b2 b1 b4] {123} | [b2 b4 b1 b3] {1324} |
| 14 | [b3 b4 b1 −b2] | b3 | [b3 b1] {13} | [b3 b4 b1] {123} | [b1 b4 b3 b2] {3214} |
| 15 | [−b4 −b3 −b2 −b1] | −b4 | [−b4 −b3] {12} | [−b4 −b3 −b2] {123} | [−b4 −b3 −b2 b1] {1234} |
| 1 | $[\bar{q}_0\ jq_1\ -q_0\ -j\bar{q}_1]$ | $\bar{q}_0$ | $[\bar{q}_0\ jq_1]$ {12} | $[\bar{q}_0\ jq_1\ -q_0]$ {123} | $[\bar{q}_0\ jq_1\ -q_0\ -j\bar{q}_1]$ {1234} |
| 3 | $[q_0 - j\bar{q}_1\ -\bar{q}_0\ jq_1]$ | $q_0$ | $[q_0 - j\bar{q}_1]$ {12} | $[q_0 - j\bar{q}_1\ -\bar{q}_0]$ {123} | $[-\bar{q}_0\ -j\bar{q}_1\ q_0\ jq_1]$ {3214} |
| 9 | $[q_1\ j\bar{q}_0\ \bar{q}_1\ jq_0]$ | $q_1$ | $[q_1\ jq_0]$ {14} | $[q_1\ \bar{q}_1\ jq_0]$ {134} | $[q_1\ j\bar{q}_0\ \bar{q}_1\ jq_0]$ {1234} |
| 11 | $[\bar{q}_1\ -jq_0\ q_1\ -j\bar{q}_0]$ | $\bar{q}_1$ | $[\bar{q}_1\ q_1]$ {13} | $[\bar{q}_1\ q_1\ -j\bar{q}_0]$ {134} | $[\bar{q}_1\ q_1\ -jq_0\ -j\bar{q}_0]$ {1324} |
| 4 | $[e_0\ \bar{e}_3\ je_1\ -j\bar{e}_2]$ | $e_0$ | $[e_0\ -j\bar{e}_2]$ {14} | $[e_0\ \bar{e}_3\ -j\bar{e}_2]$ {124} | $[e_0\ \bar{e}_3\ je_1\ -j\bar{e}_2]$ {1234} |
| 7 | $[\bar{e}_0\ e_3\ -j\bar{e}_1\ je_2]$ | $\bar{e}_0$ | $[\bar{e}_0\ -j\bar{e}_1]$ {13} | $[\bar{e}_0\ -j\bar{e}_1\ je_2]$ {134} | $[\bar{e}_0\ -j\bar{e}_1\ e_3\ je_2]$ {1324} |
| 5 | $[\bar{e}_1\ e_2\ -j\bar{e}_0\ je_3]$ | $\bar{e}_1$ | $[\bar{e}_1\ je_3]$ {14} | $[\bar{e}_1\ e_2\ je_3]$ {124} | $[\bar{e}_1\ e_2\ -j\bar{e}_0\ je_3]$ {1234} |
| 6 | $[e_1\ \bar{e}_2\ je_0\ -j\bar{e}_3]$ | $e_1$ | $[e_1\ je_0]$ {13} | $[e_1\ je_0\ -j\bar{e}_3]$ {134} | $[e_1\ je_0\ \bar{e}_2\ -j\bar{e}_3]$ {1324} |

The number in bracket { } in Table 14 represents a position of basis vector/codeword selected among basis vectors/codewords. For example, in Table 14, {14} of rank 2 of codebook index 0 may be interpreted to the first (b0) and fourth (b7) basis vector/codeword among basis vectors/codewords [b0, b5, b6, b7].

The vectors represented in Table 14 may be defined as Equation 29.

$$b_0 = \begin{bmatrix} 1 \\ 1 \\ 1 \\ 1 \end{bmatrix}, b_1 = \begin{bmatrix} 1 \\ 1 \\ 1 \\ -1 \end{bmatrix}, b_2 = \begin{bmatrix} 1 \\ 1 \\ -1 \\ 1 \end{bmatrix}, b_3 = \begin{bmatrix} 1 \\ -1 \\ 1 \\ 1 \end{bmatrix},$$

$$b_4 = \begin{bmatrix} -1 \\ 1 \\ 1 \\ 1 \end{bmatrix}, b_5 = \begin{bmatrix} 1 \\ -1 \\ 1 \\ -1 \end{bmatrix}, b_6 = \begin{bmatrix} 1 \\ 1 \\ -1 \\ -1 \end{bmatrix}, b_7 = \begin{bmatrix} 1 \\ -1 \\ -1 \\ 1 \end{bmatrix}$$

$$q_0 = \begin{bmatrix} 1 \\ j \\ -1 \\ -j \end{bmatrix}, q_1 = \begin{bmatrix} 1 \\ -j \\ 1 \\ -j \end{bmatrix}, \bar{q}_0 = \begin{bmatrix} 1 \\ -j \\ -1 \\ j \end{bmatrix}, \bar{q}_1 = \begin{bmatrix} 1 \\ j \\ 1 \\ j \end{bmatrix}$$

$$e_0 = \begin{bmatrix} 1 \\ \frac{1-j}{\sqrt{2}} \\ -j \\ \frac{-1-j}{\sqrt{2}} \end{bmatrix}, \bar{e}_0 = \begin{bmatrix} 1 \\ \frac{1+j}{\sqrt{2}} \\ j \\ \frac{-1+j}{\sqrt{2}} \end{bmatrix}, e_1 = \begin{bmatrix} 1 \\ \frac{-1+j}{\sqrt{2}} \\ -j \\ \frac{1+j}{\sqrt{2}} \end{bmatrix}, \bar{e}_1 = \begin{bmatrix} 1 \\ \frac{-1-j}{\sqrt{2}} \\ j \\ \frac{1-j}{\sqrt{2}} \end{bmatrix},$$

$$e_2 = \begin{bmatrix} \frac{-1+j}{\sqrt{2}} \\ 1 \\ \frac{1+j}{\sqrt{2}} \\ -j \end{bmatrix}, \bar{e}_2 = \begin{bmatrix} \frac{-1-j}{\sqrt{2}} \\ 1 \\ \frac{1-j}{\sqrt{2}} \\ j \end{bmatrix}, e_3 = \begin{bmatrix} \frac{1-j}{\sqrt{2}} \\ 1 \\ \frac{-1-j}{\sqrt{2}} \\ -j \end{bmatrix}, \bar{e}_3 = \begin{bmatrix} \frac{1+j}{\sqrt{2}} \\ 1 \\ \frac{-1+j}{\sqrt{2}} \\ j \end{bmatrix}$$

[Equation 29]

Table 14 represents the embodiment that it is grouped with the codebooks having the same basis vector/codeword. For example, referring to Table 14, codebook indices 0, 2, 8 and 10 configured with the same basis vector/codeword [b0, b5, b6, b7] may be grouped into a group. In the case of being represented as Table 14, LTE DL 4-Tx Householder codebook may be sorted/grouped based on the same basis codeword (of course, through phase or conjugate operation, different codebooks are applied). That is, Householder 4Tx codebook may be divided/grouped into beam group 1 {0, 2, 8, 10}, beam group 2 {12, 13, 14, 15}, beam group 3 {1, 3, 9, 11}, and beam group 4 {4, 7, 5, 6} based on the codebook index as represented in Table 15.

TABLE 15

| | |
|---|---|
| Beam group 1 | 0, 2, 8, 10 |
| Beam group 2 | 12, 13, 14, 15 |
| Beam group 3 | 1, 3, 9, 11 |
| Beam group 4 | 4, 5, 6, 7 |

Accordingly, the index allocated in each beam group may be indicated by WB (and/or long-term), and the optimal beam in each beam group may be indicated by SB (and/or short-term).

The normalized term is not reflected on Equation 29. The normalization may be performed by multiplying $$\frac{1}{2\sqrt{R}}$$

to the codeword of each codebook index (corresponding to k and rank), herein, 2 means each column normalization, $\sqrt{R}$ means normalization for each rank, and herein R represents a rank.

The codebook classification/grouping method may be classified/grouped according to spacing distance/degree between ports (e.g., classified/grouped according to x value in xλ port interval). Otherwise, the codebook classification/grouping method may be classified/grouped according to granularity degree of phase shift between ports (i.e., each of the classified codebook group may have different/divided/independent phase shift granularity) (e.g., beam groups 1 and 2 are shifted with Binary phase shift keying (BPSK), beam group 3 is shifted with Quadrature Phase Shift Keying (QPSK), and beam group 4 is shifted with 8-PSK), and according to this, WB codebook is divided. Accordingly, even in the case of the extended codebook in which a specific beam group is extended in accordance with the property, the frequency selective precoding based on the codebook may be performed. For example, in the case that beam group 3 is extended, that is, a codebook example of constructing a codebook by substituting q0 and q1 to q2 and q3 defined in Equation 30, respectively.

$$q_2 = \begin{bmatrix} 1 \\ j \\ -j \\ 1 \end{bmatrix}, q_3 = \begin{bmatrix} 1 \\ -j \\ j \\ -1 \end{bmatrix}, \bar{q}_2 = \begin{bmatrix} 1 \\ -j \\ j \\ 1 \end{bmatrix}, \bar{q}_3 = \begin{bmatrix} 1 \\ j \\ -j \\ -1 \end{bmatrix} \quad \text{[Equation 30]}$$

In the example above, signaling overhead of 2 bits for each of WB and SB is required for TPMI indication. Since rank 4 corresponds to full rank of 4TX, it may be promised/configured to use an identity matrix ½I₄ simply, or use a representative rank 4 codebook for each group. Otherwise, in order to reduce signaling overhead for SB, a method of regrouping beam group 1, 2, 3, 4 to L=2 may be considered. For example, the beam group 1, 2, 3, 4 grouped above may be classified/grouped into beam group 1, 2, 3, 4, 5, 6, 7, 8 (i.e., classified/grouped into codebook indices {0, 2}, {8, 10}, {12, 13}, {14, 15}, {1, 3}, {9, 11}, {4, 7}, {5, 6}, etc.), and in this case, TPMI may be indicated by 1 bit for each SB.

As another grouping method, a grouping method may be proposed by using a distance between codewords for each rank or degree of correlation. For this, as an example of a usable metric, Chordal distance (d(A,B)) or matrix (vector) correlation (Corr(A, B)) may be existed, and this may be represented by Equation 31.

$$d(A, B) = \frac{1}{\sqrt{2}} \|AA^H - BB^H\|_F \quad \text{[Equation 31]}$$

$$\text{Corr}(A, B) = \|AB^H\|_F$$

Here, A and B are arbitrary matrixes (vectors) having the same size, and super script "H" represents Conjugate transpose (Hermitian), and $\|\cdot\|_F$ represents Frobenius norm.

By using the metric, the example of codebook grouping of ranks 1 and 2 in Table 13 may include Table 16.

TABLE 16

|  | Rank 1 | Rank 2 |
| --- | --- | --- |
| Beam group 1 | 0, 2, 9, 11 | 0, 3, 7, 11 |
| Beam group 2 | 1, 3, 8, 10 | 1, 2, 8, 10 |
| Beam group 3 | 4, 7, 12, 15 | 4, 5, 6, 12 |
| Beam group 4 | 5, 6, 13, 14 | 9, 13, 14, 15 |

Each index in Table 16 corresponds to the index of the codeword of Table 13. This is an example that grouping is performed based on the degree of correlation between codewords. This may mean that the correlation between WB-SB TPMI is maintained and the frequency selective precoding may be performed in the case that a certain degree of correlation is existed between codewords. In addition, as represented in example of Table 16, the beam group may be different for each rank. This is because the metric may be changed by the orthogonal beam included in W1, as the layer increases.

Hereinafter, TPMI overhead reduction technique is proposed.

Proposal 1: The information of the grouping methods described above may be indicated by TPMI through DCI. However, in the aspect of overhead reduction, the beam grouping method or the information of a beam group indicated arbitrarily from the gNB may be indicated through higher layer signaling such as MAC CE, and the like, and the TPMI in relation to WB/SB may be indicated by using the beams in the beam group indicated/selected/chosen through TRI and MAC CE as DCI.

Proposal 2: In the above example, the bit widths of WB and SB are identically set. In this case, greater bit width is allocated to WB than a bit width of SB, but SB is limited to a specific bit width (e.g., 1 bit indication, etc.), and overhead may also be decreased.

Proposal 3: In the case of the report in SB unit, the size of TPMI becomes greater as the number of SBs increases. In order to solve this, it may be promised/configured in advance to perform subsampling in SB mode transmission. At this time, the information of subsampling may be promised between the UE and the gNB in advance, or indicated to the UE through higher layer like MAC CE, and the like or the codebook subset restriction method that is going to be described below.

Proposal 3-1: Since the subsampling may degrade the UL performance significantly, it may be promised/configured that the subsampling is performed when the number of SBs that is going to be scheduled to the UE is a specific N (e.g., N=3), but not performed otherwise.

The proposed method may be used/applied for the purpose of decreasing overhead of UL/DL transmission based on the dual codebook structure.

In the case that TRI+TPMI is indicated with single DCI and the size of TPMI is changed depending on TRI, in order to decrease overhead, TRI+TPMI may be joint-encoded and transmitted.

The TPMI may be divided into TPMI1 (corresponding to W1) and TPMI2 (corresponding to W2) (hereinafter, commonly referred to as 'TPMI1' and 'TPMI2'). At this time, TRI/TRI+TPMI1 may be indicated by single DCI and TPMI2 (and/or the position information of the corresponding SB) may be indicated by MAC CE, and the like. In this embodiment, there is an advantage that the frequency selective precoding may be performed without signaling overhead of great DCI even in the case that the size of SB precoding is big.

Alternatively, on the contrary, TRI/TRI+TPMI1 may be indicated by MAC CE, and the like and TPMI2 may be indicated by DCI. This embodiment may be beneficially applied to the case that the number of SBs is small (e.g., 2) or RI or TPMI is less dynamically changing relatively as the case of WB transmission mode.

In the case that it is indicated by dual DCI, the DCI may be configured/classified into $1^{st}$ DCI and $2^{nd}$ DCI. In the case that the $1^{st}$ DCI has higher priority than the $2^{nd}$ DCI and/or the $2^{nd}$ DCI is indicated with relatively long-term in comparison with the $1^{st}$ DCI, the TRI may be included in the $1^{st}$ DCI and encoded separately for higher protection or joint-encoded together with TPMI1, and TPMI2 may be included in the $2^{nd}$ DCI.

TRI, TPMI1 and TPMI2 information in relation to precoding may have interdependency, and accordingly, even in the case that the UE is unable to decode at least a part of the corresponding information, the UE may interpret/decode TRI, TPMI1 and/or TPMI2 indicated based on the previously received information. Otherwise, as a default behavior, a transmission with rank 1 and/or WB mode may be promised/configured in advance between the gNB and the UE.

In the case of 8-port codebook, 4-port codebook may be applied to each panel (resource), and the corresponding codebook structure is as represented in Equation 32.

$$W = \begin{bmatrix} W_{11} & \\ & \alpha W_{12} \end{bmatrix} \begin{bmatrix} W_{21} \\ \beta W_{22} \end{bmatrix}, \quad \text{[Equation 32]}$$

$$W_{1i} = \begin{bmatrix} v_1 & 0 \\ 0 & v_1 \end{bmatrix} \in C^{4 \times 2}, v_1 \in C^{2 \times 1}, W_{2i} = \begin{bmatrix} 1 \\ \phi_n \end{bmatrix}$$

Hereinafter, when transmitting UL (or DL) in very wide BW (e.g., 40 MHz) in NR, the case that the frequency selective precoding is applied/performed is described.

Generally, in the frequency selective precoding, by using the beam existed in the beam group of W1 (or with respect to the beam), a beam selection and co-phase in SB wise are performed, in the dual stage codebook structure. In the case of L beams that construct a beam group of W1, in order to reflect the frequency selective precoding well in the situation that the frequency selective property is dominant or in the situation that BW is very wide, it may be preferable to configure great L value. Accordingly, L value may be configured according to/based on BW (e.g., BW=~10 MHz (L=1), ~40 MHz (L=4), etc.). And/or the gNB may indicate L value to L value of the UE considering the frequency selectivity, or the UE may recommend L value that the UE prefers.

In addition to the codebook described above, it may be considered that other LTE codebook, for example, Class A codebook is used as UL codebook. In this case, since the TPMI indicated by DCI increases linearly according to the number of SBs, in order to restrict this, it may be limited that only 'Config 1' in which the SB payload size is the smallest is used.

For the DFT-S-OFDM, in the case that WB TPMI is used for 2Tx, rank 1 precoder represented in Table 17 below may be used. In the Table below, "codebook index" may be referred to as "TPMI index".

TABLE 17

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 1\\1 & -1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\j & -j\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 0\\0 & 1\end{bmatrix}$ |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

For CP-OFDM, TPMI indices 0 to 3 for rank 1 and TPMI indices 0 and 1 for rank 2 may be used. In addition, one of the two antenna port selection mechanisms may be supported.

Alternative 1: In Table 17, TPMI indices 4 to 5 for rank 1 and TPMI index 2 for rank 2 are used in CP-OFDM.

Alternative 2: SRI indicates the selected antenna port.

For 2Tx, TPMI, SRI and TRI of Rel-15 may be forwarded by using single stage DCI of the size which is semi-statically configured. The DCI size included in TPMI, SRI and TRI is not changed according to PUSCH resource allocation of the single stage DCI. The UE capability may be materialized, which identify whether the UL MIMO capable UE may support coherent transmission through its own transmission chain.

For 4Tx of CP-OFDM, the following methods may be considered as a method of processing a port selection in a codebook.

1. Configurable Codebook

A. A port combining codebook and a port selection codebook are distinguished, and each may be signaled by a higher layer. That is, like the port selection codebook of antenna turn off function represented by UL LTE codebook (or subset thereof) and the codebook represented by Household codebook/NR DL Type I CSI, it may be signaled by a higher layer like RRC to use a codebook among the port combining codebooks in which non-zero coefficient is existed in all port is used. The UEs configured with beam-formed SRS (in the case of extending to UL similar to Class B of LTE eFD-MIMO) may use the port selection codebook.

2. Single Codebook

A. This is a codebook represented by union of a port combining codebook and a port selection codebook, like case 1.

3. When a codebook configured with methods 1 and 2 is used, TRI and TPMI may be independently encoded or joint-encoded. In the case that TRI and TPMI are joint-encoded, in order to decrease overhead of DCI, a port selection is allowed only to a specific rank or less (e.g., rank 1 or rank 2). In the case that method A is used, it is configured with the port selection codebook, and TRI is indicated by 3 or 4, the UE may identify the indicated TPMI as the TPMI corresponding to ranks 3 and 4 of the port combining codebook.

Hereinafter, in the case that the UL codebook described above is used (e.g., precoder cycling), a method of indicating a codebook subset restriction in the gNB for the purpose of interference control is proposed. This may be used for the purpose of decreasing signaling overhead of higher layer signaling (e.g., DCI). That is, this method has the purpose of decreasing overhead in preparation for the case that TPMI size becomes greater owing to the frequency selective precoding/multiple-panel operation and the like described above. Accordingly, in this method, a case may be considered that a codebook is reconstructed/subsampled as a codebook that includes a specific angle preferred by the UE, and domain. In this case, since the reconstructed and/or subsampled codebook size is smaller than the existing codebook, there is an effect that payload size is decreased.

1. Codeword (beam) unit: This is a method of indicating the full codeword constructing UL codebook with a scheme such as bitmap, for Cell-Specific Reference (CSR) indication. Accordingly, the number of bits used for CSR is $L_1+L_2+ \ldots +L_X$. Herein, $L_i$ is the number of i-layer codeword.

A. In the case that 2D DFT based codebook is used in CP-OFDM, the entire grid of beam (GoB) may be indicated by a value of N1N2O1O2. Herein, each of N1, N2, O1, and O2 is the number of antenna ports in the first and the second domains and the number of oversampling.

B. CSR for a specific domain or CSR for a specific angle: For example, in the situation that angular spread for a vertical domain is very small, the codebook for vertical component may not influence on a performance. The gNB may know it through measurement/monitoring of a channel between the UE and the gNB, or the UE may recommend it to the gNB.

2. Codebook Config unit: In the case that the UE uses a plurality of codebook configurations, the UE may recommend the preferred codebook or non-preferred codebook to the gNB for the purpose of CSR.

3. Rand unit: When receiving an indication of CSR with a specific rank, the UE does not use the codebook corresponding to the corresponding rank.

A. For each rank, method 1 and/or method 2 may be combined and CSR may be indicated. That is, for each rank, a beam/beam group (e.g., owing to UE coherent transmission capability, etc.) to which the codebook subset restriction is applied may be independently indicated. For example, in the case of the 2-port codebook as represented in Table 18 below, a bitmap of B_rank1 may be configured with 2 bits, and it may be promised/configured that when the bitmap is "11", indices 0 to 5 are used, and when the bitmap is "01", indices 4 and 5 are used. In addition, it may be promised/configured that the 2-bit bitmap of B_rank2 uses codebook indices 0 to 2, when the bitmap is "11", and uses only codebook index 2, when the bitmap is "01".

TABLE 18

| Codebook index | Number of layers $v$ | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 1\\1 & -1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\j & -j\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 0\\0 & 1\end{bmatrix}$ |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

In order to reduce signaling, a beam/beam group may be indicated by a common encoding format, not a bitmap format. For example, 1 bit size is defined for an indication, it may be defined that the bit indicates "01" in the 2-bit bitmap example, when the bit is "0", and indicates "11" in the 2-bit bitmap example, when the bit is "1".

In the method, an independent indication for each rank is represented, but in the case that the defined bitmap size is the same for each rank, all ranks may be restricted to a single bitmap (i.e., all rank restriction may be indicated through the corresponding bitmap).

4. W2 unit: In the case of dual stage codebook, a codebook like a specific co-phase or LTE DL Class B, W2 corresponding to W2 codeword may be restricted for the purpose of limiting a use of a specific port. In this case, the UE may assume rank-1 restriction or the information corresponding to a rank may be indicated to the UE together.

5. Panel unit: In the case that a panel indication is included in a codebook, for the purpose of limiting a transmission of a specific panel, the gNB may indicate a restriction of a codebook use corresponding to the specific panel to the UE with CSR (i.e., indicates panel on/off with codebook subset restriction).

It is natural that the gNB indicate most of CSR to the UE. However, during the process that the UE performs CoMP operation like JT or Joint Reception (JR), in the case that beams for each panel interferes with each other, for the purpose of controlling it, the UE may recommend the CSR of the proposed method to each gNB. As a more particular example, in the case that the UE is provided with two panels and the best corresponding Rx panel is different for each panel (in the case that a preferred panel/TRP is different for each panel), it is considered that a link between two panels/TRP and the UE is failed. That is, for example, when it is referred that a link between TRP1 and a UE panel 1 is link 1 and a link between TRP2 and a UE panel 2 is link 2, it is considered that link 2 is failed. In this case, as an exemplary operation, the UE abandons link 2 and combines a port of panel 2 for link 1, and more robust transmission may be considered. In this case, when a transmitted beam in the existing TRP2 of panel 2 is used, interference may be significantly reduced with TRP2, and accordingly, when a penal is combined, the UE may recommend abstention/prohibition of the use of the corresponding beam for the gNB. This example may also be used even in the case of beam pair link failure due to blockage, and the like. That is, for the purpose of reducing interference of other TRP/panel, the UE may recommend not to use the TPMI, digital and/or analog beam that interfere other TRP/panel significantly.

In the case of 4Tx that uses wideband TPMI, at least a single stage DCI may be used. For wideband TPMI and NR 4Tx codebook for CP-OFDM, one of the alternatives may be selected.

Alt 1: Rel-10 UL, possibly with additional entries:
Alt 2: Rel-15 DL, possibly with additional entries:
Alt 3: Rel-8 DL, possibly with additional entries:
NR supports 3 levels of UE capability for UL MIMO transmission:
Full coherence: All ports can be transmitted coherently.
Partial coherence: Port pairs can be transmitted coherently.
Non-coherence: No port pairs can be transmitted coherently.
TPMI codewords from the codebook are used by gNB accordingly.
For 1 SRS resource,
Full coherence: All ports corresponding to ports in an SRS resource can be transmitted coherently.
Non-coherence: All ports corresponding to ports in an SRS resource are not transmitted coherently.
Partial coherence: Ports pairs corresponding to ports in an SRS resource can be transmitted coherently.
In addition to a codebook based transmission using one SRS resource, a codebook based transmission using multiple SRS resources including non-coherent inter-SRS resource transmission may be supported.
Non-coherent inter-SRS resource transmission: Two DCI may be used, and one TPMI per DCI may be used. In addition, one TPMI/TRI per SRS resource may be signaled, and selection of multiple SRS resources may be indicated.

At least a single SRS resource is configured and for DFT-S-OFDM, additional 4Tx rank 1 codebook may be supported as represented in Table 19 below.

TABLE 19

| Codebook index | Number of layers $\upsilon = 1$ |
|---|---|
| 16-23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |
| 24-27 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ — — — — |

For DFT-S-OFDM, LTE 4Tx rank 1 UL codebook for TPMI 0-15 may be supported. At this time, additional codewords for antenna port selection may also be supported.

Considering the matters described above, the UE may report the capability information in relation to coherent transmission to the gNB additionally. In this case, in order for the gNB to configure a codebook to the UE, the capability information may be additionally considered in addition to the information of antenna configuration, antenna polarization, and the like, such as the number of (maximum) antenna port in a panel (or port group), the number of panels. These capabilities of the UE may have various values according to the UE implementation, and it requires much effort to materialize it.

Accordingly, the present disclosure proposes to report UL codebook subset restriction preferred by the UE to the gNB with the capability. Such a UL codebook subset restriction may be the codebook to which the codebook subset restriction is applied to the codebooks described above. For example, 3-bit capability report may be provided as Table 20. Table 20 exemplifies the codebook subset restriction, and Table 21 exemplifies the 2-port codebook used for definition of Table 20.

TABLE 20

| State | Codebook construction |
|---|---|
| 000 | 2-port with TPMI indices 0-5 for rank 1 and 0-3 for rank 2 |
| 001 | 2-port with TPMI indices 4-5 for rank 1 and 3 for rank 2 |
| 010 | 4-port with TPMI indices 0-27 for rank 1 TBD for rank 2-4 |
| 011 | 4-port with TPMI indices 16-27 for rank 1 TBD for rank 2-4 |
| 100 | 4-port with TPMI indices 24-27 for rank 1 TBD for rank 2-4 |
| 101 | Reserved |
| 110 | Reserved |
| 111 | Reserved |

TABLE 21

| | Number of layers $\upsilon$ | |
|---|---|---|
| Codebook index | 1 | 2 |
| 0 | $\frac{1}{\sqrt{2}}\begin{bmatrix}1\\1\end{bmatrix}$ | $\frac{1}{2}\begin{bmatrix}1&1\\1&-1\end{bmatrix}$ |

TABLE 21-continued

| | Number of layers $\upsilon$ | |
|---|---|---|
| Codebook index | 1 | 2 |
| 1 | $\frac{1}{\sqrt{2}}\begin{bmatrix}1\\-1\end{bmatrix}$ | $\frac{1}{2}\begin{bmatrix}1&1\\j&-j\end{bmatrix}$ |
| 2 | $\frac{1}{\sqrt{2}}\begin{bmatrix}1\\j\end{bmatrix}$ | $\frac{1}{\sqrt{2}}\begin{bmatrix}1&0\\0&1\end{bmatrix}$ |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

For a definition of Table 20, the 2-port codebook of Table 21 and the 4-port codebook that will be described below are used. "000" or "001" state exemplifies a collective report for each rank. In the case that capability is indicated for each rank independently, reporting field for each rank may be defined/configured independently.

Otherwise, in the case that a type of waveform of the supported codebook is different, a UE capability may be reported with an independent capability field (according to the type of waveform). In the case that rank 1 codebook is the same regardless of waveform (e.g., for 2-ports), the same rank 1 codebook is used regardless of waveform, and accordingly, the capability may be reported with the same state in the same field, and the gNB may reflect this for all waveforms. For 4-ports, since different codebooks may be used for waveform, it may be preferable in the flexibility aspect that the UE capability is reported with an independent capability reporting field.

Alternatively, the capability field of the UE may be distinguished into independent fields according to whether it is WB TPMI or SB TPMI.

For higher flexibility, a method may be considered that the UE capability is indicated with bitmap format. B_DFT-s-

OFDM may be indicated with bitmap (bitmap in relation to DFT-s-OFDM). For example, for 2-ports, it may be indicated by 2 bits bitmap of 1 bit corresponding to TPMI indices 0 to 3 and 1 bit corresponding to TPMI indices 4 and 5. For example, when 2 bits bitmap is '11', this indicates that the UE may use all of TPMI indices 0 to 5 as the capability of the UE, and when it is '01', this indicates that the UE may use only TPMI indices 4 and 5 as the capability of the UE, and a codebook may be constructed based on it. In addition, 4-ports, the UE capability is indicated with 3 bits bitmap. When 3 bits bitmap is '111', this indicates that the UE may use TPMI indices 0 to 27, when 3 bits bitmap is '011', this indicates that the UE may use TPMI indices 16 to 27, and when 3 bits bitmap is '001', this indicates that the UE may use TPMI indices 24 to 27.

For B_CP-OFDM, a bitmap for each rank may be added. The bitmap size for each rank may be different. That is, B_CP-OFDM may be constructed by union of each rank bitmap. For example, B_CP-OFDM may be configured/indicated by the bitmap scheme such as {B_CP-OFDM_rank1, B_CP-OFDM_rank2, B_CP-OFDM_rank3, B_CP-OFDM_rank4}, herein B_CP-OFDM_rank represents a bitmap for each rank. In the case that CP-OFDM and DFT-s-OFDM share the same rank 1 codebook, the UE may report the capability with a single bitmap, that is, B_CP-OFDM. Here, the capability according to the number of ports may be reported with independent bitmap, and the reported bitmap (more particularly, the number of independent bitmaps) may be configured according to the supported maximum port numbers. For example, in the case that the supported maximum port number=4, the UE may report all of the capability of 2-ports and 4-ports codebooks, but in the case that the supported maximum port number=2, the UE may report only the capability for 2-port codebook in bitmap format.

TRI in LTE may be indicated with DCI of 5 to 6 bits with being joint-encoded with TPMI. However, NR supports CP-OFMD, for indicating information of DMRS, antenna port(s), scrambling identity and layer number may be indicated as Table 22 through the DCI in relation to DL.

TABLE 22

| One Codeword:<br>Codeword 0 enabled,<br>Codeword 1 disabled | | Two Codewords:<br>Codeword 0 enabled,<br>Codeword 1 enabled | |
| --- | --- | --- | --- |
| Value | Message | Value | Message |
| 0 | 1 layer, port 7, nSCID = 0 | 0 | 2 layers, ports 7-8, nSCID = 0 |
| 1 | 1 layer, port 7, nSCID = 1 | 1 | 2 layers, ports 7-8, nSCID = 1 |
| 2 | 1 layer, port 8, nSCID = 0 | 2 | 3 layers, ports 7-9 |
| 3 | 1 layer, port 8, nSCID = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Accordingly, in UL of NR, similar to the information, the information of antenna port(s), scrambling identity and layer number may be indicated in the DCI in relation to UL. In this case, in the case of the UE that supports UL codebook based transmission, an indication of the information of a layer (e.g., information of TRI) is overlapped, and accordingly, DCI may be wasted. Accordingly, in the case that the information of antenna port(s), scrambling identity and layer number is indicated in the DCI in relation to UL, TRI may be indicated with the field and TPMI may be encoded with single/independent field and indicated. At this time, since TPMI size of rank 1 is the biggest, the TPMI size may be configured in accordance with rank 1. A codebook is designed so as to be matched to the configured TPMI size to the maximum for TPMI corresponding to ranks 2 to 4, or in the case that the number of TPMI of the corresponding rank is smaller than TPMI size (e.g., for rank 4 of 4-ports, since it is full rank, TPMI number is about 1 to 3, for example, and in the case that rank 1 TPMI size is 5 bits), (32-3=) 29 remaining states may be used for the use of error check.

In the case that UL transmission based on codebook is performed from a plurality of SRS resources as described above, particularly, in the case of non-coherent transmission represented by non-coherent JT, various option may be existed as described above, and this may be arranged as below example:

Followings are examples of performing codebook based UL transmission based on two SRS resources. Here, TPMIi and TRIi represent TPMI and TRI of $i^{th}$ SRS resource, respectively.

A. (SRI=0)+(TPMI0)+(SRI=1)+(TPMI1)+TRI: In this option, only one TRI is indicated collectively for two SRS resources, and TPMI may be independently indicated for each resource indicated by each SRI.

B. (SRI=0)+(SRI=1)+TPMI+TRI: This option represents the case that the SRS ports in two SRS resources are aggregated and transmitted by using a single TPMI, and herein, TRI may be indicated as single.

C. (SRI=0+TPMI0+TRI0)+(SRI=1+TPMI1+TRI1): This option follows option of A, but corresponds to the case that TRI is indicated for each resource.

As described above, TRI may be indicated in DMRS table. When option A is used, TRI may be interpreted to total rank that the UE performs UL transmission. At this time, in the case that a layer is indicated by using a plurality of resources, it may be ambiguous that the number of layers is indicated/mapped to a certain resource. For example, in the case that UL transmission is performed in two resources, total rank is 3 and it is indicated in DMRS table with TRI=3, it may be ambiguous whether the rank transmitted in each resource is (TRI0, TRI1)=(1,2) or (2,1). Accordingly, an additional indicator (e.g., 1 bit indicator) to clarify it may be used/defined. And/or, in the case that it is indicated by a specific TRI (e.g., TRI=3), it may be indicated the rank in which the corresponding resource(s) is transmitted in SRI field. For example, when total rank is 3, it may be promised between the UE and the gNB that the resource for rank 2-transmission is firstly indicated always. That is, as represented in Table 23 below, in the case that TRI=3, state "01" means that the $0^{th}$ resource is rank 2, and "10" means that the first resource is rank 2.

TABLE 23

| State | SRS resources number |
| --- | --- |
| 00 | 0 |
| 01 | 0, 1 |
| 10 | 1, 0 |
| 11 | 0, 1, 2, 3 |

Even in the case that TRI=1, similar to the case that TRI=3, the fact that the resource in which rank 1 is transmitted may be explicitly indicated with an additional indicator or implicitly indicated implicitly. Otherwise, in the case that TRI=1, since rank 1 transmission is performed in only one resource, only a single resource may be indicated in SRI state.

In the case that TRI=1, rank 2-transmission is performed in the selected one resource, or rank 1 transmission may be performed in every resource. In the former case, like rank 1, in SRI state, only one resource (the selected resource in which rank 2-transmission is performed), and in the latter case, it is understood that rank 1 transmission is performed in each resource, and accordingly, there is no ambiguity.

In the case that TRI=4, it may be understood that each resource performs rank 2-transmission.

This example represents the case, in the case that the number of ports used for total UL transmission is 4, two SRS ports are provided in each two resources, respectively.

In the case that the number of ports used for total UL transmission is 4 or more, the case is described that coherent/non-coherent UL transmission is performed through two resources, and four SRS ports are used for each resource, for example. In addition, in this case, it is assumed that total transmission rank is 4. Then, in the case of the non-coherent transmission, the rank for each resource may be indicated without ambiguity with the proposed option/method up to TRI<=3 case. However, in the case that it is indicated by TRI=4 and rank 4 transmission is performed in one resource, the SRS resource transmitted in SRI field is separately indicated, and accordingly, ambiguity may be removed. However, since there may be ambiguity on whether it is (TRI0, TRI1)=(1,3), (2,2) or (3,1) may be existed, an indicator for distinguishing it may be separately signaled. Otherwise, total TRI may be indicated DMRS table, and TRIi transmitted in each resource may be joint-encoded with TPMI in TPMI field and indicated. That is, DCI may be configured with at least one of the followings.

SRI
One TRI embedded in DMRS
TPMIi+TRIi for each i-th SRS resource

In the case of a transmission using a plurality of SRS resources and in the case that each of TPMI for each resource and/or TRI is indicated, one TPMI (and/or TRI) field may be encoded in the form that a plurality of TPMIis (and/or TRIis) for each resource is concatenated, and in the case that the encoded size is unable to fill the whole payload size of a given field, the remaining bits may be zero-padded. In this case, the UE does not expect that total TRI value is different from the summation of all TRIis indicated by i-th SRS resource in TPMI (and/or TRI) field. That is, it should be satisfied that TRI=TRI0+TRI4+ and so on.

Using the method above, decoding of DCI may be performed in an order: DMRS field->TPMI.

As proposed above, in the case that TRI is embedded in DMRS table, an indicator for TRI is not required. Therefore, TPMI is solely used, and the number of codewords is not restricted significantly for higher rank as well as overhead of DCI is reduced, and accordingly, performance of higher rank may be improved.

One of other methods for reducing overhead of DCI, a method may be considered that TRI and TPMI are joint-encoded and included in a single field, and DMRS table (Table 24 below) is interpreted by the RI indicated in the field.

For example, it is assumed that the DMRS configuration represented in Table 24 is used in UL codebook based transmission. In this case, as a port group, as represented in Table 24, each of indices 0 to 5 for rank 1 (single rank) transmission, indices 6 to 9 for rank 2 transmission, index 10 for rank 3 transmission, and index 11 for rank 4 transmission may be used. Accordingly, DMRS field bit-width of maximum 3 bits (since the index corresponding to rank 1 is 6, which is the greatest) is required. This may have an effect of reducing size/width as much as 1 bit in comparison with the case that the bit size/width of the existing DMRS table exemplified in Table 24 below is used without any change, not reduced (that is, 4-bit DMRS field is used without any change, all of 11 indices are signaled).

TABLE 24

| Index | DMRS port ID (+1000) | # CDM group(s) without data | Re indexing |
|---|---|---|---|
| 0 | 0 | 1 | 0 |
| 1 | 0 | 2 | 1 |
| 2 | 1 | 1 | 2 |
| 3 | 1 | 2 | 3 |
| 4 | 2 | 2 | 4 |
| 5 | 3 | 2 | 5 |
| 6 | 0, 1 | 1 | 0 |
| 7 | 0, 1 | 2 | 1 |
| 8 | 2, 3 | 2 | 2 |
| 9 | 0, 2 | 2 | 3 |
| 10 | 0, 1, 2 | 2 | 0 |
| 11 | 0, 1, 2, 3 | 2 | 0 |
| 12-15 | reserved | reserved | reserved |

As proposed above, by the TRI indicated in TRI+TPMI field, the state of 3-bit DMRS field may be re-indexed for each rank as represented in $4^{th}$ column of Table 24, and the UE may re-interpret DMRS table (e.g., Table 24) based on the indicated TRI. For example, in the case that TRI=2 (rank 2) is indicated in TRI+TPMI field and state 1 (i.e., re-indexing value '1' in Table 24) is indicated in 3-bit DMRS field, the UE may understand/identify that index '7' is indicated in DMRS table of Table 24. In addition, the UE does not expect that the UE is indicated with a state that exceeds the index range of DMRS table in which an indicator indicated in the 3-bit field or not existed. For example, in the case that the UE is indicated with TRI=2, the UE does not expect that the UE is indicated with state 5 in 3-bit DMRS field.

According to this embodiment, decoding of DCI may be performed in the order: TRI+TPMI->DMRS field.

The following alternatives may be considered in order to design it in the direction of increasing granularity or selection flexibility of codebook to the maximum in accordance with TPMI size.

For wideband TPMI, for NR 4 Tx codebook for CP-OFDM:

Alt 1: Rel-10 UL, possibly with additional entries:
Alt 2: Rel-15 DL, possibly with additional entries:
Alt 3: Rel-8 DL, possibly with additional entries For example, since Alt 1 uses the UL codebook without any change, in the case of rank 1, it may be considered to use the codebook (e.g., Table 19) proposed above without any change. Then, total TPMI size becomes 5 bits, and maximum 32 codewords may be considered for each rank.

Then, the codebook for rank 2 may be defined as Table 25.

TABLE 25

| Codebook index | Number of layers $\upsilon = 2$ | | | |
|---|---|---|---|---|
| 0-3 | $\frac{1}{2}\begin{bmatrix} 1 & 0 \\ 1 & 0 \\ 0 & 1 \\ 0 & -j \end{bmatrix}$ | $\frac{1}{2}\begin{bmatrix} 1 & 0 \\ 1 & 0 \\ 0 & 1 \\ 0 & j \end{bmatrix}$ | $\frac{1}{2}\begin{bmatrix} 1 & 0 \\ -j & 0 \\ 0 & 1 \\ 0 & 1 \end{bmatrix}$ | $\frac{1}{2}\begin{bmatrix} 1 & 0 \\ -j & 0 \\ 0 & 1 \\ 0 & -1 \end{bmatrix}$ |

TABLE 25-continued

| Codebook index | Number of layers $\upsilon = 2$ | | | |
|---|---|---|---|---|
| 4-7 | $\frac{1}{2}\begin{bmatrix} 1 & 0 \\ -1 & 0 \\ 0 & 1 \\ 0 & -j \end{bmatrix}$ | $\frac{1}{2}\begin{bmatrix} 1 & 0 \\ -1 & 0 \\ 0 & 1 \\ 0 & j \end{bmatrix}$ | $\frac{1}{2}\begin{bmatrix} 1 & 0 \\ j & 0 \\ 0 & 1 \\ 0 & 1 \end{bmatrix}$ | $\frac{1}{2}\begin{bmatrix} 1 & 0 \\ j & 0 \\ 0 & 1 \\ 0 & -1 \end{bmatrix}$ |
| 8-11 | $\frac{1}{2}\begin{bmatrix} 1 & 0 \\ 0 & 1 \\ 1 & 0 \\ 0 & 1 \end{bmatrix}$ | $\frac{1}{2}\begin{bmatrix} 1 & 0 \\ 0 & 1 \\ 1 & 0 \\ 0 & -1 \end{bmatrix}$ | $\frac{1}{2}\begin{bmatrix} 1 & 0 \\ 0 & 1 \\ -1 & 0 \\ 0 & 1 \end{bmatrix}$ | $\frac{1}{2}\begin{bmatrix} 1 & 0 \\ 0 & 1 \\ -1 & 0 \\ 0 & -1 \end{bmatrix}$ |
| 12-15 | $\frac{1}{2}\begin{bmatrix} 1 & 0 \\ 0 & 1 \\ 0 & 1 \\ 1 & 0 \end{bmatrix}$ | $\frac{1}{2}\begin{bmatrix} 1 & 0 \\ 0 & 1 \\ 0 & -1 \\ 1 & 0 \end{bmatrix}$ | $\frac{1}{2}\begin{bmatrix} 1 & 0 \\ 0 & 1 \\ 0 & 1 \\ -1 & 0 \end{bmatrix}$ | $\frac{1}{2}\begin{bmatrix} 1 & 0 \\ 0 & 1 \\ 0 & -1 \\ -1 & 0 \end{bmatrix}$ |

Codeword indices 0 to 15 defined in Table 25 are a codeword (i.e., partial-coherent codeword) which is proper when partial-coherent transmission is performed, in which four ports are paired with two and transmitted.

Otherwise, in the case that 16 codewords are added, the combination as represented in Table 26 may be derived.

TABLE 26

| Codebook index | Number of layers $\upsilon = 2$ | | | |
|---|---|---|---|---|
| 16-19 | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ |
| 20-23 | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ |
| 24-27 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |
| 28-29 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | — | — |

The codeword of codebook indices 16 to 32 is the port combining codeword (i.e., full coherence codeword) that uses all of four ports, and a part of LTE or NR DL codebook, and the codeword of codebook indices 24 to 29 is the codeword (i.e., non-coherence codeword) which is proper when all of four ports perform non-coherent transmission. As such, in the case that TRI and TPMI are commonly configured, the granularity of TPMI is decreased as going to higher rank considering total payload, but in the case that TRI is indicated in separate DMRS field, there is an advantage that the codebook may be more abundantly configured even in higher rank. This is in connection with coherent transmission of UL TX port, more codewords are allocated to a partial transmission and the like, and this may be helpful in increasing the UE performance having the corresponding capability.

In the same way, in the case of rank 3, a codebook may be configured with Table 27.

TABLE 27

| Codebook index | Number of layers $\upsilon = 3$ | | | |
|---|---|---|---|---|
| 0-3 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ |
| 4-7 | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 1 & 0 & 0 \\ 0 & 1 & 0 \\ 0 & 0 & 1 \\ -1 & 0 & 0 \end{bmatrix}$ | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ |
| 8-11 | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |
| 12-15 | $\frac{1}{2\sqrt{3}}\begin{bmatrix} 1 & 1 & 1 \\ 1 & 1 & -1 \\ 1 & -1 & 1 \\ 1 & -1 & -1 \end{bmatrix}$ | $\frac{1}{2\sqrt{3}}\begin{bmatrix} 1 & 1 & 1 \\ 1 & 1 & -1 \\ j & -j & j \\ j & -j & -j \end{bmatrix}$ | $\frac{1}{2\sqrt{3}}\begin{bmatrix} 1 & 1 & 1 \\ j & j & -j \\ 1 & -1 & 1 \\ j & -j & -j \end{bmatrix}$ | $\frac{1}{2\sqrt{3}}\begin{bmatrix} 1 & 1 & 1 \\ j & j & -j \\ j & -j & j \\ -1 & 1 & 1 \end{bmatrix}$ |
| 16-19 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 0 & 0 & 0 \\ 0 & 0 & 1 \end{bmatrix}$ | $\frac{1}{2}\begin{bmatrix} 1 & 0 & 0 \\ 0 & 0 & 0 \\ 0 & 1 & 0 \\ 0 & 0 & 1 \end{bmatrix}$ | $\frac{1}{2}\begin{bmatrix} 0 & 0 & 0 \\ 1 & 0 & 0 \\ 0 & 1 & 0 \\ 0 & 0 & 1 \end{bmatrix}$ |

In this table, codeword indices 12 to 15 are port combining codewords that use all of four ports, and a part of LTE or NR DL codebook, and an example of a codeword (i.e., full coherence codeword) which is proper when four ports are transmitted coherently. Codeword indices 16 to 19 are an example of a codeword (i.e., non-coherence codeword) which is proper when all of four ports are transmitted non-coherently. And/or, in this table, codeword indices 0 to 11 are an example of a codeword (i.e., partial-coherence codeword) which is proper when four ports are transmitted partially-coherently. At this time, antenna turn off is considered to the power scaling factor, and as another scaling factor, for example, $\sqrt{3}$ may also be considered. In addition to the example, in order to increase the granularity of the remaining states, a part of or the whole Rel-8 LTE DL house-hold codebook may be included/used.

An example of rank 4 codebook is as represented in Table 28.

TABLE 28

| Codebook index | Number of layers $v = 4$ | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{4}\begin{bmatrix} 1 & 1 & 1 & 1 \\ 1 & 1 & -1 & -1 \\ 1 & -1 & 1 & -1 \\ 1 & -1 & -1 & 1 \end{bmatrix}$ | $\frac{1}{4}\begin{bmatrix} 1 & 1 & 1 & 1 \\ 1 & 1 & -1 & -1 \\ j & -j & j & -j \\ j & -j & -j & j \end{bmatrix}$ | $\frac{1}{4}\begin{bmatrix} 1 & 1 & 1 & 1 \\ j & j & -j & -j \\ 1 & -1 & 1 & -1 \\ j & -j & -j & j \end{bmatrix}$ |
| 4 | $\frac{1}{4}\begin{bmatrix} 1 & 1 & 1 & 1 \\ j & j & -j & -j \\ j & -j & j & -j \\ -1 & 1 & 1 & -1 \end{bmatrix}$ | — | — | — |

In this table, codeword indices 1 to 4 are port combining codewords (i.e., full coherence codeword) that use all of four ports, and a part of LTE or NR DL codebook, and an example that four ports are transmitted coherently. In addition to the example, in order to increase the granularity of the remaining states, a part of or the whole Rel-8 LTE DL house-hold codebook may be included/used. Particularly, since rank 4 is total rank transmission, and it is anticipated that performance may not improved greatly even in the case of increasing granularity. Accordingly, in order to reduce the UE complexity, it may be configured with a specific number (e.g., 3) of codewords (e.g., configured with 0, 1 and 3 codewords).

In the case of 4Tx codebook for CP-OFDM, payload of TPMI may be changed due to the codebook subset restriction indicated by coherence capability report (e.g., full coherence, partial-coherence, and non-coherence) of the UE or higher layer signaling. At this time, in the case that TRI and TPMI are joint-encoded, the payload reduction effect may correspond to the case that the summation of TPMIs for each rank according to each coherence capability is decreased. In the case that TRI and TPMI are separately encoded, the maximum value of TPMI size for each rank should be decreased for payload reduction of TPMI. Accordingly, it is proposed to restrict the maximum TPMI size according to each coherence capability. For example, the following example may be considered.

1. Full Coherence—5 Bits 1-1. For Rank 1, a Codebook May be Defined as Represented in Table 29.

TABLE 29

| 0-7 | $\frac{1}{2}\begin{bmatrix} 1 \\ 1 \\ 1 \\ -1 \end{bmatrix}$ | $\frac{1}{2}\begin{bmatrix} 1 \\ 1 \\ j \\ j \end{bmatrix}$ | $\frac{1}{2}\begin{bmatrix} 1 \\ 1 \\ -1 \\ 1 \end{bmatrix}$ | $\frac{1}{2}\begin{bmatrix} 1 \\ 1 \\ -j \\ -j \end{bmatrix}$ | $\frac{1}{2}\begin{bmatrix} 1 \\ j \\ 1 \\ j \end{bmatrix}$ | $\frac{1}{2}\begin{bmatrix} 1 \\ j \\ j \\ 1 \end{bmatrix}$ | $\frac{1}{2}\begin{bmatrix} 1 \\ j \\ -1 \\ -j \end{bmatrix}$ | $\frac{1}{2}\begin{bmatrix} 1 \\ j \\ -j \\ -1 \end{bmatrix}$ |
| 8-15 | $\frac{1}{2}\begin{bmatrix} 1 \\ -1 \\ 1 \\ 1 \end{bmatrix}$ | $\frac{1}{2}\begin{bmatrix} 1 \\ -1 \\ j \\ -j \end{bmatrix}$ | $\frac{1}{2}\begin{bmatrix} 1 \\ -1 \\ -1 \\ -1 \end{bmatrix}$ | $\frac{1}{2}\begin{bmatrix} 1 \\ -1 \\ -j \\ j \end{bmatrix}$ | $\frac{1}{2}\begin{bmatrix} 1 \\ -j \\ 1 \\ -j \end{bmatrix}$ | $\frac{1}{2}\begin{bmatrix} 1 \\ -j \\ j \\ 1 \end{bmatrix}$ | $\frac{1}{2}\begin{bmatrix} 1 \\ -j \\ -1 \\ j \end{bmatrix}$ | $\frac{1}{2}\begin{bmatrix} 1 \\ -j \\ -j \\ 1 \end{bmatrix}$ |

| Codebook index | Number of layers $v = 1$ | | | | | | | |
|---|---|---|---|---|---|---|---|---|
| 16-23 | $\frac{1}{2}\begin{bmatrix} 1 \\ 0 \\ 1 \\ 0 \end{bmatrix}$ | $\frac{1}{2}\begin{bmatrix} 1 \\ 0 \\ -1 \\ 0 \end{bmatrix}$ | $\frac{1}{2}\begin{bmatrix} 1 \\ 0 \\ j \\ 0 \end{bmatrix}$ | $\frac{1}{2}\begin{bmatrix} 1 \\ 0 \\ -j \\ 0 \end{bmatrix}$ | $\frac{1}{2}\begin{bmatrix} 0 \\ 1 \\ 0 \\ 1 \end{bmatrix}$ | $\frac{1}{2}\begin{bmatrix} 0 \\ 1 \\ 0 \\ -1 \end{bmatrix}$ | $\frac{1}{2}\begin{bmatrix} 0 \\ 1 \\ 0 \\ j \end{bmatrix}$ | $\frac{1}{2}\begin{bmatrix} 0 \\ 1 \\ 0 \\ -j \end{bmatrix}$ |
| 24-27 | $\frac{1}{2}\begin{bmatrix} 1 \\ 0 \\ 0 \\ 0 \end{bmatrix}$ | $\frac{1}{2}\begin{bmatrix} 0 \\ 1 \\ 0 \\ 0 \end{bmatrix}$ | $\frac{1}{2}\begin{bmatrix} 0 \\ 0 \\ 1 \\ 0 \end{bmatrix}$ | $\frac{1}{2}\begin{bmatrix} 0 \\ 0 \\ 0 \\ 1 \end{bmatrix}$ | — | — | — | — |

In order to fill 32 states additionally in Table 29, by considering 8 PSK with the phase of each of the elements, the codeword as represented in Equation 33 may be considered additionally.

[Equation 33]

$$e_0 = \begin{bmatrix} 1 \\ \frac{1-j}{\sqrt{2}} \\ -j \\ \frac{-1-j}{\sqrt{2}} \end{bmatrix}, \bar{e}_0 = \begin{bmatrix} 1 \\ \frac{1+j}{\sqrt{2}} \\ j \\ \frac{-1+j}{\sqrt{2}} \end{bmatrix},$$

$$e_1 = \begin{bmatrix} 1 \\ \frac{-1+j}{\sqrt{2}} \\ -j \\ \frac{1+j}{\sqrt{2}} \end{bmatrix}, \bar{e}_1 = \begin{bmatrix} 1 \\ \frac{-1-j}{\sqrt{2}} \\ j \\ \frac{1-j}{\sqrt{2}} \end{bmatrix}$$

1-2. For Rank 2, the Codebook May be Represented in Table 30.

TABLE 30

| Codebook index | Number of layers $\upsilon = 2$ | | | |
|---|---|---|---|---|
| 0-3 | $\frac{1}{2}\begin{bmatrix} 1 & 0 \\ 1 & 0 \\ 0 & 1 \\ 0 & -j \end{bmatrix}$ | $\frac{1}{2}\begin{bmatrix} 1 & 0 \\ 1 & 0 \\ 0 & 1 \\ 0 & j \end{bmatrix}$ | $\frac{1}{2}\begin{bmatrix} 1 & 0 \\ -j & 0 \\ 0 & 1 \\ 0 & 1 \end{bmatrix}$ | $\frac{1}{2}\begin{bmatrix} 1 & 0 \\ -j & 0 \\ 0 & 1 \\ 0 & -1 \end{bmatrix}$ |
| 4-7 | $\frac{1}{2}\begin{bmatrix} 1 & 0 \\ -1 & 0 \\ 0 & 1 \\ 0 & -j \end{bmatrix}$ | $\frac{1}{2}\begin{bmatrix} 1 & 0 \\ -1 & 0 \\ 0 & 1 \\ 0 & j \end{bmatrix}$ | $\frac{1}{2}\begin{bmatrix} 1 & 0 \\ j & 0 \\ 0 & 1 \\ 0 & 1 \end{bmatrix}$ | $\frac{1}{2}\begin{bmatrix} 1 & 0 \\ j & 0 \\ 0 & 1 \\ 0 & -1 \end{bmatrix}$ |
| 8-11 | $\frac{1}{2}\begin{bmatrix} 1 & 0 \\ 0 & 1 \\ 1 & 0 \\ 0 & 1 \end{bmatrix}$ | $\frac{1}{2}\begin{bmatrix} 1 & 0 \\ 0 & 1 \\ 1 & 0 \\ 0 & -1 \end{bmatrix}$ | $\frac{1}{2}\begin{bmatrix} 1 & 0 \\ 0 & 1 \\ -1 & 0 \\ 0 & 1 \end{bmatrix}$ | $\frac{1}{2}\begin{bmatrix} 1 & 0 \\ 0 & 1 \\ -1 & 0 \\ 0 & -1 \end{bmatrix}$ |
| 12-15 | $\frac{1}{2}\begin{bmatrix} 1 & 0 \\ 0 & 1 \\ 0 & 1 \\ 1 & 0 \end{bmatrix}$ | $\frac{1}{2}\begin{bmatrix} 1 & 0 \\ 0 & 1 \\ 0 & -1 \\ 1 & 0 \end{bmatrix}$ | $\frac{1}{2}\begin{bmatrix} 1 & 0 \\ 0 & 1 \\ 0 & 1 \\ -1 & 0 \end{bmatrix}$ | $\frac{1}{2}\begin{bmatrix} 1 & 0 \\ 0 & 1 \\ 0 & -1 \\ -1 & 0 \end{bmatrix}$ |
| 16-19 | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ |
| 20-23 | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ |
| 24-27 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |

TABLE 30-continued

| Codebook index | Number of layers $v = 2$ | | | |
|---|---|---|---|---|
| 28-29 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | — | — |

And/or, as another example, a codebook may be configured by selecting four (e.g., 24 to 27) among codeword indices 24 to 29 of rank 2 codebook of Table 30 above. Then, the additional four states for adjusting to 5 bit size may be configured as represented in Equation 34 or may be selected among eight states defined in Equation 35.

$$\frac{1}{2\sqrt{2}}\begin{bmatrix} 1 & \frac{-1+j}{\sqrt{2}} \\ \frac{1-j}{\sqrt{2}} & -j \\ -j & \frac{-1-j}{\sqrt{2}} \\ \frac{-1-j}{\sqrt{2}} & 1 \end{bmatrix}, \frac{1}{2\sqrt{2}}\begin{bmatrix} 1 & -j \\ \frac{1+j}{\sqrt{2}} & \frac{-1+j}{\sqrt{2}} \\ j & 1 \\ \frac{-1+j}{\sqrt{2}} & \frac{1-j}{\sqrt{2}} \end{bmatrix},$$ [Equation 34]

$$\frac{1}{2\sqrt{2}}\begin{bmatrix} 1 & \frac{1+j}{\sqrt{2}} \\ \frac{-1+j}{\sqrt{2}} & j \\ j & \frac{1-j}{\sqrt{2}} \\ \frac{1-j}{\sqrt{2}} & 1 \end{bmatrix}, \frac{1}{2\sqrt{2}}\begin{bmatrix} 1 & j \\ \frac{-1+j}{\sqrt{2}} & \frac{1+j}{\sqrt{2}} \\ -j & 1 \\ \frac{1+j}{\sqrt{2}} & \frac{1j}{\sqrt{2}} \end{bmatrix}$$

$$\frac{1}{2\sqrt{2}}\begin{bmatrix} 1 & 1 \\ \frac{1+j}{\sqrt{2}} & \frac{1+j}{\sqrt{2}} \\ 1 & -1 \\ \frac{1+j}{\sqrt{2}} & \frac{-1-j}{\sqrt{2}} \end{bmatrix}, \frac{1}{2\sqrt{2}}\begin{bmatrix} 1 & 1 \\ \frac{1+j}{\sqrt{2}} & \frac{1+j}{\sqrt{2}} \\ j & -j \\ \frac{-1+j}{\sqrt{2}} & \frac{1-j}{\sqrt{2}} \end{bmatrix},$$ [Equation 35]

$$\frac{1}{2\sqrt{2}}\begin{bmatrix} 1 & 1 \\ \frac{1-j}{\sqrt{2}} & \frac{1-j}{\sqrt{2}} \\ 1 & -1 \\ \frac{1-j}{\sqrt{2}} & \frac{-1+j}{\sqrt{2}} \end{bmatrix}, \frac{1}{2\sqrt{2}}\begin{bmatrix} 1 & 1 \\ \frac{1-j}{\sqrt{2}} & \frac{1-j}{\sqrt{2}} \\ j & -j \\ \frac{1+j}{\sqrt{2}} & \frac{-1-j}{\sqrt{2}} \end{bmatrix},$$

$$\frac{1}{2\sqrt{2}}\begin{bmatrix} 1 & 1 \\ \frac{-1+j}{\sqrt{2}} & \frac{-1+j}{\sqrt{2}} \\ 1 & -1 \\ \frac{-1+j}{\sqrt{2}} & \frac{1-j}{\sqrt{2}} \end{bmatrix}, \frac{1}{2\sqrt{2}}\begin{bmatrix} 1 & 1 \\ \frac{-1+j}{\sqrt{2}} & \frac{-1+j}{\sqrt{2}} \\ j & -j \\ \frac{1-j}{\sqrt{2}} & \frac{1+j}{\sqrt{2}} \end{bmatrix},$$

$$\frac{1}{2\sqrt{2}}\begin{bmatrix} 1 & 1 \\ \frac{-1-j}{\sqrt{2}} & \frac{-1-j}{\sqrt{2}} \\ 1 & -1 \\ \frac{-1-j}{\sqrt{2}} & \frac{1+j}{\sqrt{2}} \end{bmatrix}, \frac{1}{2\sqrt{2}}\begin{bmatrix} 1 & 1 \\ \frac{-1-j}{\sqrt{2}} & \frac{-1-j}{\sqrt{2}} \\ j & -j \\ \frac{1-j}{\sqrt{2}} & \frac{-1+j}{\sqrt{2}} \end{bmatrix}$$

And/or, all of eight 8-PSK rank 2 are used, but 12 codewords (e.g., #0 to #11 codebook/codeword) are selected among #0 to #15 codebook, and total 32 states may be configured.

1-3. For Rank 3, the Codebook May be Represented in Table 31.

TABLE 31

| Codebook index | Number of layers $v = 3$ | | | |
|---|---|---|---|---|
| 0-3 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ |
| 4-7 | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 1 & 0 & 0 \\ 0 & 1 & 0 \\ 0 & 0 & 1 \\ -1 & 0 & 0 \end{bmatrix}$ | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ |
| 8-11 | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |
| 12-15 | $\frac{1}{2\sqrt{3}}\begin{bmatrix} 1 & 1 & 1 \\ 1 & 1 & -1 \\ 1 & -1 & 1 \\ 1 & -1 & -1 \end{bmatrix}$ | $\frac{1}{2\sqrt{3}}\begin{bmatrix} 1 & 1 & 1 \\ 1 & 1 & -1 \\ j & -j & j \\ j & -j & -j \end{bmatrix}$ | $\frac{1}{2\sqrt{3}}\begin{bmatrix} 1 & 1 & 1 \\ j & j & -j \\ 1 & -1 & 1 \\ j & -j & -j \end{bmatrix}$ | $\frac{1}{2\sqrt{3}}\begin{bmatrix} 1 & 1 & 1 \\ j & j & -j \\ j & -j & j \\ -1 & 1 & 1 \end{bmatrix}$ |
| 16-19 | $\frac{1}{2\sqrt{3}}\begin{bmatrix} 1 & 1 & 1 \\ 1 & 1 & -1 \\ 1 & -1 & -1 \\ 1 & -1 & 1 \end{bmatrix}$ | $\frac{1}{2\sqrt{3}}\begin{bmatrix} 1 & 1 & 1 \\ 1 & 1 & -1 \\ j & -j & -j \\ j & -j & j \end{bmatrix}$ | $\frac{1}{2\sqrt{3}}\begin{bmatrix} 1 & 1 & 1 \\ j & j & -j \\ 1 & -1 & -1 \\ j & -j & j \end{bmatrix}$ | $\frac{1}{2\sqrt{3}}\begin{bmatrix} 1 & 1 & 1 \\ j & j & -j \\ j & -j & -j \\ -1 & 1 & -1 \end{bmatrix}$ |
| 20-23 | $\frac{1}{2\sqrt{3}}\begin{bmatrix} 1 & 1 & 1 \\ \frac{1+j}{\sqrt{2}} & \frac{1+j}{\sqrt{2}} & \frac{-1-j}{\sqrt{2}} \\ 1 & -1 & 1 \\ \frac{1+j}{\sqrt{2}} & \frac{-1-j}{\sqrt{2}} & \frac{-1-j}{\sqrt{2}} \end{bmatrix}$ | $\frac{1}{2\sqrt{3}}\begin{bmatrix} 1 & 1 & 1 \\ \frac{1+j}{\sqrt{2}} & \frac{1+j}{\sqrt{2}} & \frac{-1-j}{\sqrt{2}} \\ j & -j & j \\ \frac{-1+j}{\sqrt{2}} & \frac{1-j}{\sqrt{2}} & \frac{1-j}{\sqrt{2}} \end{bmatrix}$ | $\frac{1}{2\sqrt{3}}\begin{bmatrix} 1 & 1 & 1 \\ \frac{-1+j}{\sqrt{2}} & \frac{-1+j}{\sqrt{2}} & \frac{1-j}{\sqrt{2}} \\ 1 & -1 & 1 \\ \frac{-1+j}{\sqrt{2}} & \frac{1-j}{\sqrt{2}} & \frac{1-j}{\sqrt{2}} \end{bmatrix}$ | $\frac{1}{2\sqrt{3}}\begin{bmatrix} 1 & 1 & 1 \\ \frac{-1+j}{\sqrt{2}} & \frac{-1+j}{\sqrt{2}} & \frac{1-j}{\sqrt{2}} \\ j & -j & j \\ \frac{-1-j}{\sqrt{2}} & \frac{1+j}{\sqrt{2}} & \frac{1+j}{\sqrt{2}} \end{bmatrix}$ |
| 24-27 | $\frac{1}{2\sqrt{3}}\begin{bmatrix} 1 & 1 & 1 \\ \frac{1+j}{\sqrt{2}} & \frac{1+j}{\sqrt{2}} & \frac{-1-j}{\sqrt{2}} \\ 1 & -1 & -1 \\ \frac{1+j}{\sqrt{2}} & \frac{-1-j}{\sqrt{2}} & \frac{1+j}{\sqrt{2}} \end{bmatrix}$ | $\frac{1}{2\sqrt{3}}\begin{bmatrix} 1 & 1 & 1 \\ \frac{1+j}{\sqrt{2}} & \frac{1+j}{\sqrt{2}} & \frac{-1-j}{\sqrt{2}} \\ j & -j & -j \\ \frac{-1+j}{\sqrt{2}} & \frac{1-j}{\sqrt{2}} & \frac{-1+j}{\sqrt{2}} \end{bmatrix}$ | $\frac{1}{2\sqrt{3}}\begin{bmatrix} 1 & 1 & 1 \\ \frac{-1+j}{\sqrt{2}} & \frac{-1+j}{\sqrt{2}} & \frac{1-j}{\sqrt{2}} \\ 1 & -1 & -1 \\ \frac{-1+j}{\sqrt{2}} & \frac{1-j}{\sqrt{2}} & \frac{-1+j}{\sqrt{2}} \end{bmatrix}$ | $\frac{1}{2\sqrt{3}}\begin{bmatrix} 1 & 1 & 1 \\ \frac{-1+j}{\sqrt{2}} & \frac{-1+j}{\sqrt{2}} & \frac{1-j}{\sqrt{2}} \\ j & -j & -j \\ \frac{-1-j}{\sqrt{2}} & \frac{1+j}{\sqrt{2}} & \frac{-1+j}{\sqrt{2}} \end{bmatrix}$ |
| 28-31 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 0 & 0 & 0 \\ 0 & 0 & 1 \end{bmatrix}$ | $\frac{1}{2}\begin{bmatrix} 1 & 0 & 0 \\ 0 & 0 & 0 \\ 0 & 1 & 0 \\ 0 & 0 & 1 \end{bmatrix}$ | $\frac{1}{2}\begin{bmatrix} 0 & 0 & 0 \\ 1 & 0 & 0 \\ 0 & 1 & 0 \\ 0 & 0 & 1 \end{bmatrix}$ |

And/or, a part of the codewords of 20 to 27 defined in Table 31 may be replaced by at least a part of the codebooks in the form as represented in Table 36 below.

$$\frac{1}{2\sqrt{3}}\begin{bmatrix}1 & \sqrt{2} & 0\\ 1 & 0 & \sqrt{2}\\ 1 & -\sqrt{2} & 0\\ 1 & 0 & -\sqrt{2}\end{bmatrix}, \frac{1}{2\sqrt{3}}\begin{bmatrix}1 & \sqrt{2} & 0\\ 1 & 0 & \sqrt{2}\\ j & -\sqrt{2}j & 0\\ -j & 0 & -\sqrt{2}j\end{bmatrix},$$

[Equation 36]

$$\frac{1}{2\sqrt{3}}\begin{bmatrix}1 & \sqrt{2} & 0\\ 1 & 0 & \sqrt{2}\\ -1 & \sqrt{2} & 0\\ -1 & 0 & \sqrt{2}\end{bmatrix}, \frac{1}{2\sqrt{3}}\begin{bmatrix}1 & \sqrt{2} & 0\\ -j & 0 & \sqrt{2}\\ j & -\sqrt{2}j & 0\\ 1 & 0 & -\sqrt{2}j\end{bmatrix},$$

$$\frac{1}{2\sqrt{3}}\begin{bmatrix}1 & \sqrt{2} & 0\\ j & -\sqrt{2}j & 0\\ 1 & 0 & 1\\ -j & 0 & \sqrt{2}1_j\end{bmatrix},$$

$$\frac{1}{2\sqrt{3}}\begin{bmatrix}1 & \sqrt{2} & 0\\ j & -\sqrt{2}j & 0\\ -j & 0 & \sqrt{2}\\ -1 & 0 & -\sqrt{2}j\end{bmatrix},$$

$$\frac{1}{2\sqrt{3}}\begin{bmatrix}1 & \sqrt{2} & 0\\ j & -\sqrt{2}j & 0\\ -1 & 0 & \sqrt{2}\\ j & 0 & \sqrt{2}j\end{bmatrix}, \frac{1}{2\sqrt{3}}\begin{bmatrix}1 & \sqrt{2} & 0\\ -j & \sqrt{2}j & 0\\ -1 & 0 & \sqrt{2}\\ -j & 0 & -\sqrt{2}j\end{bmatrix}$$

$$\frac{1}{2\sqrt{3}}\begin{bmatrix}1 & \sqrt{2} & 0\\ -1 & 0 & \sqrt{2}\\ 1 & 0 & \sqrt{2}\\ -1 & \sqrt{2} & 0\end{bmatrix}, \frac{1}{2\sqrt{3}}\begin{bmatrix}1 & \sqrt{2} & 0\\ -1 & 0 & \sqrt{2}\\ j & 0 & \sqrt{2}j\\ j & -\sqrt{2}j & 0\end{bmatrix},$$

$$\frac{1}{2\sqrt{3}}\begin{bmatrix}1 & \sqrt{2} & 0\\ -1 & 0 & \sqrt{2}\\ -1 & 0 & -\sqrt{2}\\ 1 & -\sqrt{2} & 0\end{bmatrix}, \frac{1}{2\sqrt{3}}\begin{bmatrix}1 & \sqrt{2} & 0\\ -1 & 0 & \sqrt{2}\\ -j & 0 & -\sqrt{2}j\\ -j & \sqrt{2}j & 0\end{bmatrix}$$

For rank 3 codebook, it is identified that the transmission power corresponding to each antenna port is the same when it is seen as the summation (=0.25) of each layer, and all antenna port is transmitted through the first layer, and only a specific port group is transmitted through the second and third layers, and it may be seen that it has the property of port selection and port combination properly.

1-4. For Rank 4, the Codebook May be Represented in Table 32.

TABLE 32

| | | | | | |
|---|---|---|---|---|---|
| 0/3 | $\frac{1}{4}\begin{bmatrix}1 & 1 & 1 & 1\\ 1 & 1 & -1 & -1\\ 1 & -1 & 1 & -1\\ 1 & -1 & -1 & 1\end{bmatrix}$ | $\frac{1}{4}\begin{bmatrix}1 & 1 & 1 & 1\\ 1 & 1 & -1 & -1\\ j & -j & j & -j\\ j & -j & -j & j\end{bmatrix}$ | $\frac{1}{4}\begin{bmatrix}1 & 1 & 1 & 1\\ j & j & -j & -j\\ 1 & -1 & 1 & -1\\ j & -j & -j & j\end{bmatrix}$ | $\frac{1}{4}\begin{bmatrix}1 & 1 & 1 & 1\\ j & j & -j & -j\\ j & -j & j & -j\\ -1 & 1 & 1 & -1\end{bmatrix}$ | |
| 4/7 | $\frac{1}{2\sqrt{2}}\begin{bmatrix}1 & 1 & 0 & 0\\ 0 & 0 & 1 & 1\\ 1 & -1 & 0 & 0\\ 0 & 0 & 1 & -1\end{bmatrix}$ | $\frac{1}{2\sqrt{2}}\begin{bmatrix}1 & 1 & 0 & 0\\ 0 & 0 & 1 & 1\\ j & -j & 0 & 0\\ 0 & 0 & j & -j\end{bmatrix}$ | $\frac{1}{2\sqrt{2}}\begin{bmatrix}1 & 1 & 0 & 0\\ 0 & 0 & j & j\\ 1 & -1 & 0 & 0\\ 0 & 0 & -j & j\end{bmatrix}$ | $\frac{1}{2\sqrt{2}}\begin{bmatrix}1 & 1 & 0 & 0\\ 0 & 0 & j & j\\ 1 & -1 & 0 & 0\\ 0 & 0 & -1 & 1\end{bmatrix}$ | |
| 8-11 | $\frac{1}{2\sqrt{2}}\begin{bmatrix}1 & 1 & 0 & 0\\ 0 & 0 & -1 & -1\\ 1 & -1 & 0 & 0\\ 0 & 0 & -1 & 1\end{bmatrix}$ | $\frac{1}{2\sqrt{2}}\begin{bmatrix}1 & 1 & 0 & 0\\ 0 & 0 & -1 & -1\\ j & -j & 0 & 0\\ 0 & 0 & -j & j\end{bmatrix}$ | $\frac{1}{2\sqrt{2}}\begin{bmatrix}1 & 1 & 0 & 0\\ 0 & 0 & -j & -j\\ 1 & -1 & 0 & 0\\ 0 & 0 & j & -j\end{bmatrix}$ | $\frac{1}{2\sqrt{2}}\begin{bmatrix}1 & 1 & 0 & 0\\ 0 & 0 & -j & -j\\ 1 & -1 & 0 & 0\\ 0 & 0 & 1 & -1\end{bmatrix}$ | |
| 12 | $\frac{1}{2}\begin{bmatrix}1 & 0 & 0 & 0\\ 0 & 1 & 0 & 0\\ 0 & 0 & 1 & 0\\ 0 & 0 & 0 & 1\end{bmatrix}$ | | | | |

In rank 4 codebook, it may be interpreted that layer 2 transmission is performed in two panels for codewords of 4 to 7. That is, Table 32 represents a codebook for layer 2 transmission of each of antenna ports {1, 3}, {2, 4}, and may be used for the purpose of covering multiple-panel codebook.

Generally, as the layer increases, the gain obtained from the granularity of codebook is not so great. For example, in the total rank transmission example, the case of rank 4 transmission may show the performance which is not so behind greatly in comparison with the case of using various codebooks, even in the case that only 1 or 2 codewords are used. Accordingly, in the case that a codebook is configured with a combination or the subset of the proposed codebooks, not all of the configured TPMI size (5 bits for the embodiment) may be used as the layer increases, and the bit/state which is not used may be used for error detection. In addition, there is an advantage that TPMI calculation complexity decreases as bit/state decrease in the aspect of the gNB.

2. Partial Coherence—4 Bits

A partial coherence codebook may be configured with at least a part among the codewords (i.e., partial-coherence (transmission) codeword, non-coherence (transmission) codeword) being selected except the full coherence transmission coherence in the proposed full coherence codebook. For example, the partial-coherence codeword may be configured with indices 16 to 27 codewords for rank 1, codewords of indices 0 to 11 and 28 to 31 for rank 2, codewords of indices 0 to 11 and 28 to 31 for rank 3, and codewords of indices 4 to 12 for rank 4, in the proposed full coherence codebook. In this case, the maximum number of codewords is 16, and 4 bits may be allocated.

3. Non-Coherence—2 Bits

The non-coherence codebook may be configured with at least a part of the codewords (i.e., non-coherence (transmission) codebook) being selected except the full (or partial) coherence (transmission) codebook in the proposed full (or partial) coherence codebook. For example, the non-coherence codebook may be configured with indices 24 to 27 codewords for rank 1, codewords of indices 28 to 31 for rank 2, codewords of indices 28 to 31 for rank 3, and codewords of index 12 for rank 4, in the proposed full coherence codebook. In this case, the maximum number of codewords is 4, and 2 bits may be allocated.

That is, in summary of the contents described above, the full coherence codebook may be configured with full coherence transmission codebook, partial coherence transmission codebook and non-coherence transmission codebook. The partial coherence codebook may be configured with partial coherence transmission codebook and non-coherence transmission codebook, and the non-coherence codebook may be configured with non-coherence transmission codebook.

Accordingly, types of UL codebook may include full coherence codebook, partial coherence codebook and non-coherence codebook, and UL codebook (i.e., full coherence codebook) may be configured with full coherence (transmission) codebook, partial coherence (transmission) codebook and non-coherence (transmission) codebook.

In the present disclosure, a codeword may be referred to as 'precoding matrix'.

In the case that DFT-s-OFDM and CP-OFDM are configured with separate DCI formats, the proposal may be applied to the DCI format configuration for CP-OFDM. In the case that DFT-s-OFDM and CP-OFDM support dynamic switching, it may preferable that the DCI field design is a design integrated to a waveform. Accordingly, in the case that CP-OFDM is changed to DFT-s-OFDM, the fields indicating information such as antenna port(s), scrambling identification and layer number may be interpreted by Table 33 changeably in the UL-related DCI. Table 33 is a table of mapping a cyclic shift field in the UL-related DCI format to $n_{DMRS,\lambda}^{(2)}$ and $[w^{(\lambda)}(0) \ w^{(\lambda)}(1)]$.

TABLE 33

| Cyclic Shift Field in uplink-related DCI format [3] | $n_{DMRS,\lambda}^{(2)}$ | | | | $[w^{(\lambda)}(0) \ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

In Table 33, since lambda is a parameter in relation to a rank, only the column for lambda=0 may be applied to DFT-s-OFDM.

In the codebook, a power scaling is configured by assuming antenna turn-off. That is, when a transmission power of the UE in a given power is referred to as P, the power is uniformly distributed to all ports, and a transmission power of each port is given by P/N (herein, N is the number of ports) regardless of layer. At this time, in the case that a transmission is performed by using only a port among 4 ports, transmission power is decreased to P/4, that is, 6 dB, and a problem occurs that coverage becomes reduced. Division of power by all number of ports has an advantage in the Tx chain cost aspect of the UE as well as an advantage of battery save of the UE. That is, by allowing the power boosting, a power transmission is performed with P/2 or P, not P/4, for 4-port case, there is a problem that the dynamic range of the transmission power of Tx chain should become greater, which may increase cost. On the other hand, a high-end UE may be provided with a Tx chain of which dynamic range is great, and may report it as a capability. That is, in UL transmission, the UE may report the capability in relation to whether to transmit with a specific X dB (e.g., 3 dB) or less from the maximum transmission power, and this may be considered in normalized factor determination of non-coherent transmission. For example, in the case of rank 1 TPMI indices 24 to 27, normalization factor may be set to $\sqrt{2}$ or 1, not 2, or promised/defined in advance as s specific value (e.g., $\sqrt{2}$) in advance.

In the case that the proposed codebook is used for SB TPMI, a codeword used for each SB may be changed. For example, TPMI of a specific SB may be based on the codebook (e.g., full coherence codebook) that uses all ports, and another specific SB may be based on the codebook (e.g., partial coherence codebook) that uses a part of ports. In this case, when the number of ports is changed for each SB, the case that UL power control becomes very complex occurs. Accordingly, the number of ports used in SB may be determined with WB (this may be signaled with port selection codebook format or bitmap format), and it may be proposed that SB TPMI considers only the codebook that uses all of the number of ports indicated with WB. That is, in describing with the aspect of power scaling factor, it is assumed that the power of TPMI that uses all of the power P used in total TPMI transmission is normalized to 1. The number of port, power scaling and/or p (0<p<=1) used in SB TPMI transmission is determined by the method like WB TPMI, and SB TPMI is normalized as power scaling factor 1 necessarily in order not to change p value.

A codebook based transmission for UL is supported by UL grant signaling as below, at least:

SRI+TPMI+TRI, herein, TPMI is used for representing precoder preferred through SRS port of the SRS resource selected by SRI. When a single SRS resource is set, SRI may not be existed. TPMI is used for indicating procoder preferred through SRS port of the single SRS resource which is set.

Indication support for a plurality of SRS resource selection

In the case of a codebook based transmission for CP-OFDM based UL, the UE is configured with UL frequency selective precoding, and in the case that SB TPMI signaling method is supported, one of the following alternatives may be supported:

Alt 1: Only for PRB allocated for a given PUSCH transmission, SB TPMI is signaled to the UE through DCI.

Alt 2: Regardless of actual RA for a given PUSCH transmission, SB TPMI is signaled to the UE through DCI for all PRBs of the UE.

However, other alternatives are not also excluded. In the case that dual stage codebook is supported, SB TPMI may correspond to W2.

WB TPMI may be signaled together with subband TPMI or not.

In the case of UL codebook design, one of following two structures may be supported in NR.

Alt 0: Single stage codebook
Alt 1: Dual stage codebook

In LTE, in order to support SC-OFDM that requires a design restriction such as maintaining PAPR and CM, a single stage UL codebook for 2-ports and 4-ports has been used (i.e., CM should not be increased due to multiple-layer transmission). Accordingly, in the case that rank is greater than 1, LTE UL codebook includes zero entries for each codeword.

However, since CP-OFDM is used for UL transmission in NR, CM maintenance restriction may not be a core design target of UL codebook. In addition, the support of UL frequency selective precoding for CP-OFMD has been agreed. Accordingly, as a designing reference to solve the control channel overhead problem for frequency selective UL-MIMO scheduling, it is natural to consider UL dual-stage codebook (i.e., W1W2 similar to DL).

Accordingly, in the present disclosure, the dual stage codebook structure (W=W1W2) for UL frequency selective precoding for at least CP-OFMD may be considered.

In the dual stage codebook, final UL precoder W per SB may be divided into WB PMI component W1 and the corresponding SB PMI component W2. In this structure, WB PMI component W1 may include a beam/beam group, and SB PMI component W2 may include a beam selector and/or co-phase component (e.g., for X-pol antenna) In the dual stage codebook, W1 may include DFT beam(s) of which performance is good, particularly. This is because gNB is equipped with uniform linear (or planar) array antenna element/panel. Different from TRP, the UE may be provided with an arbitrary separated antenna element/panel, and accordingly, low antenna correlation may be expected. Owing to this reason, NR UL codebook should be designed by considering UE's antenna arrangement and structure. This means that UL codebook should be performed well for an arbitrary UE antenna arrangement and structure. In this context, 4Tx DL household codebook may be considered. However, for frequency selective precoding, TPMI signaling overhead may increase according to the number of configured SBs. Accordingly, in order to reduce the total number of signaling overhead efficiently, a household codebook having dual stage structure may be considered. In this design, W1 may include L-beam (e.g., L=2, 4, L is configurable) group in which each beam may be selected by the gNB from the household codebook. W2 may perform a beam selection that requires only $\log_2 L$ bit per SB.

That is, consequently, since NR UL codebook should be designed to perform well for an arbitrary UE antenna arrangement and structure, DL household codebook including beam grouping for UL codebook may be considered.

In the case that UE is provided with multiple panels, panel selection and/or combining may be considered for robust transmission for the case of fast UE rotation, blockage, and the like. Such types of panel selection and/or combining function may be supported by W1 or W2. In this case, the following three factors needs to be considered for UL codebook design.

The number of panels supported in UL codebook
The number of ports supported for each panel
Whether the UE has different number of ports per panel The above three factors may be simplified but the codebook structure may be still complex. Accordingly, since the antenna port of different panels in the UE may have different average RSRP value, SRI may be used for panel selection or antenna port group selection. This means that the antenna port of different panel may be independently supported by different resource. In summary, UL codebook is designed by assuming a single panel, and SRI may be used for panel selection function.

In NR, an indication for several SRS resource selections may be supported. In the case of a plurality of SRS resources that may be indicated by SRI field, the panel combining function may be considered. The panel combining plays an important role for increasing beamforming gain by applying an inter-panel corrector proper to phase and/or amplitude. Accordingly, in the case that several SRS resources are indicated for the panel combining function, additional TPMI for the panel corrector needs to be introduced.

That is, UL codebook may be designed by assuming a single panel, and SRI may be used as the panel selection function. In addition, in the case that several SRS resources are indicated for the panel combining function, additional TPMI should be introduced for inter-panel phase/amplitude corrector.

SRI may indicate multiple selections of SRS resource that may support multiple panel joint transmission in UL. In addition, each panel transmission associated with each of the indicated SRS resources may be targeted to different UL reception point in the UL-CoMP context. In order to support it properly, NR network should calculate at least accurate MCS for each of different layer groups corresponding to different SRS resources by using power control process separated for each SRS resource. Generally, it is required to support a plurality of ULPC processes for the UE, and each of the ULPC processes may be associated with at least one SRS resource which is configured to the UE. For example, the configured SRS resource IDs #1 and #2 may be associated with the same ULPC process A, and other configured SRS resource ID #3 may be associated with different ULPC process B. ULPC processes A and B may be targeted to different reception points, and SRS resources #1 and #2 following the same ULPC process A may be dynamically selected by SRI indication which is agreed in UL grant. For example, in the case that SRS resources #1 (including corresponding TPMI/TRI) and #3 (including corresponding TPMI/TRI) is commonly indicated by SRI field in UL grant, for example, this may be interpreted as UL-CoMP joint reception operation in the UL multiple panel transmission and the gNB which is distinguished as a layer group.

In NR, in order to apply the frequency selective precoding for UL-MIMO, the increased control channel overhead owing to SB PMI indication may be a serious problem. In order to solve the problem, 2-level DCI may be considered as one of alternatives, an advantage and a disadvantage may be different according to detailed factors of 2-level DCI. With respect to delay problem, DCI decoding failure problem and DCI overhead, 2-level DCI of three types of versions may be discussed as below, one by one.

Option 1:
1st DCI: UL grant like LTE DCI 0/4
2nd DCI: SB PMIs for allocated RBs
DCI transmission timing: 2 DCIs are transmitted at the same subframe.
Option 2:
1st DCI: SB PMIs for all RBs
2nd DCI: UL grant like LTE DCI 0/4
DCI transmission timing: one or more $2^{nd}$ DCI referring $1^{st}$ DCI is transmitted on/after $1^{st}$ DCI transmission subframe.

Regarding channel aging issue, Option 2 may not be desirable because UL grant information may be delivered several subframes later SB PMIs delivery. The motivation of introducing such frequency selective UL precoders is to achieve accurate UL link adaptation exploiting the frequency domain as well, so that the full set of scheduling information is desired to be delivered instantaneously to UE when it is scheduled for UL transmission. For Option 1, there is no latency issue because and 2 DCIs are transmitted at the same subframe.

For all options, full information on UL scheduling is divided into two DCIs so it seems that UE may not transmit UL data in the case that it fails to decode one of the two DCIs. For Option 2, in the case that the UE fails to decode $1^{st}$ DCI, several $2^{nd}$ DCIs referring the $1^{st}$ DCI may be wasted. To address this issue, a proper mechanism to report decoding result of $1^{st}$ DCI to gNB may be needed.

In terms of DCI overhead, these two options help to reduce overhead. For Option 1, SB PMIs only for scheduled SBs, not for all SBs, are indicated through $2^{nd}$ DCI so that in the case small RBs are allocated to UE $2^{nd}$ DCI payload size is adaptively reduced. For Option 2, SB PMIs for all SBs should be indicated through $1^{st}$ DCI since $2^{nd}$ DCI including UL grant may be signaled after $1^{st}$ DCI transmission. In this design, the overhead saving may be achieved in time-wise manner. In other words, $1^{st}$ DCI are transmitted only once for multiple UL grant so that DCI overhead is saved.

The other option is single level DCI as follows:
Option 3:
Single DCI: SB PMI(s) for allocated RB(s) and UL grant like LTE DCI 0/4
Option 4:
Single DCI: SB PMI(s) for all RB(s), and UL grant like LTE DCI 0/4

In Options 3 and 4, there is no channel aging or decoding failure issues that 2 level DCI has, but it may need to contain more payload in a single DCI. Even in Option 3, it is desirable to keep the same payload size regardless of allocated RB size in order not to increase DCI BD overhead. As a result, DCI size for option 3 is decided based on the case when allocated RB is wideband and DCI size for options 3 and 4 is the same.

In order to minimize DCI overhead, the compression for SB PMI indication is critical. To resolve the control channel overhead issue for frequency-selective UL-MIMO scheduling, a compression method for SB PMI payload should be investigated along with codebook structure. In dual codebook structure, a final UL precoder W per subband may be decomposed into a wideband PMI component W1 and the corresponding subband PMI component W2. Then, the UL scheduling DCI contains one wideband W1 and multiple SB W2. In order to reduce payload size of SB W2, codebook subsampling may be considered. In the case of the single codebook structure like the Rel-8 LTE codebook, SB PMI payload may be compressed in a similar way as well. More specifically, codebook subset for SB PMI is restricted based on WB PMI in such way that the subset includes highly correlated PMIs with WB PMI.

UL DCI design for frequency selective scheduling should be investigated in terms of latency issue, DCI decoding failure issue, and DCI overhead. In addition, in order to reduce DCI overhead, SB PMI should be indicated from a subset of whole codebook.

Figure 17:
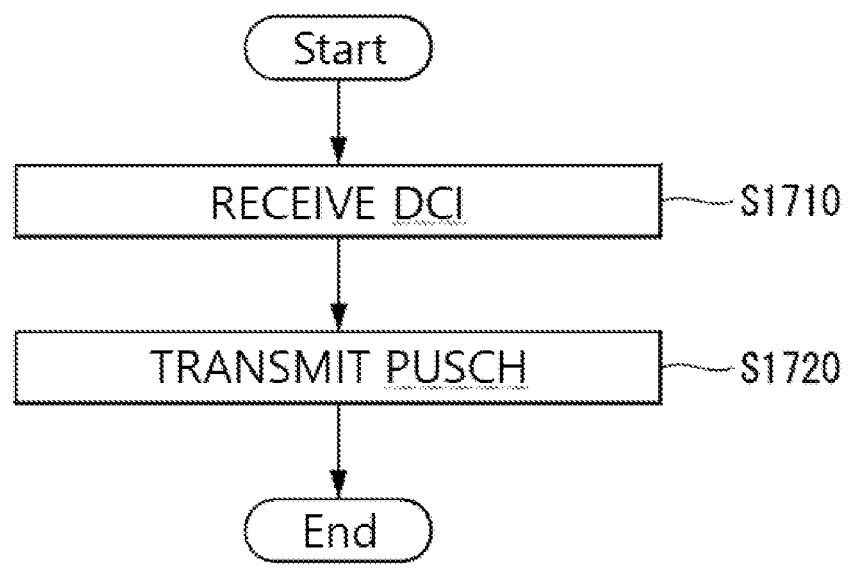
FIG. 17 is a flowchart illustrating PUSCH transmission operation of a UE according to an embodiment of the present invention.

FIG. 17 is a flowchart illustrating PUSCH transmission operation of a UE according to an embodiment of the present invention. In relation to this flowchart, the description/embodiments described above may be identically/similarly applied, and the repeated description will be omitted.

First, a UE may receive DCI for UL transmission scheduling (step, S1710). At this time, DCI may include TPMI as precoding information, which is information of an index of precoding matrix selected for PUSCH transmission of the UE. Further, DCI may further include RI which is information of layer used for PUSCH transmission of the UE, and in this case, the RI may be joint-encoded with the TPMI and included in DCI. In addition, in order to decide DMRS port, a size of predefined DMRS field/table (in DCI) may be differently decided according to the RI which is joint-encoded with the TPMI. That is, the DMRS field/table may be differently encoded/decoded/interpreted/defined/configured based on/according to the RI.

As an embodiment, the TPMI is indicated for each SRS resource configured to the UE, and the RI may be commonly indicated for the configured SRS resources. Alternatively, as another example, the TPMI and the RI may be commonly indicated for all SRS resources configured to the UE.

Alternatively, another embodiment, the TPMI and the RI may be indicated for each SRS resource configured to the UE.

Next, the UE may perform codebook based PUSCH transmission based on the precoding information (step, S1720). At this time, in the case that the PUSCH is transmitted using four antenna ports, the codebook may include a first group including non-coherent precoding matrixes for selecting only one port for each layer, a second group including partial-coherent precoding matrixes for selection two ports in at least one layer and/or a third group including full-coherence precoding matrixes for selection all ports for each layer. Here, the non-coherent precoding matrix may represent a matrix including one vector having non-zero value in each column, the partial-coherent precoding matrix may represent a matrix including two vectors having non-zero value in at least one column, and the full-coherence precoding matrix may represent a matrix including only vectors having non-zero value. In addition, the codebook may be a codebook based on CP-OFDM waveform.

In addition, although it is not shown in the flowchart, the UE may receive restriction information of the number of layers used in PUSCH transmission. For example, the UE may receive the restriction information of the maximum number of layers usable in PUSCH transmission from the gNB through higher layer signaling (e.g., RRC). In this case, the UE does not use the codebook corresponding to the restricted layer in the PUSCH transmission. In addition, based on the restriction information of the number of layers, the size of a field in which TPMI and RI are joint-encoded.

In addition, although it is not shown in the flowchart, the UE may receive restriction information of precoding matrix usable in the PUSCH transmission in the codebook. At this time, the restriction information of precoding matrix may be signaled/generated to indicate the precoding matrix usable in the PUSCH transmission in the group (e.g., the first to third groups) unit or individual precoding matrix unit. Based on the restriction information of precoding matrix, the size of a field in which TPMI and RI are joint-encoded is determined. That is, the field/table in which TPMI and RI are joint-encoded may be differently encoded/decoded/interpreted/defined/configured based on/according to the restriction information of precoding matrix.

General Device to which Present Invention May be Applied

Figure 18:
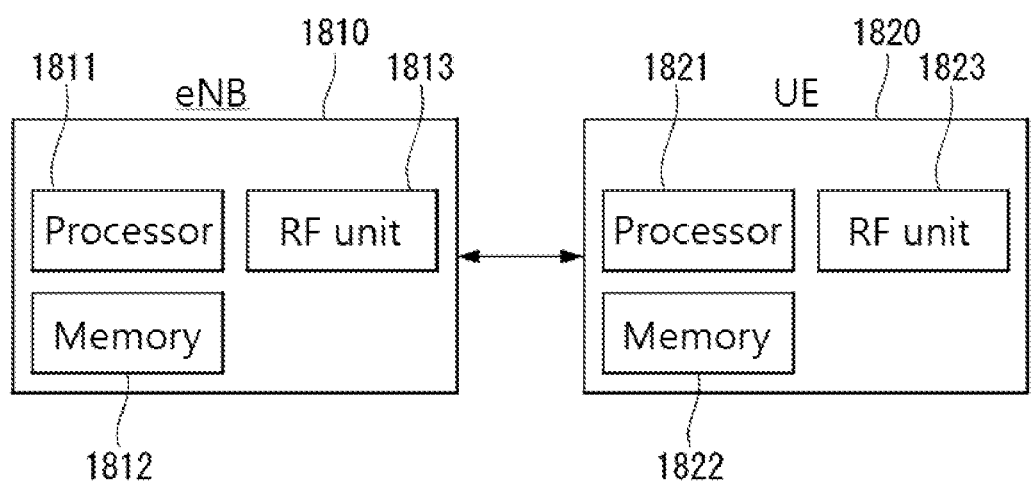
FIG. 18 is a block diagram of a wireless communication device according to an embodiment of the present invention.

FIG. 18 is a block diagram of a wireless communication device according to an embodiment of the present invention.

Referring to FIG. 18, a wireless communication system includes a base station (BS) (or eNB) 1810 and a plurality of terminals (or UEs) 1820 located within coverage of the eNB 1810.

The eNB 1810 includes a processor 1811, a memory 1812, and a radio frequency (RF) unit 1813. The processor 1811 implements functions, processes and/or methods proposed above. Layers of radio interface protocols may be implemented by the processor 1811. The memory 1812 may be connected to the processor 1811 to store various types of information for driving the processor 1811. The RF unit 1813 may be connected to the processor 1811 to transmit and/or receive a wireless signal.

The UE 1820 includes a processor 1821, a memory 1822, and a radio frequency (RF) unit 1823. The processor 1821 implements functions, processes and/or methods proposed above. Layers of radio interface protocols may be implemented by the processor 1821. The memory 1822 may be connected to the processor 1821 to store various types of information for driving the processor 1821. The RF unit 1823 may be connected to the processor 1821 to transmit and/or receive a wireless signal.

The memory 1812 or 1822 may be present within or outside of the processor 1811 or 1821 and may be connected to the processor 1811 or 1821 through various well known units. Also, the eNB 1810 and/or the UE 1820 may have a single antenna or multiple antennas.

Figure 19:
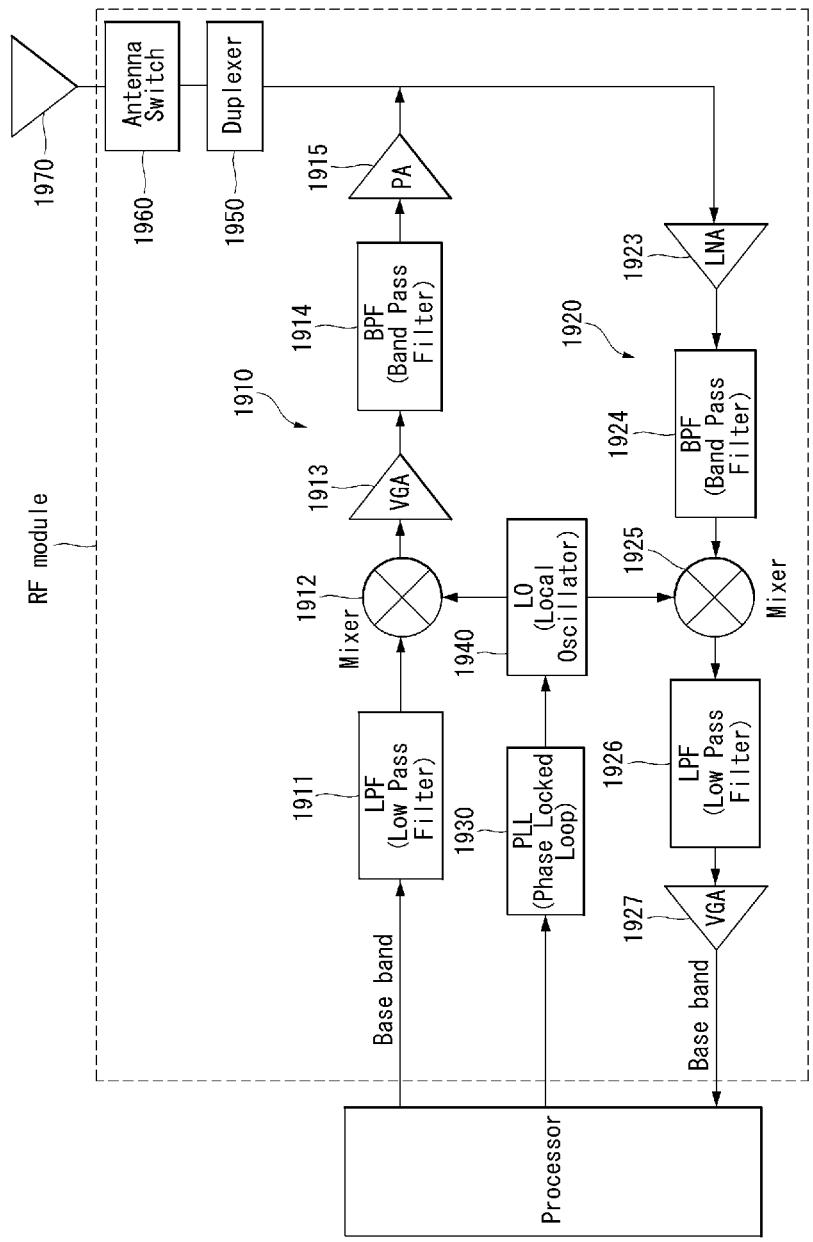
FIG. 19 is a diagram illustrating an example of an RF module of a wireless communication apparatus to which the method proposed in the present disclosure may be applied.

FIG. 19 is a diagram illustrating an example of an RF module of a wireless communication apparatus to which the method proposed in the present disclosure may be applied.

Particularly, FIG. 19 shows an example of an RF module that may be implemented in Frequency Division Duplex (FDD) system.

First, in a transmit path, the processor described above processes data to be transmitted and provides an analog output signal to transmitter 1910.

Within the transmitter 1910, the analog output signal is filtered by a low pass filter (LPF) 1911 to remove undesired images caused by prior digital-to-analog conversion (ADC), upconverted from baseband to RF by an upconverter (Mixer) 1912, and amplified by a variable gain amplifier (VGA) 1913, and the amplified signal is filtered by a filter 1914, further amplified by a power amplifier (PA) 1915, routed through duplexer(s) 1950/antenna switch(es) 1960, and transmitted via an antenna 1970.

In addition, in the receive path, an antenna 1970 receives signals from exterior and provides the received signals, which is routed through antenna switch(es) 1960/duplexer(s) 1950 and provided to the receiver 1920.

Within the receiver 1920, the received signal is amplified by a low noise amplifier (LNA) 1923, filtered by a band pass filter 1924, and downconverted from RF to baseband by a downconverter (Mixer) 1925.

The downconverted signal is filtered by a low pass filter (LPF) 1926, and amplified by a VGA 1927 to obtain an analog input signal, which is provided to the processor described above.

Further, a local oscillator (LO) generator 1940 generates and provides transmission and reception LO signals to upconverter 1912 and downconverter 1925, respectively.

In addition, a phase locked loop (PLL) 1930 may receive control information from the processor and provide control signals to LO generator 1940 to generate the transmission and reception LO signals at the proper frequencies.

The circuits shown in FIG. 19 may be arranged differently from the configuration shown in FIG. 19.

Figure 20:
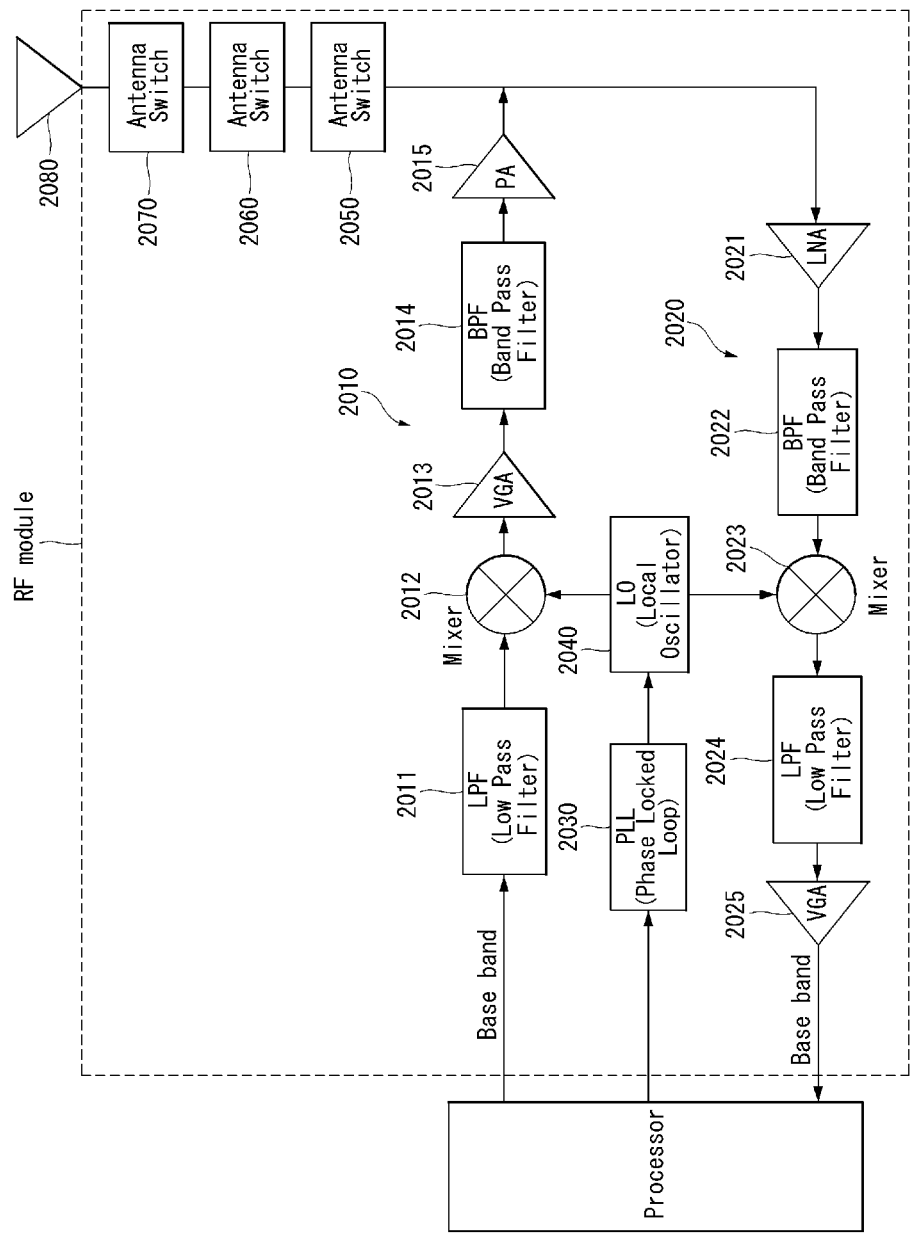
FIG. 20 is a diagram illustrating another example of an RF module of a wireless communication apparatus to which the method proposed in the present disclosure may be applied.

FIG. 20 is a diagram illustrating another example of an RF module of a wireless communication apparatus to which the method proposed in the present disclosure may be applied.

Particularly, FIG. 20 shows an example of an RF module that may be implemented in Time Division Duplex (TDD) system.

The transmitter 2010 and the receiver 2031 of the RF module in the TDD system are the same as the structures of the transmitter and the receiver of the RF module in the FDD system.

Hereinafter, only the structure of the RF module of the TDD system is described, which is different from the RF module of the FDD system, and the same structure is referred to the description of FIG. 10.

The signal amplified by a power amplifier (PA) 2015 of a transmitter is routed through a band select switch 2050, a band pass filter (BPF) 2060 and an antenna switch(s) 2070, and transmitted via an antenna 2080.

Further, in the receive path, the antenna 2080 receives signals from exterior and provides the received signals, which is routed through the antenna switch(s) 2070, the band pass filter (BPF) 2060, and the band select switch 2050, and provided to the receiver 2020.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

In the present disclosure, 'A and/or B' may be interpreted to mean at least one of A and/or B.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

MODE FOR INVENTION

Various forms for embodiments of the invention has been described in the Best Mode for Invention.

INDUSTRIAL APPLICABILITY

The present invention, applied to 3GPP LTE/LTE-A/5G system, is primarily described as an example, but may be applied to various wireless communication systems in addition to the 3GPP LTE/LTE-A/5G system.

The invention claimed is:

1. A method for transmitting a codebook-based Physical Uplink Shared Channel (PUSCH) performed by a User Equipment (UE) in a wireless communication system, comprising:
   receiving restriction information for a precoding matrix, usable in the PUSCH transmission in the codebook;
   receiving downlink control information (DCI) for uplink (UL) transmission scheduling; and
   performing the codebook based PUSCH transmission based on precoding information included in the DCI and the restriction information,
   when the PUSCH is transmitted using four antenna ports, the codebook includes:
   a first group including non-coherent precoding matrixes for selecting only one port for each layer, wherein each of the non-coherent precoding matrixes is a matrix including one vector having a non-zero value in each column,
   a second group including partial-coherent precoding matrixes for selecting two ports in at least one layer, wherein each of the partial-coherent precoding matrixes is a matrix including two vectors having a non-zero value in at least one column, and
   a third group including full-coherence precoding matrixes for selecting all ports for each of the layers, wherein each of the full-coherence precoding matrixes is a matrix including vectors having only non-zero values.

2. The method of claim 1, wherein the codebook is a codebook based on a Cyclic Prefix Orthogonal Frequency Division Multiplexing (CP-OFDM) waveform.

3. The method of claim 1, wherein the DCI includes Transmit Precoding Matrix Indicator (TPMI) which is information for an index of a precoding matrix selected for the PUSCH transmission as the precoding information.

4. The method of claim 3, wherein the TPMI is joint-encoded with a Rank Indicator (RI) which is information for a layer used in the PUSCH transmission.

5. The method of claim 4,
   wherein the TPMI is indicated for each Sounding Reference Signal (SRS) resource configured to the UE, and
   wherein the RI is commonly indicated for the configured SRS resources.

6. The method of claim 4, wherein the TPMI and the RI are commonly indicated for all SRS resources configured to the UE.

7. The method of claim 4, wherein the TPMI and the RI are indicated for each SRS resource configured to the UE.

8. The method of claim 4, wherein a size of a predefined DMRS (Demodulation RS) field in the DCI to determine a DMRS port is determined differently according to the RI joint-encoded with the TPMI.

9. The method of claim 4, further comprising receiving restriction information for a number of layers usable in the PUSCH transmission.

10. The method of claim 9, wherein a size of a field in which the TPMI and RI are joint-encoded is determined based on the restriction information for the number of layers.

11. The method of claim 1, wherein the restriction information for the precoding matrix indicates the precoding matrix usable in the PUSCH transmission in the group or individual precoding matrix.

12. The method of claim 4, wherein a size of a field in which the TPMI and RI are joint-encoded is determined based on the restriction information for the precoding matrix.

13. The method of claim 1, wherein the restriction information for the precoding matrix is information relating to each of the first group, the second group, and the third group.

14. A User Equipment (UE) configured for transmitting a codebook-based Physical Uplink Shared Channel (PUSCH) in a wireless communication system, comprising:
   a transceiver for transmitting and receiving a radio signal; and a processor for controlling the transceiver,
wherein the processor is configured to perform:
receive restriction information transceiver precoding matrix usable in the PUSCH transmission in the codebook,
receive downlink control information (DCI) for uplink (UL) transmission scheduling; and
perform the codebook based PUSCH transmission based on precoding information included in the DCI and the restriction information,
when the PUSCH is transmitted using four antenna ports, the codebook includes:
a first group including non-coherent precoding matrixes for selecting only one port for each layer, wherein each of the non-coherent precoding matrixes is a matrix including one vector having a non-zero value in each column,
a second group including partial-coherent precoding matrixes for selecting two ports in at least one layer, wherein each of the partial-coherent precoding matrixes is a matrix including two vectors having a non-zero value in at least one column, and
a third group including full-coherence precoding matrixes for selecting all ports for each of the layers, wherein each of the full-coherence precoding matrixes is a matrix including vectors having only non-zero values.

\* \* \* \* \*